(12) United States Patent
Ohmura et al.

(10) Patent No.: US 9,720,644 B2
(45) Date of Patent: Aug. 1, 2017

(54) INFORMATION PROCESSING APPARATUS, INFORMATION PROCESSING METHOD, AND COMPUTER PROGRAM

(71) Applicant: SONY CORPORATION, Tokyo (JP)

(72) Inventors: Junki Ohmura, Tokyo (JP); Michinari Kohno, Tokyo (JP); Kenichi Okada, Tokyo (JP)

(73) Assignee: SONY CORPORATION, Tokyo (JP)

(*) Notice: Subject to any disclaimer, the term of this patent is extended or adjusted under 35 U.S.C. 154(b) by 288 days.

(21) Appl. No.: 14/204,688

(22) Filed: Mar. 11, 2014

(65) Prior Publication Data

US 2014/0304605 A1 Oct. 9, 2014

(30) Foreign Application Priority Data

Apr. 3, 2013 (JP) ................................ 2013-077866

(51) Int. Cl.
*G10L 15/26* (2006.01)
*G06F 3/16* (2006.01)
*G10L 15/22* (2006.01)

(52) U.S. Cl.
CPC .............. *G06F 3/167* (2013.01); *G10L 15/26* (2013.01); *G10L 15/22* (2013.01)

(58) Field of Classification Search
CPC ......... G06F 3/167; G10L 15/20; G10L 15/22; G10L 15/26; G10L 21/06

USPC .......... 715/706, 709, 727, 728, 763
See application file for complete search history.

(56) References Cited

U.S. PATENT DOCUMENTS

| | | | | |
|---|---|---|---|---|
| 6,212,497 | B1* | 4/2001 | Araki | G10L 15/26 382/229 |
| 6,697,777 | B1* | 2/2004 | Ho | G10L 15/26 704/235 |
| 2004/0235531 | A1* | 11/2004 | Anzawa | G10L 21/06 455/563 |
| 2007/0088557 | A1* | 4/2007 | Andrew | G06F 3/167 704/270.1 |
| 2010/0211387 | A1* | 8/2010 | Chen | G10L 25/78 704/226 |
| 2012/0110456 | A1* | 5/2012 | Larco | G06F 3/167 715/728 |
| 2014/0163983 | A1* | 6/2014 | Kim | G06F 3/167 704/235 |

FOREIGN PATENT DOCUMENTS

JP 2012-181358 9/2012

* cited by examiner

*Primary Examiner* — Rinna Yi
(74) *Attorney, Agent, or Firm* — Oblon, McClelland, Maier & Neustadt, L.L.P.

(57) ABSTRACT

A system that acquires captured voice data corresponding to a spoken command; sequentially analyzes the captured voice data; causes a display to display a visual indication corresponding to the sequentially analyzed captured voice data; and performs a predetermined operation corresponding to the spoken command when it is determined that the sequential analysis of the captured voice data is complete.

19 Claims, 50 Drawing Sheets

FIG. 15A
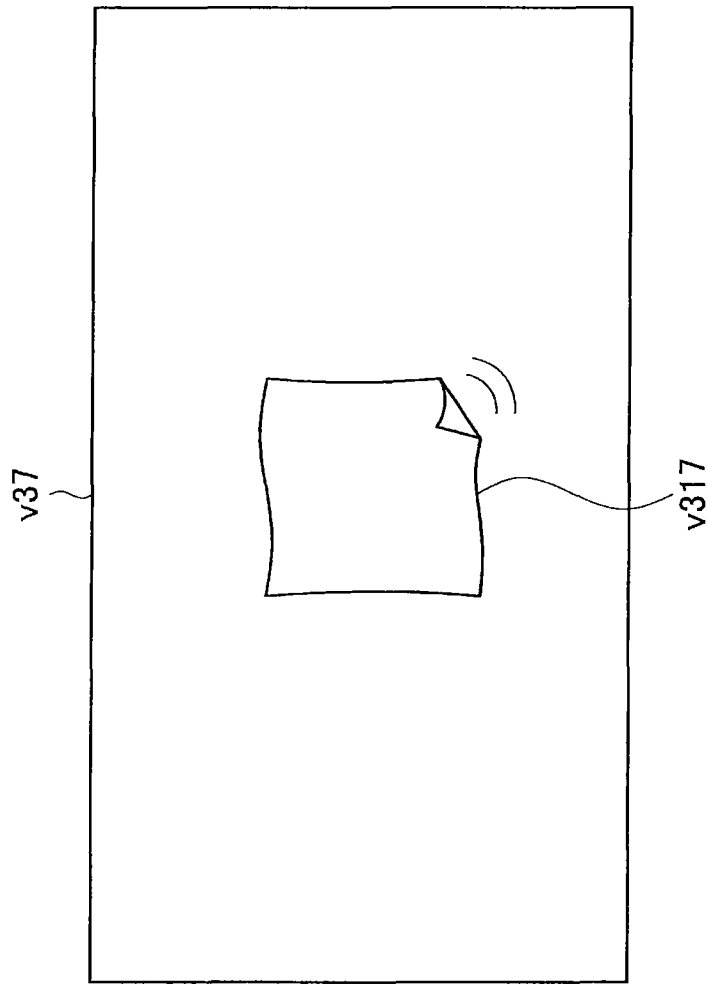

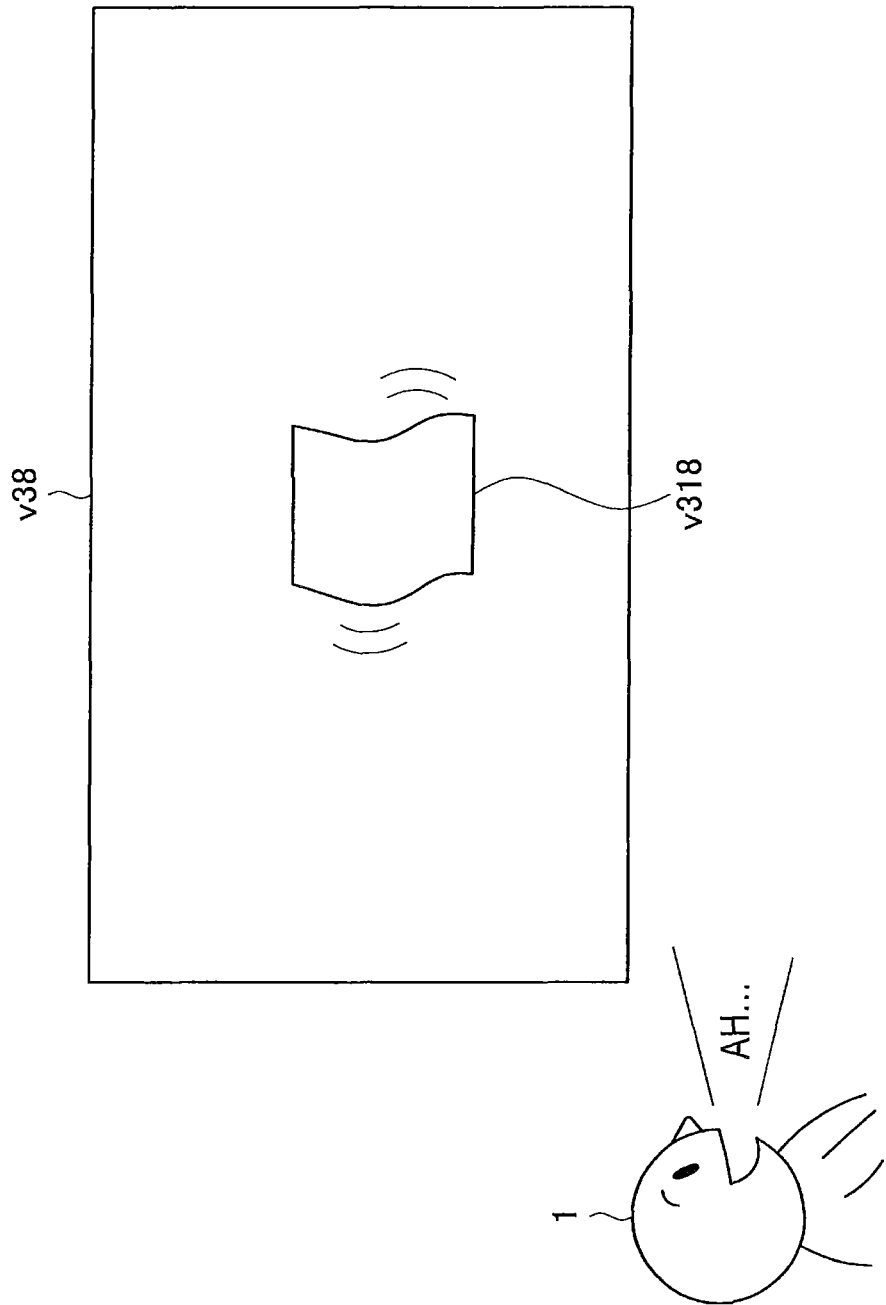

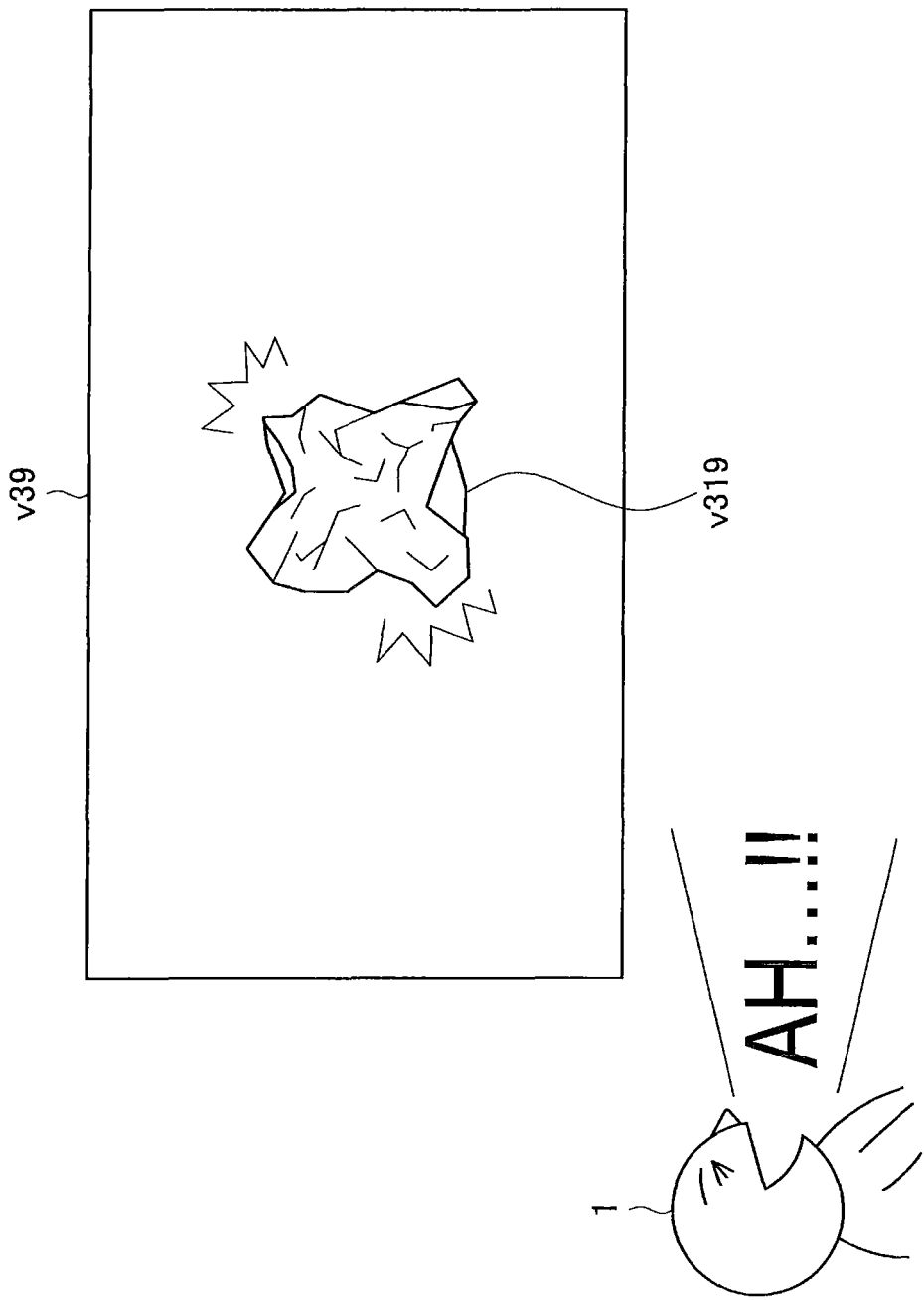

FIG. 35
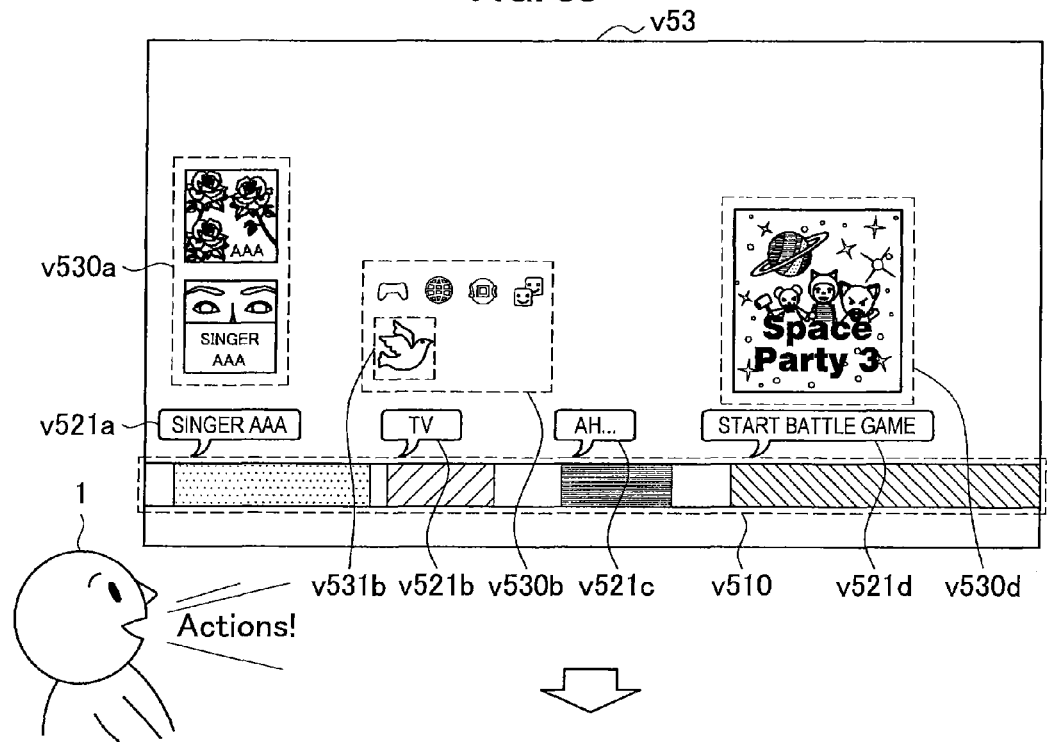
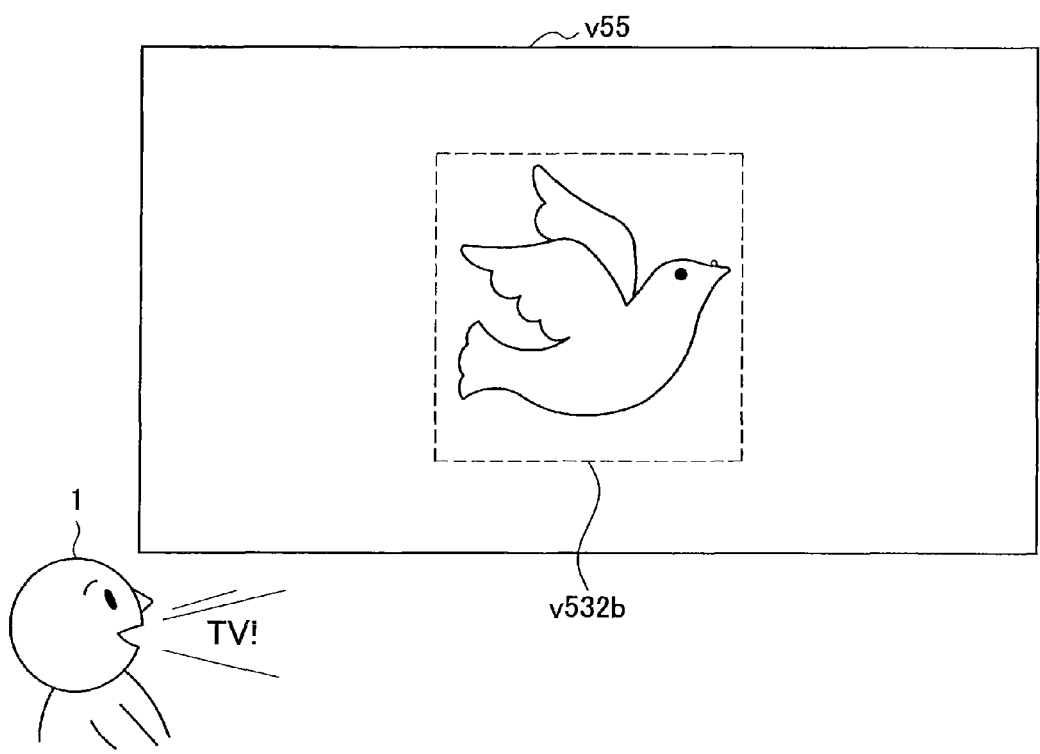

INFORMATION PROCESSING APPARATUS, INFORMATION PROCESSING METHOD, AND COMPUTER PROGRAM

CROSS REFERENCE TO RELATED APPLICATIONS

This application claims the benefit of Japanese Priority Patent Application JP 2013-077866 filed Apr. 3, 2013, the entire contents of which are incorporated herein by reference.

BACKGROUND

The present disclosure relates to an information processing apparatus, an information processing method, and a computer program.

A voice recognition technique of analyzing content spoken by a speaker and converting the content into text has been disclosed (for example, JP 2012-181358A). JP 2012-181358A discloses a technique by which captions that are easy for a user to read and understand can be generated when an input voice is sequentially converted into text and the text is displayed. Further, techniques by which content spoken by the speaker can be analyzed and processing based on the content can be executed have been proposed, and such techniques have been incorporated into mobile telephones and smart phones.

SUMMARY

In the existing voice recognition technique, after analysis of content spoken by the speaker ends, the content is presented on a screen, a search process based on the content is executed, or processing based on the content is performed. However, in the existing voice recognition technique, the content is not displayed on the screen or processing is not performed until analysis of content spoken by the speaker ends, and thus the speaker has a feeling of having to wait after finishing speaking.

It is desirable to provide an information processing apparatus, an information processing method, and a computer program which are novel and improved and capable of performing a voice recognition process of causing the speaker to feel as if processing is being performed in real time without causing the speaker to have a feeling of having to wait.

According to an embodiment of the present disclosure, there is provided a system that acquires captured voice data corresponding to a spoken command; sequentially analyzes the captured voice data; causes a display to display a visual indication corresponding to the sequentially analyzed captured voice data; and performs a predetermined operation corresponding to the spoken command when it is determined that the sequential analysis of the captured voice data is complete.

BRIEF DESCRIPTION OF THE DRAWINGS

FIG. 15A is a diagram illustrating an exemplary display according to a third example of the first embodiment;

FIG. 15B is a diagram illustrating an exemplary display according to the third example of the first embodiment;

FIG. 15C is a diagram illustrating an exemplary display according to the third example of the first embodiment;

FIG. 35 is a diagram illustrating an exemplary display according to the second example of the third embodiment;

DETAILED DESCRIPTION OF THE EMBODIMENT(S)

Figure 1:
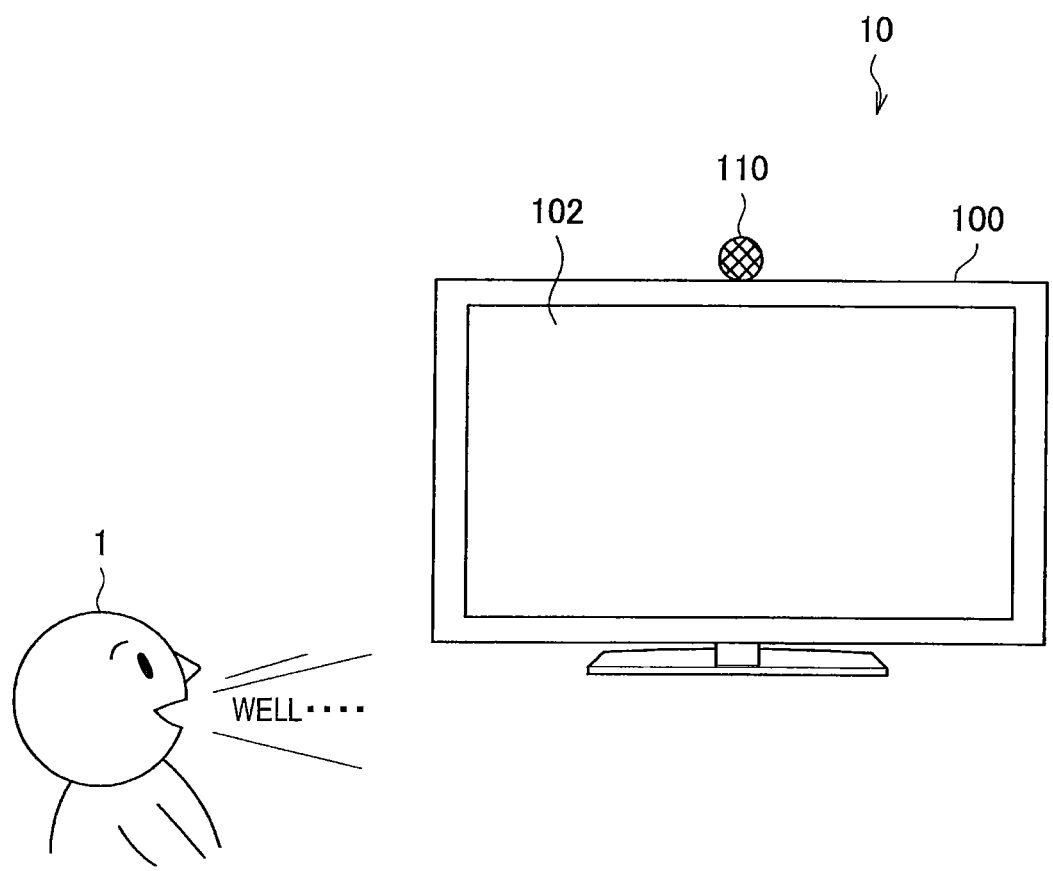
FIG. 1 is an explanatory diagram illustrating an outline of an information processing apparatus 10 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will proceed in the following order.
<1. First embodiment>
[1-1. Outline of first embodiment]
[1-2. Configuration of first embodiment]
[1-3. Configuration of display device]
[1-4. First example of first embodiment]
{1-4-1. Outline of first example}
{1-4-2. Operation of first example}
[1-5. Second example of first embodiment]
{1-5-1. Outline of second example}
{1-5-2. Operation of second example}
[1-6. Third example of first embodiment]
{1-6-1. Outline of third example}
{1-6-2. Operation of third example}
[1-7. Conclusion of first embodiment]
<2. Second embodiment>
[2-1. Outline of second embodiment]
[2-2. Configuration of second embodiment]
[2-3. Operation of second embodiment]
[2-4. Exemplary screen displayed in second embodiment]
[2-5. Modified example of second embodiment]
[2-6. Conclusion of second embodiment]
<3. Third embodiment>
[3-1. Outline of third embodiment]
[3-2. Configuration of third embodiment]
[3-3. Configuration of display device]
[3-4. First example of third embodiment]
{3-4-1. Outline of first example}
{3-4-2. Operation of first example}
[3-5. Second example of third embodiment]
{3-5-1. Outline of second example}
{3-5-2. Operation of second example}
[3-6. Third example of third embodiment]
{3-6-1. Outline of third example}
{3-6-2. Operation of third example}
[3-7. Fourth example of third embodiment]
[3-8. Fifth example of third embodiment]
{3-8-1. Outline of fifth example}
{3-8-2. Operation of fifth example}
[3-9. Sixth example of third embodiment]
{3-9-1. Outline of sixth example}
{3-9-2. Operation of sixth example}
[3-10. Seventh example of third embodiment]
[3-11. Eighth example of third embodiment]
{3-11-1. Outline of eighth example}
{3-11-2. Operation of eighth example}

[3-12. Conclusion of third embodiment]
<4. Exemplary hardware configuration>

1. First Embodiment

1-1. Outline of First Embodiment

First of all, an outline of an information processing apparatus according to a first embodiment will be described. In recent years, user interfaces (U/Is) capable of performing desired processing by voice recognition without using an input device such as a mouse or a touch panel have been put to practical use. Meanwhile, an input by voice has a higher degree of freedom of input information than that by an input device such as a mouse or a touch panel. For this reason, in U/Is using a voice input, there is a problem in that it is difficult to understand when and where to say what with regard to a displayed screen in order to obtain a desired response. Particularly, in recent years, processing capabilities of CPUs and GPUs have improved, and the resolution of display devices has also improved. Thus, it is possible to simultaneously display much more information on a screen, making the screen complicated and thus magnifying the above problem.

In this regard, in the information processing apparatus according to the first embodiment, provided is an information processing apparatus capable of displaying display information (that is, corresponding to voice recognition) operable by voice recognition to be intuitively discerned among display information such as an icon, a button, a link, and a menu displayed on a screen. The information processing apparatus according to the present embodiment will be described below in detail.

1-2. Configuration of First Embodiment

First, a configuration of the information processing apparatus 10 according to the first embodiment will be described with reference to FIG. 1. The information processing apparatus 10 according to the present embodiment includes a display device 100 and a sound collecting device 110 as illustrated in FIG. 1.

The sound collecting device 110 is a device that collects a voice signal uttered by the user 1. An exemplary concrete configuration of the sound collecting device 110 is a microphone. The voice signal of the user 1 collected by the sound collecting device 110 is input to the display device 100.

The display device 100 is a device that includes a display unit 102 and outputs an operation screen or an execution result of desired processing to the display unit 102. When the information processing apparatus 10 is activated, the display device 100 generates, for example, a certain operation screen, and causes the operation screen to be displayed on the display unit 102.

Various kinds of display information are displayed on the screen generated by the display device 100. Here, the display information includes, for example, a display region for displaying operation targets such as an icon, a button, a link, and a menu used to perform certain processing for displaying or ending a menu screen or activate various kinds of content or various kinds of information. The display information includes display information corresponding to voice recognition and display information not corresponding to voice recognition.

Figure 2:
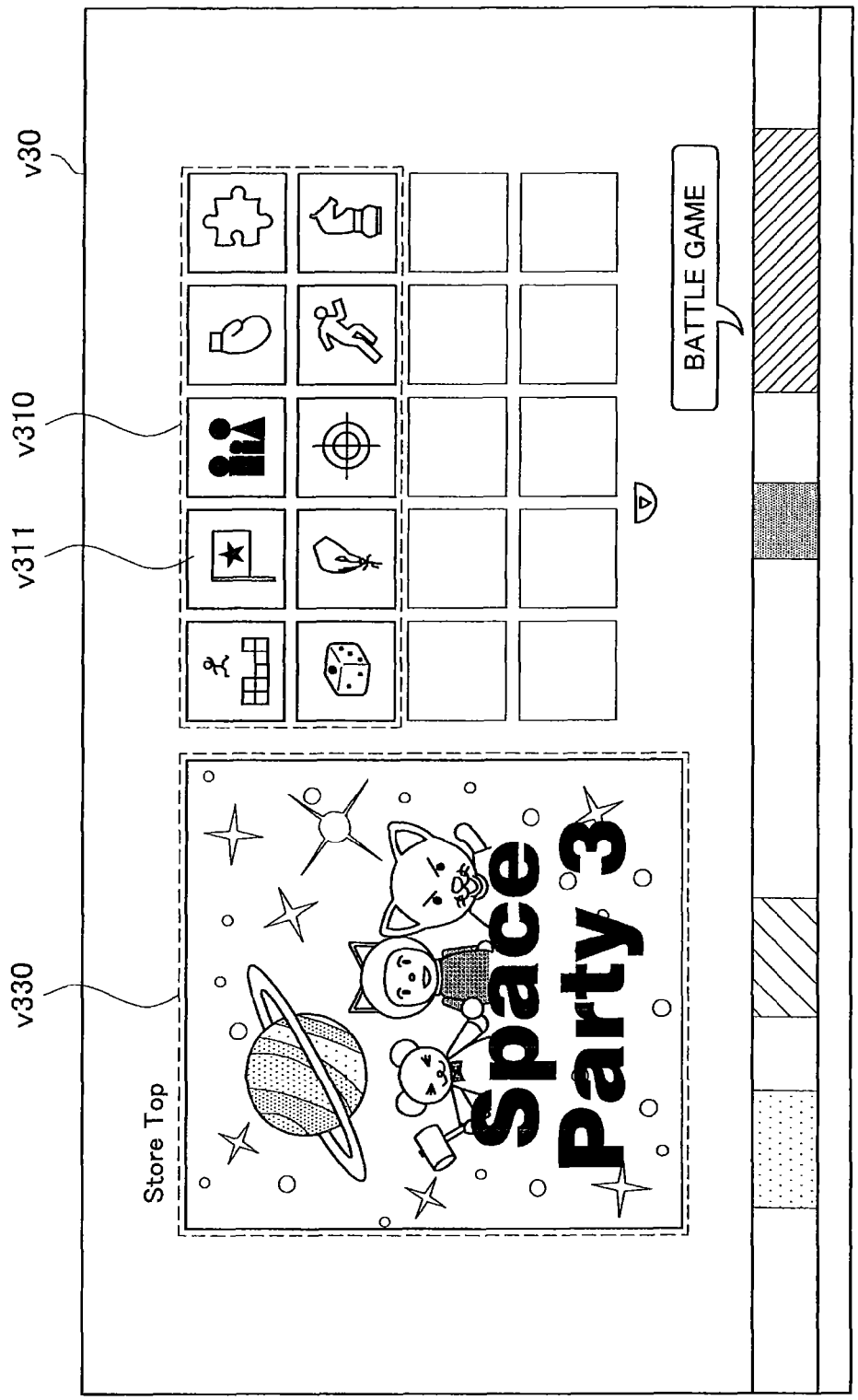
FIG. 2 is a diagram illustrating an exemplary screen configuration according to a first embodiment.

For example, FIG. 2 is an explanatory diagram of an exemplary screen configuration according to the first embodiment. A screen v30 is a screen displayed on the display unit 102 of the display device 100. The screen v30 includes a display region v310 in which icons v311 corresponding to respective content are displayed and a display region v330 in which information of desired content is displayed as illustrated in FIG. 2. In the example of the screen v30, the icon v311 is assumed to correspond to voice recognition, and the display region v330 is assumed not to correspond to voice recognition. It is difficult for the user 1 to discern whether or not an icon or a region corresponds to voice recognition merely by viewing the screen v30. Further, adding information representing correspondence to voice recognition to certain positions is likely to complicate the screen.

In this regard, when the voice signal collected by the sound collecting device 110 is detected, the display device 100 displays display information corresponding to voice recognition among pieces of display information displayed on the screen to be discerned from display information not corresponding to voice recognition. In case of the screen v30 illustrated in FIG. 2, for example, when the voice signal is detected, the display device 100 displays the icon v311 corresponding to voice recognition in an animated manner. Through this operation, the icon v311 is highlighted to be discernible from the display region v320 not corresponding to voice recognition. The details of this operation will be described below together with the configuration of the display device 100.

1-3. Configuration of Display Device

Figure 3:
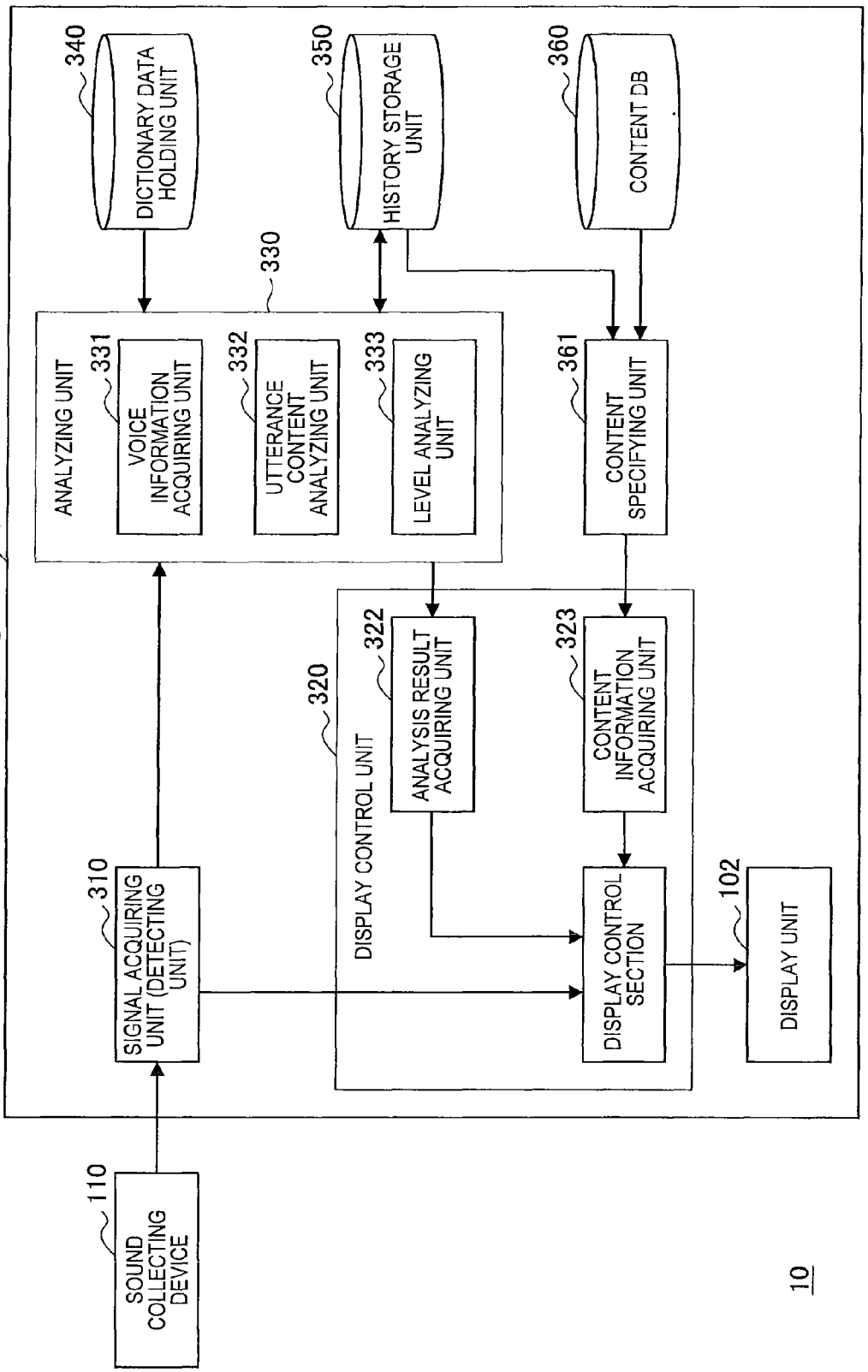
FIG. 3 is a diagram illustrating an exemplary configuration of a display device according to the first embodiment.

A configuration of the display device 100 according to the first embodiment will be described with reference to FIG. 3. FIG. 3 is a diagram illustrating an exemplary configuration of the display device 100 according to the first embodiment. The display device 100 according to the present embodiment includes the display unit 102, a signal acquiring unit 310, a display control unit 320, an analyzing unit 330, a dictionary data holding unit 340, a history storage unit 350, a content DB 360, and a content specifying unit 361 as illustrated in FIG. 3.

(Signal Acquiring Unit 310)

The signal acquiring unit 310 detects and acquires the voice signal collected by the sound collecting device 110. When the sound collecting device 110 collects the voice signal, the collected voice signal is output from the sound collecting device 110. The signal acquiring unit 310 detects and acquires the voice signal output from the sound collecting device 110. When the voice signal is detected, the signal acquiring unit 310 notifies a display control section 321 of the display control unit 320 which will be described later of the detection result. The signal acquiring unit 310 corresponds to an example of a "detecting unit" according to an embodiment of the present disclosure.

The signal acquiring unit 310 outputs the acquired voice signal to the analyzing unit 330. Upon receiving an output from the signal acquiring unit 310, the analyzing unit 330 analyzes the voice signal acquired from the signal acquiring unit 310. The details of the analyzing unit 330 will be described later.

(Analyzing Unit 330)

The analyzing unit 330 analyzes the voice signal acquired by the signal acquiring unit 310. Processing related to voice recognition is performed by the analyzing unit 330. The analyzing unit 330 includes a voice information acquiring unit 331, an utterance content analyzing unit 332, and a level analyzing unit 333 as illustrated in FIG. 3. The analyzing unit 330 acquires the voice signal from the signal acquiring unit 310. The analyzing unit 330 causes the voice information acquiring unit 331, the utterance content analyzing unit 332, and the level analyzing unit 333 to analyze the acquired voice signal. The details of the analysis processes performed by the voice information acquiring unit 331, the utterance content analyzing unit 332, and the level analyzing unit 333 will be described later. The analyzing unit 330 outputs the analysis result of the voice signal to an analysis result acquiring unit 322.

The voice information acquiring unit 331 performs the voice recognition process on the voice signal, and generates text data (which is hereinafter referred to as "voice information" as well) representing utterance content. As an example of the voice recognition process, there is a method of specifying an acoustic feature by analyzing a voice signal, and specifying voice information by comparing the acoustic feature with various kinds of models such as a previously stored acoustic model (acoustic model), a language model (language model) or various kinds of dictionary data such as a pronunciation dictionary. Various kinds of models such as the acoustic model used in the voice recognition process and the language model and various kinds of dictionary data such as the pronunciation dictionary may be stored in the dictionary data holding unit 340 which will be described later. Further, the above-described technique of the voice recognition process is an example, and the technique of the voice recognition process is not limited as long as text data representing utterance content can be specified.

The voice information acquiring unit 331 outputs the acquired voice information to the utterance content analyzing unit 332.

The utterance content analyzing unit 332 analyzes the voice information, and interprets the meaning represented by the voice information. For example, there are cases in which a system or a device supporting voice recognition has a function of performing processing corresponding to a keyword when a predetermined keyword is acquired as voice information. Specifically, when ending of an application is associated with a keyword of "end" at a system side in advance, the application can be ended when the word "end" is acquired as voice information. In this case, the utterance content analyzing unit 332 determines whether or not the acquired voice information is identical to a keyword previously associated with processing. Further, a relation between a keyword list and processing corresponding to each keyword may be stored in, for example, the dictionary data holding unit 340 as dictionary data.

Further, the utterance content analyzing unit 332 may be configured to specify a keyword similar to the acquired voice information. For example, the utterance content of the user 1 is not necessarily perfectly identical to a certain keyword. In this regard, the utterance content analyzing unit 332 may measure a degree of similarity between the acquired voice information and each keyword and determine that the acquired voice information corresponds (for example, is identical) to the keyword when there is a keyword having a degree of similarity of a certain value or more.

As a concrete example of determining a degree of similarity, there is a method of comparing voice information with each keyword using a character string comparison process such as the N-gram technique. Further, voice information may be analyzed using natural language processing such as morphological analysis or syntax analysis, and analyzed information may be compared with each keyword. Further, instead of using a comparison of voice information, for example, a degree of similarity may be determined by comparing a waveform of a voice signal serving as a source with a waveform corresponding to each keyword. As described above, the method is not limited as long as a degree of similarity between voice information and each keyword can be determined.

Further, when there are two or more keywords having a degree of similarity of a certain value or more, the utterance content analyzing unit 332 may determine that the acquired voice information corresponds to a keyword having the highest degree of similarity.

As described above, the utterance content analyzing unit 332 analyzes the voice information, interprets the meaning representing the voice information, determines whether or not there is a corresponding keyword, and notifies the analysis result acquiring unit 322 of the determination result. Further, when there is a keyword corresponding the voice information, the utterance content analyzing unit 332 outputs information representing processing corresponding to the keyword to the analysis result acquiring unit 322. Through this operation, the analysis result acquiring unit 322 can recognize what processing is to be executed.

Further, the utterance content analyzing unit 332 may record the acquired voice information in the history storage unit 350 which will be described later as history. At this time, the utterance content analyzing unit 332 may store information specifying the history in association with the history as attribute information. For example, the utterance content analyzing unit 332 may store information representing content serving as a target of the acquired voice information in association with a history corresponding to the voice information as the attribute information. In the present embodiment, processing using the history recorded in the history storage unit 350 will be described later together with an operation of the content specifying unit 361.

The level analyzing unit 333 analyzes the voice signal, specifies a level of the signal, and outputs the specified level to the analysis result acquiring unit 322. The level analyzing unit 333 may output a peak value of the voice signal or may output an average value of levels. Further, the level analyzing unit 333 may operate to monitor the acquired voice signal and sequentially output the level of the voice signal.

(Dictionary Data Holding Unit 340)

The dictionary data holding unit 340 stores various kinds of data used when the voice information acquiring unit 331 and the utterance content analyzing unit 332 perform their operations. Examples of various kinds of data include various kinds of models and dictionary data used when the voice information acquiring unit 331 performs the voice recognition process and dictionary data used when the utterance content analyzing unit 332 interprets the meaning of the voice information.

(History Storage Unit 350)

The history storage unit 350 stores the acquired voice information as a history. The history storage unit 350 may store the acquired voice information in association with information representing a timing at which the voice information is acquired. Through the configuration of the history storage unit 350, it is possible to specify information or content associated with certain voice information based on a previous voice recognition result, for example, it is possible to specify a "moving image watched yesterday."

Further, the history storage unit 350 may store voice information as a history based on content uttered by a user other than a certain user, for example, based on voice signals collected by a plurality of different sound collecting devices 110. Through the configuration of the history storage unit 350, it is possible to specify information or content associated with voice information that is most frequently used by a plurality of users other than a single user based on a previous voice recognition result, for example, it is possible to specify a "song played most last week."

Further, the history storage unit 350 may store attribute information specifying a history in association with a corresponding history. For example, information representing content serving as a target of the acquired voice information may be stored in association with a history corresponding to the voice information as the attribute information. As the history storage unit 350 is configured as described above, for example, it is possible to extract the history corresponding to voice information uttered in association with desired content.

(Display Control Unit 320)

The display control unit 320 performs processing related to generation and display update of the screen v30. The display control unit 320 includes the display control section 321, the analysis result acquiring unit 322, and a content information acquiring unit 323 as illustrated in FIG. 3.

The display control section 321 which will be described later acquires the analysis result of the voice signal acquired by the signal acquiring unit 310 from the analyzing unit 330 through the analysis result acquiring unit 322. The analysis result acquiring unit 322 acquires the analysis result of the voice signal from the analyzing unit 330. The analysis result acquiring unit 322 outputs the acquired analysis result to the display control section 321. Examples of the analysis result of the voice signal include information representing whether or not the voice information corresponding to the acquired voice signal corresponds to a certain keyword and information representing the level of the voice signal. Further, when the voice information corresponds to a certain keyword, the analysis result of the voice signal may include information representing processing associated with the corresponding keyword. In this case, the display control section 321 that has received the analysis result can recognize processing to be performed in association with the keyword.

The content information acquiring unit 323 acquires information of content satisfying a certain condition from the content specifying unit 361 which will be described later. Specifically, the content information acquiring unit 323 generates a search condition for acquiring content based on an instruction given from the display control section 321, and outputs the generated search condition to the content specifying unit 361 which will be described later. As a response thereto, the content information acquiring unit 323 acquires information of content satisfying the search condition from the content specifying unit 361. The content information acquiring unit 323 outputs the acquired information of the content to the display control section 321. Through this configuration, for example, the display control section 321 can cause the icon v311 corresponding to content whose information is acquired to be displayed on the screen v30 or can acquire information corresponding to desired content and cause the acquired information to be displayed in the display region v320.

The display control section 321 generates a screen on which various kinds of display information are displayed and causes the generated screen to be displayed on the display unit 102. Further, the display control section 321 updates a display of the screen, for example, according to an operation (for example, a voice input) made by the user 1 or a result of processing corresponding to the operation.

When the display device 100 is activated, the display control section 321 first generates the screen v30. Parts such as images used to generate the screen v30 may be stored in a component (for example, a recording medium installed in the display control section 321) readable by the display control section 321 in advance.

Further, the display control section 321 causes the content information acquiring unit 323 to acquire information of content based on a predetermined condition. As a concrete example, the display control section 321 may cause the content information acquiring unit 323 to acquire information of all content or may cause the content information acquiring unit 323 to acquire information (information such as a link used to call content of a corresponding category) representing a category of content as content information.

The display control section 321 associates acquired content information with the icon v311. Further, when information representing whether or not voice recognition is supported is set to the acquired content information, the display control section 321 sets a flag representing whether or not the icon v311 corresponds to voice recognition based on this information. Meanwhile, the display control section 321 may set a flag representing whether or not the icon v311 corresponding to the content corresponds to voice recognition regardless of whether or not content corresponds to voice recognition. In this case, at least activation of content can be performed by a voice input.

Further, the display control section 321 may cause certain processing that is decided in advance for each screen such as "display of menu" or "end" to be displayed on the screen v30 in association with corresponding display information. Similarly to the icon v311 corresponding to the content, information representing whether or not voice recognition is supported may be set to display information associated with the certain processing. The flag representing whether or not display information corresponding to the certain processing supports voice recognition may be set in advance according to whether or not the processing supports voice recognition.

Further, certain processing of each screen need not necessarily be displayed on the screen v30 as display information. In this case, display information such as a corresponding menu or icon is not displayed on the screen v30, but when a word or phrase corresponding to a certain keyword is input by a voice input, certain processing is performed.

The display control section 321 causes the generated screen v30 to be displayed on the display unit 102.

Further, when the sound collecting device 110 collects the voice signal, the display control section 321 receives a notification representing that the voice signal is detected from the signal acquiring unit 310. Upon receiving the notification, the display control section 321 identifies whether or not the display information displayed on the screen v30 corresponds to voice recognition based on the flag set thereto. Then, the display control section 321 causes display information corresponding to voice recognition to be displayed on the screen v30 to be discernible from display information not corresponding to voice recognition. A concrete example of this operation will be described later as a first example.

Further, when the voice signal is not detected for a certain period of time or more, that is, when there is no notification from the signal acquiring unit 310 for a certain period of time, the display control section 321 may perform a certain operation. Through this configuration, for example, the display control section 321 can detect a state in which the voice signal is not input during a certain period of time as the "case in which the user 1 does not know a word or phrase that can be input by voice" and presents an utterable word or phrase on the screen v30. A concrete example of this operation will be described later as a second example.

Further, the display control section 321 may be configured to control the display of the screen v30 based on the level of the acquired voice signal. In this case, the display control section 321 receives the information representing the level of the voice signal from the content information acquiring unit 323 as the analysis result of the voice signal. Through this operation, the display control section 321 can recognize the level of the voice signal based on sound information received from the content information acquiring unit 323 and perform display control such that the display form of the display information changes according to the level of the voice signal. A concrete example of this operation will be described later as a third example.

Further, the display control section 321 may be configured to perform processing previously associated with a certain keyword when a word or phrase corresponding to the certain keyword is acquired as the voice information. In this case, the display control section 321 receives information representing whether or not the voice information corresponding to the acquired voice signal corresponds to a certain keyword from the content information acquiring unit 323 as the analysis result of the voice signal. Through this operation, the display control section 321 can detect the case in which the voice information corresponds to a certain keyword. Further, the display control section 321 may receive information representing processing corresponding to a keyword together. Through this operation, the display control section 321 can perform the processing associated with the keyword. Through this operation, when an ambiguous word or phrase such as "well . . . " is input, the display control section 321 detects it as the "case in which the user 1 does not know a word or phrase that can be input by voice" and presents an utterable word or phrase on the screen v30. A concrete example of this operation will be described later as the second example.

Further, when a notification representing that the voice signal is detected is received from the signal acquiring unit 310 in the state in which the icon v311 corresponding to certain content is selected, the display control section 321 may cause relevant information associated with the content to be displayed on the screen v30. As a concrete example, when the icon v311 associated with a game is selected as content, the display control section 321 may cause information designating a start menu of the game or save data to be displayed on the screen v30 as the relevant information.

In order to perform this operation, when a notification is received from the signal acquiring unit 310, the display control section 321 extracts information of content associated with the icon v311 that is in the selected state. When the information of the content is extracted, the display control section 321 causes the content information acquiring unit 323 to acquire information associated with the content based on the extracted information. Then, the display control section 321 may generate relevant information based on information acquired by the content information acquiring unit 323 and cause the relevant information to be displayed on the screen v30.

(Content DB 360)

The content DB 360 stores the content in association with attribute information representing attributes of the content. The attribute information is information specifying the content, and specifically, examples of the attribute information include information representing a type of content such as a game, a song, or a moving image and information related to content such as a release date, a singer, and a maker of a distributor. For example, the attribute information may include information representing whether or not content corresponds to voice recognition. Since the attribute information represents whether or not voice recognition is supported, the display control section 321 can determine whether or not voice recognition is supported for the content and switch a display form of display information corresponding to content according to whether or not voice recognition is supported.

(Content Specifying Unit 361)

The content specifying unit 361 extracts information of content satisfying a desired search condition from the content DB 360. Specifically, the content specifying unit 361 acquires a search condition specifying content from the content information acquiring unit 323. The content specifying unit 361 compares the acquired search condition with the attribute information of the content, and extracts content satisfying the search condition from the content DB 360. The content specifying unit 361 outputs information of the extracted content to the content information acquiring unit 323 as the response to the search condition (search result).

Further, the content specifying unit 361 may extract content information using a combination of histories of the voice information stored in the history storage unit 350. For example, the content specifying unit 361 may specify voice information (or a word or phrase included in voice information) that is very frequently used during a certain period of time and extract content corresponding to the voice information from the content DB 360. Through this configuration, the content specifying unit 361 can extract indirectly designated content such as a "song played most last week" or a "moving image watched yesterday."

Further, the content specifying unit 361 may be configured to extract a history of utterances in connection with desired content from the history storage unit 350. Through this configuration, the content specifying unit 361 can extract content uttered by another user in connection with certain content as information associated with corresponding content.

Further, the respective components configuring the display device 100 need not necessarily be implemented as a single device, and for example, the respective components may be connected via a network. As a concrete example, the signal acquiring unit 310, the display control unit 320, and the display unit 102 may be configured as a terminal, and the analyzing unit 330, the dictionary data holding unit 340, the history storage unit 350, the content DB 360, and the content specifying unit 361 may be arranged on a server.

1-4. First Example of First Embodiment 1-4-1. Outline of First Example

Figure 4:
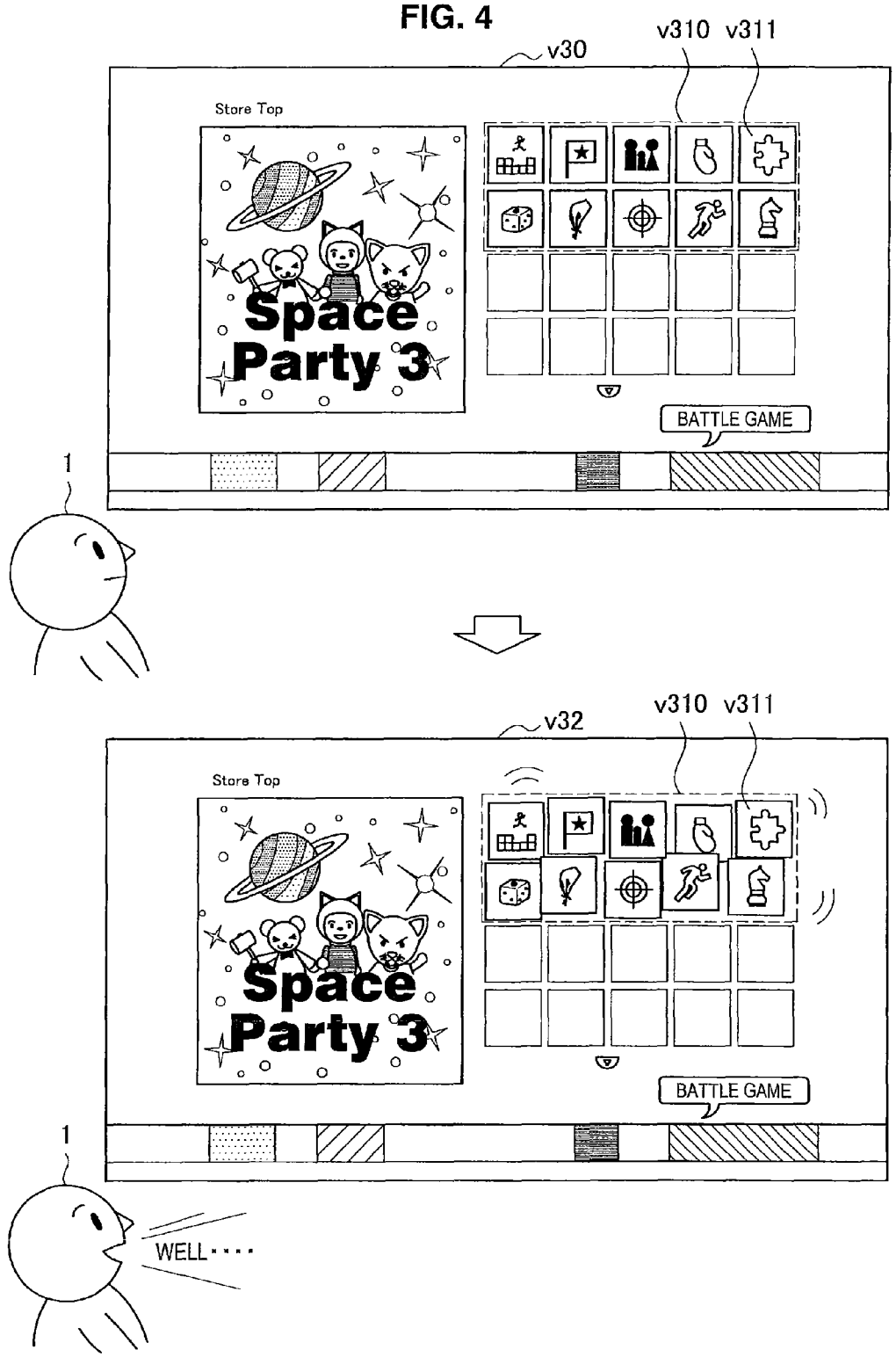
FIG. 4 is a diagram illustrating an exemplary screen according to a first example of the first embodiment.

A concrete example of the information processing apparatus 10 according to the first example of the first embodiment will be described. In the information processing apparatus 10 according to the first example of the present embodiment, when an input of the voice signal is detected, the display control section 321 causes display information operable by voice recognition (that is, corresponding to voice recognition) among pieces of display information displayed on the screen v30 to be intuitively discernible from display information not corresponding to voice recognition. A configuration and an operation of a screen of the information processing apparatus 10 according to the first example of the present embodiment will be described below with reference to FIG. 4. FIG. 4 is a diagram illustrating an exemplary display according to the first example of the present embodiment.

In FIG. 4, a screen v30 is a screen in the state in which the user 1 does not speak, that is, when no voice signal is detected. Further, a screen v32 is a screen in the state in which the user 1 speaks, that is, when a voice signal is detected. In the screens v30 and v32, each icon v311 displayed on a display region v311 is assumed to be associated with content corresponding to voice recognition (that is, a flag corresponding to voice recognition is set to each icon v311).

In the example illustrated in FIG. 4, when no voice signal is detected, the display control section 321 causes the icons v311 corresponding to voice recognition to be displayed side by side, similarly to other display information, as in the screen v30. When a voice signal is detected, the display control section 321 causes display information corresponding to voice recognition such as the icon v311 to be displayed in an animated manner such as vibration as in the screen v32. The display control section 321 continues an animated display while the voice signal is detected and stops the animated display when no voice signal is detected (that is, when the user 1 is finished speaking). In other words, when the user 1 speaks into the sound collecting device 110, display information corresponding to voice recognition operates in response to the utterance by the display control section 321, and thus the user 1 can intuitively recognize display information corresponding to voice recognition.

The display form of the icon v311 in the screen v32 is not limited to the example of FIG. 4. For example, FIGS. 5 to 7 are diagrams illustrating examples of the display form of the icon v311 in the screen v32 according to the first example of the present embodiment.

Figure 5:
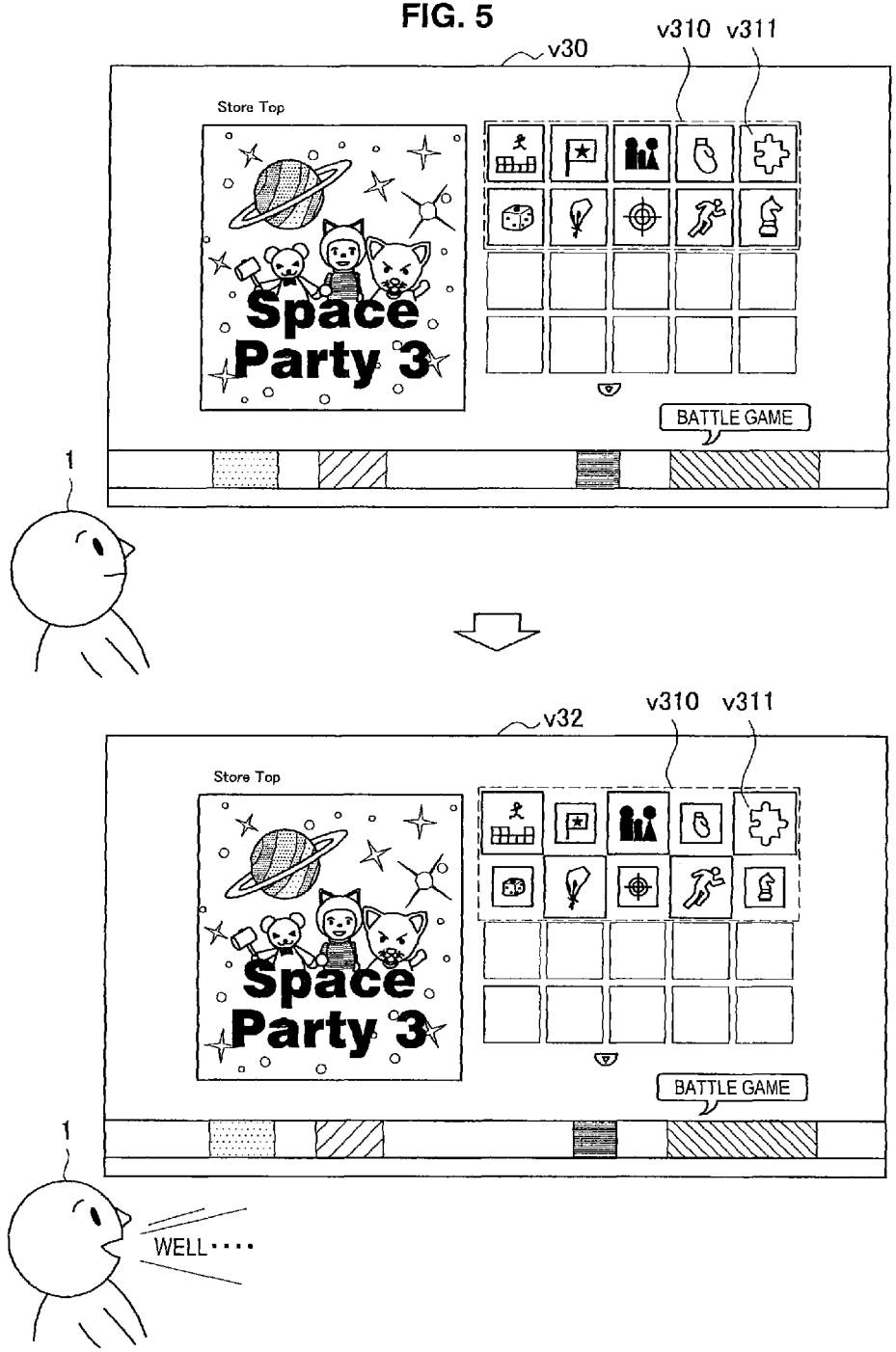
FIG. 5 is a diagram illustrating an exemplary display form of a screen according to the first example of the first embodiment.

For example, when the voice signal is detected, the display control section 321 may highlight display information (for example, the icon v311) corresponding to voice recognition by changing the size or the shape to be different from that before the voice signal is detected as in a screen v32 of FIG. 5.

Figure 6:
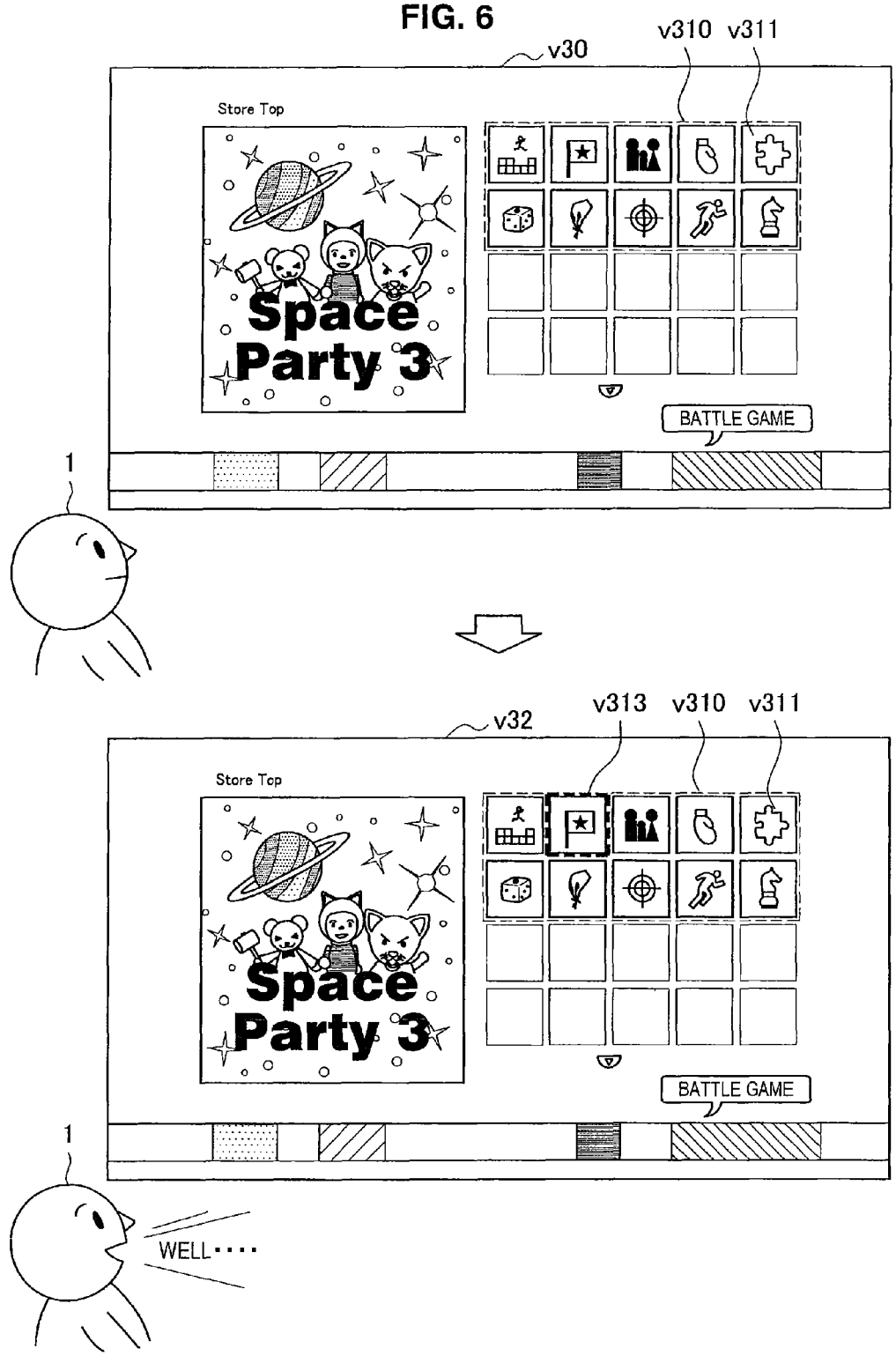
FIG. 6 is a diagram illustrating an exemplary display form of a screen according to the first example of the first embodiment.

As another example, when the voice signal is detected, the display control section 321 may display a marker v313 representing that voice recognition is supported in associated with display information (for example, the icon v311) corresponding to voice recognition as in a screen v32 of FIG. 6. In the example of FIG. 6, the display control section 321 displays a marker 313 such as a frame to overlap the icon v311 corresponding to voice recognition. In this case, the user 1 can intuitively discern between the icon v311 corresponding to voice recognition and other display information not corresponding to voice recognition.

Figure 7:
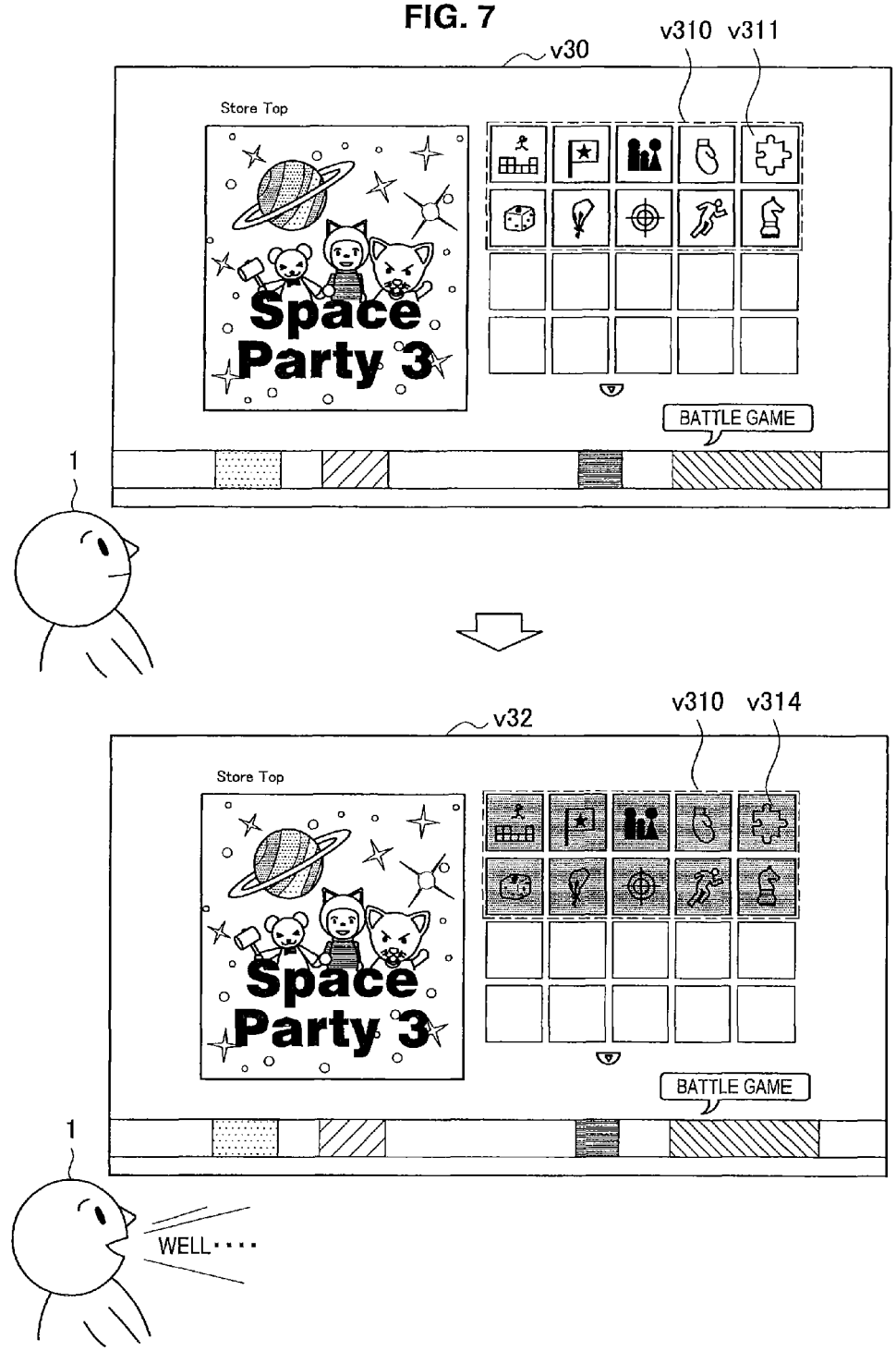
FIG. 7 is a diagram illustrating an exemplary display form of a screen according to the first example of the first embodiment.

As another example, when the voice signal is detected, the display control section 321 may highlight display information (for example, the icon v311) corresponding to voice recognition by changing a color thereof as in a screen v32 of FIG. 7. In the example of FIG. 7, the display control section 321 causes the icon v311 corresponding to voice recognition in the screen v30 to be displayed on the screen v32 with a different color from that before the voice signal is detected such as an icon v314. As a color of display information corresponding to voice recognition is changed from a color before the voice signal is detected as described above, the user 1 can intuitively recognize display information corresponding to voice recognition from other display information not corresponding to voice recognition.

Figure 8:
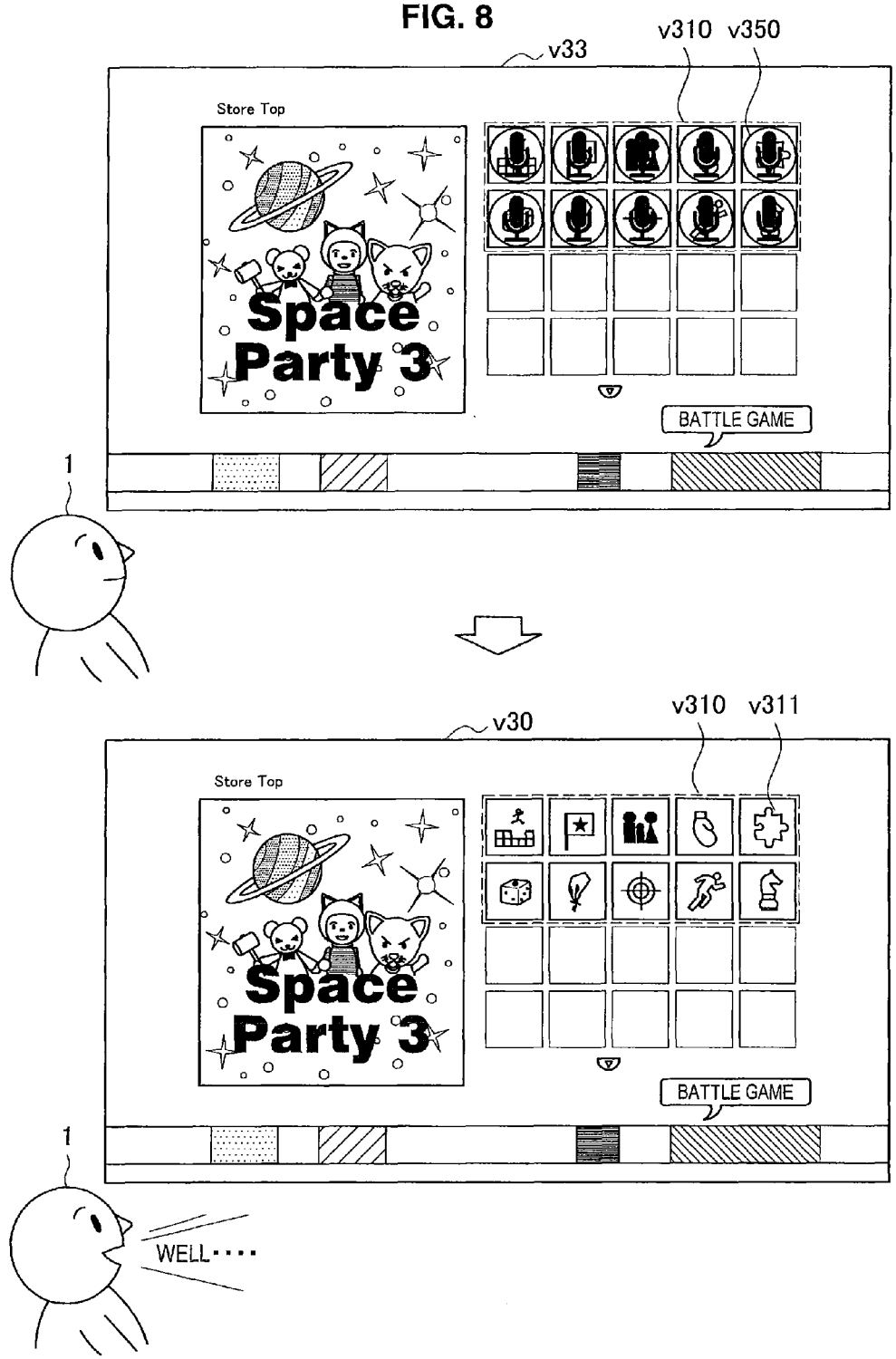
FIG. 8 is a diagram illustrating an exemplary display form of a screen according to the first example of the first embodiment.

Further, even when the voice signal is not detected, the display control section 321 may cause display information (for example, the icon v311) corresponding to voice recognition to be displayed to be discernible from other display information not corresponding to voice recognition. For example, FIG. 8 is a diagram illustrating an example of a display form of a screen according to the first example of the present embodiment. In the example illustrated in FIG. 8, when a screen v30 is displayed, the display control section 321 displays other display information representing that voice recognition is supported to overlap display information corresponding to voice recognition.

In FIG. 8, a screen v33 represents a state immediately after the screen v30 is initially displayed. As in the screen v33 of FIG. 8, when the screen v33 is displayed, the display control section 321 displays display information v350 representing that voice recognition is supported during a certain period of time to overlap each icon v311 corresponding to voice recognition displayed on a region v310. At this time, the display control section 321 may display the display information v350 in an animation manner in order to draw attention of the user 1. The display control section 321 displays the display information v350 during a certain period of time and then displays a screen as in the screen v30. As described above, the display control section 321 may highlight display information corresponding to voice recognition to be discerned from other display information not corresponding to voice recognition at a certain timing as well as when the voice signal is detected.

Further, the display form of the screen v30 is not limited to the above example as long as display information corresponding to voice recognition is discernible from other display information not corresponding to voice recognition. For example, the display control section 321 highlights display information corresponding to voice recognition by causing other display information not corresponding to voice recognition not to be temporarily displayed. Further, when not all display information is displayed on the screen, there are cases in which some display information is hidden outside the screen. In this case, when display information not corresponding to voice recognition is caused not to be displayed, the display control section 321 may cause display information (display information corresponding to voice recognition) hidden outside the screen to be displayed on an empty space.

1-4-2. Operation of First Example

Figure 9:
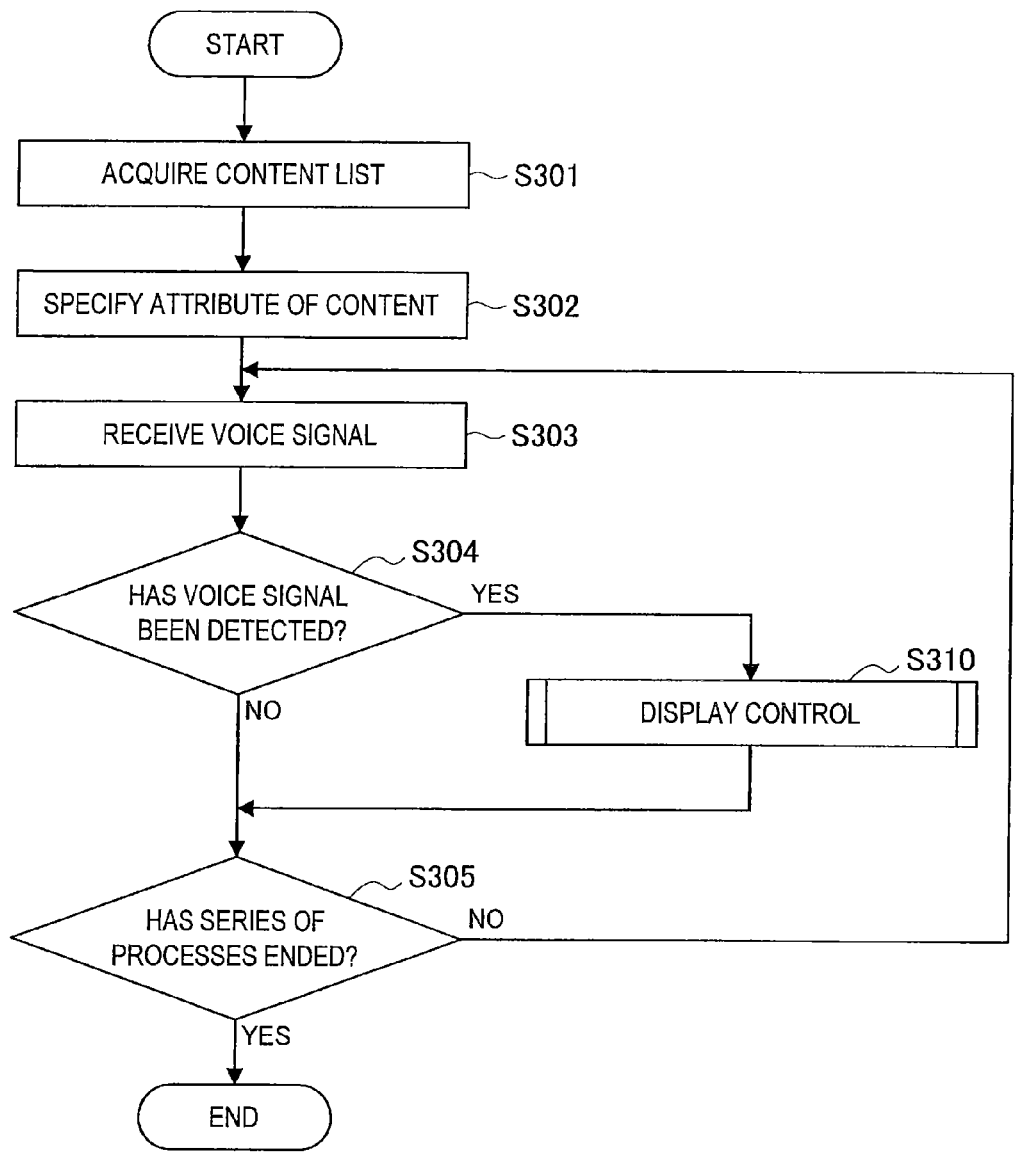
FIG. 9 is a flowchart illustrating an exemplary information display operation of the information processing apparatus according to the first embodiment.
Figure 10:
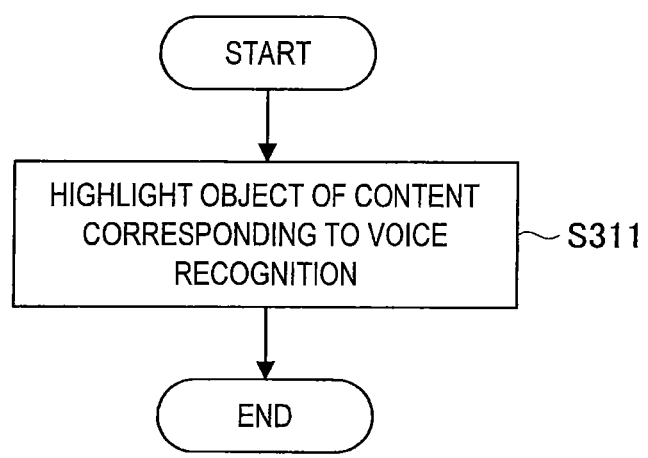
FIG. 10 is a flowchart illustrating an example of display control of the information processing apparatus according to the first example of the first embodiment.

Next, an operation of the information processing apparatus 10 according to the first example of the present embodiment will be described with reference to FIGS. 9 and 10. FIG. 9 will be referred to first. FIG. 9 is a flowchart illustrating an exemplary information display operation of the information processing apparatus 10 according to the present embodiment.

(Step S301)

When the display device 100 is activated, the display control section 321 first generates the screen v30. The parts such as images used to generate the screen v30 may be stored in a component readable by the display control section 321.

Further, the display control section 321 causes the content information acquiring unit 323 to acquire content information based on a predetermined condition.

(Step S302)

The display control section 321 associates the acquired content information with the icon v311. Further, when information representing whether or not voice recognition is supported is set to the acquired content information, the display control section 321 sets the flag representing whether or not recognition is supported to the icon v311 corresponding thereto based on this information.

Further, the display control section 321 may cause certain processing that is decided in advance for each screen such as "display of menu" or "end" to be displayed on the screen v30 in association with corresponding display information. Similarly to the icon v311 corresponding to each content, information representing whether or not voice recognition is supported may be set to display information associated with the certain processing as well. The flag representing whether or not display information corresponding to the certain processing supports voice recognition may be set in advance according to whether or not the processing supports voice recognition.

Further, certain processing of each screen need not necessarily be displayed on the screen v30 as display information. In this case, display information such as a corresponding menu or icon is not displayed on the screen v30, but when a word or phrase corresponding to a certain keyword is input by a voice input, certain processing is performed.

The display control section 321 causes the generated screen v30 to be displayed on the display unit 102.

(Step S303)

When the display device 100 is completely activated and the screen v30 is displayed on the display unit 102, the voice information acquiring unit 331 enters the state in which the voice signal collected by the sound collecting device 110 is received.

(Step S304)

When the sound collecting device 110 collects the voice signal (YES in step S304), the collected voice signal is output from the sound collecting device 110, and the signal acquiring unit 310 detects and acquires the voice signal output from the sound collecting device 110. When the voice signal is detected, the signal acquiring unit 310 notifies the display control section 321 of the display control unit 320 of the detection result.

(Step S310)

Here, content of processing (that is, processing illustrated in step S310) of the display control section 321 when the notification of the detection result is received from the signal acquiring unit 310 will be described with reference to FIG. 10. FIG. 10 is a flowchart illustrating an example of display control of the information processing apparatus 10 according to the first example of the present embodiment.

(Step S311)

When the sound collecting device 110 collects the voice signal, the display control section 321 receives a notification representing that the voice signal is detected from the signal acquiring unit 310. When this notification is received, the display control section 321 determines whether or not the display information displayed on the screen v30 corresponds to voice recognition based on the flag set thereto. Then, the display control section 321 causes display information (for example, the icon v311) corresponding to voice recognition to be displayed on the screen v30 to be discernible from display information not corresponding to voice recognition. Further, when the voice signal is detected, the screen v30 is displayed in the above-described form.

(Steps S304 and S305)

Here, FIG. 9 is referred to again. The state in which the voice signal is received continues until the stop of the display device 100 is selected and thus a series of processes ends (NO in step S304 and NO in step S305). When the stop of the display device 100 is selected, the display device 100 ends and stops a series of processes (YES in step S305)

As described above, when an input of the voice signal is detected, the information processing apparatus 10 according to the first example of the present embodiment highlights display information corresponding to voice recognition, for example, by changing a display form of display information corresponding to voice recognition among display information displayed on the screen v30. Through this operation, display information corresponding to voice recognition is displayed to be discernible from other display information not corresponding to voice recognition. Accordingly, the user 1 can intuitively recognize display information operable by voice recognition among display information displayed on the screen v30.

Further, when an input of the voice signal is detected, a display form of display information is changed such that display information is displayed in an animated manner, and thus it is possible to present the user 1 with the fact that the voice signal is acquired and voice recognition is being performed. This case will be described in detail in the third example.

1-5. Second Example of First Embodiment 1-5-1. Outline of Second Example

Figure 11:
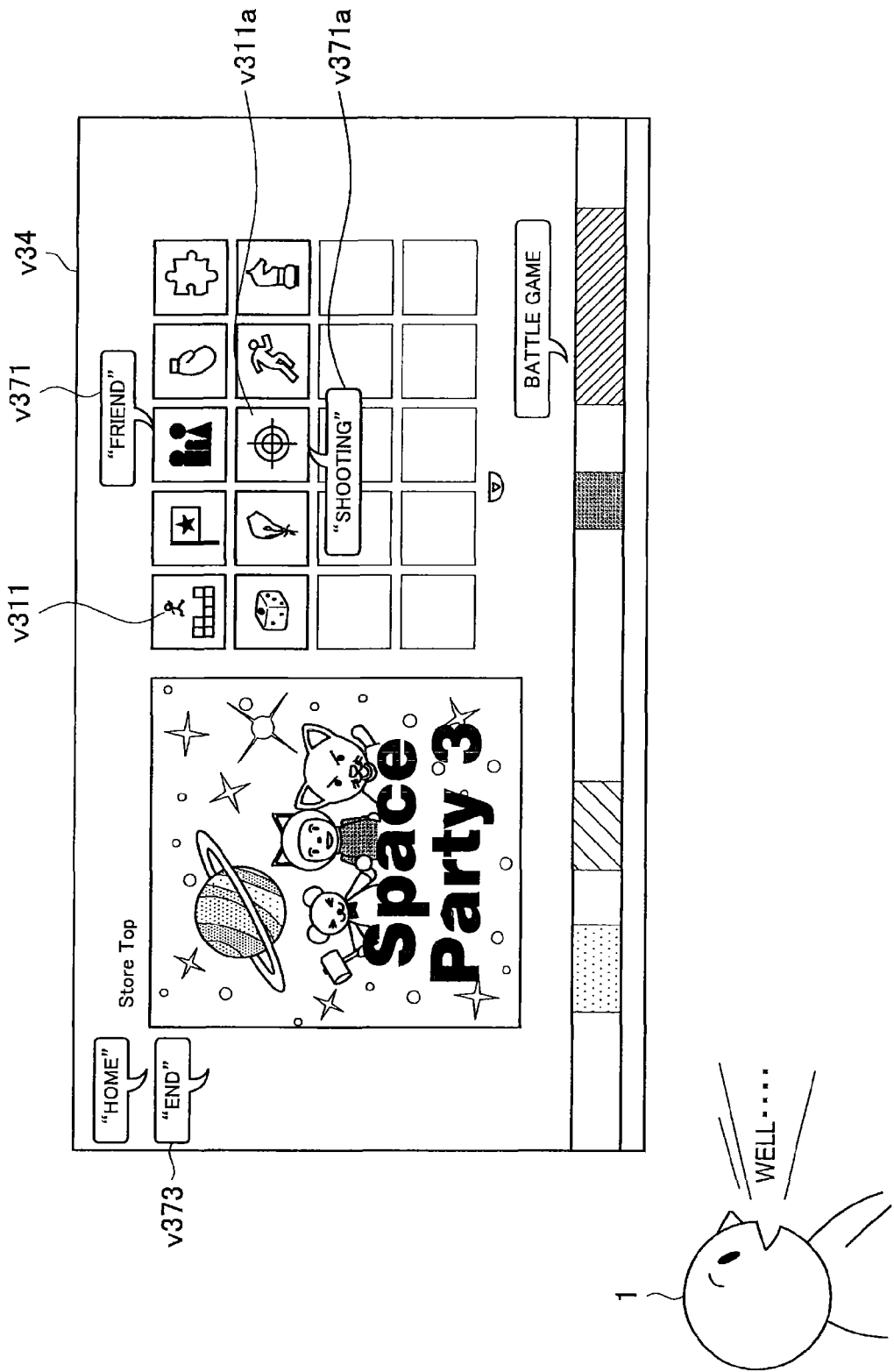
FIG. 11 is a diagram illustrating an example of display control of the information processing apparatus according to the first example of the first embodiment.
Figure 12:
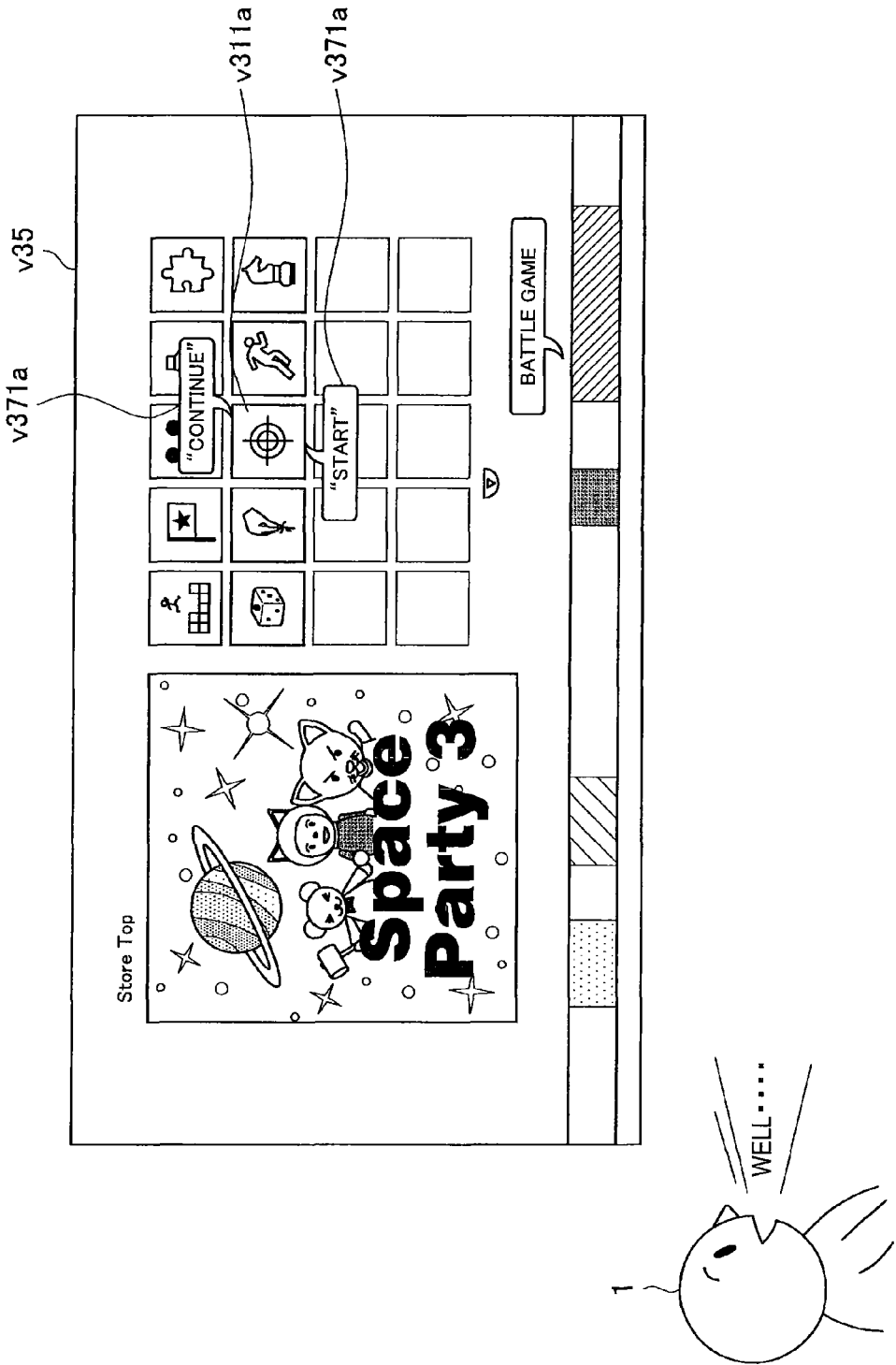
FIG. 12 is a diagram illustrating an example of display control of the information processing apparatus according to the first example of the first embodiment.
Figure 13:
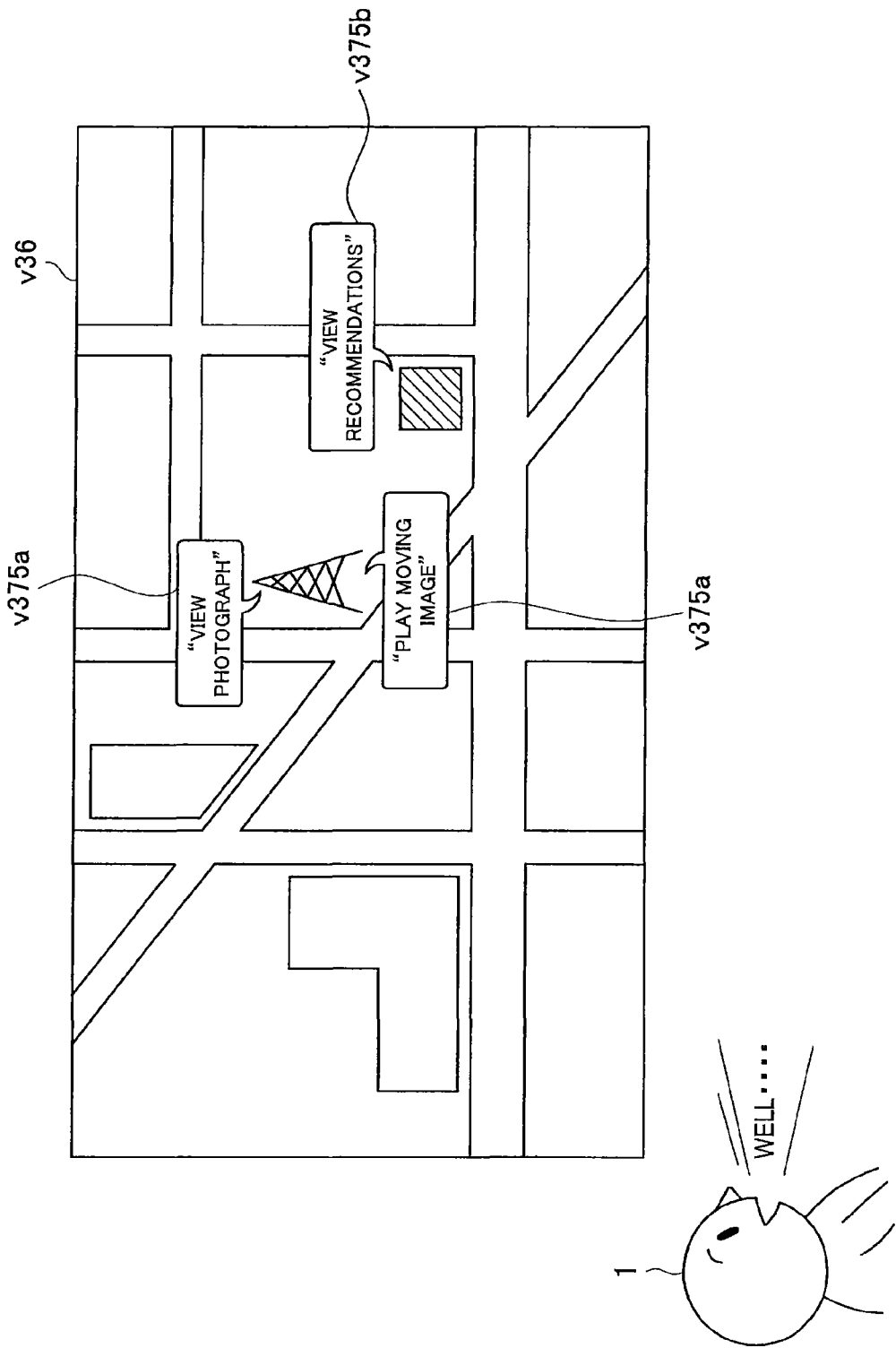
FIG. 13 is a diagram illustrating an exemplary screen according to a second example of the first embodiment.

An exemplary concrete operation of the information processing apparatus 10 according to the second example of the first embodiment will be described. In a user interface (U/I) using a voice input, there are cases in which it is difficult to understand when (for example, in what state) and where to say what with regard to a displayed screen in order to obtain a desired response. In this regard, in the information processing apparatus 10 according to the second example of the present embodiment, the display control section 321 detects the state such as the "case in which the user 1 does not know a word or phrase that can be input by voice" based on the detection status of the voice signal, and presents an utterable word or phrase in association with corresponding display information for reference. A configuration and an operation of a screen of the information processing apparatus 10 according to the second example of the present embodiment will be described below with reference to FIGS. 11 to 13. FIGS. 11 to 13 are diagrams illustrating an exemplary display according to the second example of the present embodiment.

First, an example illustrated in FIG. 11 will be described. A screen v34 illustrated in FIG. 11 is an example of a screen when an utterable word or phrase is presented in association with corresponding display information for reference as relevant information based on the screen v30 (see FIG. 2).

In the example illustrated in FIG. 11, the display control section 321 presents a word or phrase for activating processing corresponding to display information or content for the display information corresponding to voice recognition in the state in which no display information displayed on the screen v34 is selected. Specifically, when the user 1 utters an ambiguous word or phrase such as "well . . . " the display control section 321 presents a word or phrase for operating display information (for example, an icon v371) corresponding to voice recognition on the screen v34 as the relevant information v371.

In the example illustrated in FIG. 11, the display control section 321 presents the word "shooting" on the relevant information v371*a* as a word for activating content corresponding to the icon v311*a*.

Further, the display control section 321 may present a word or phrase representing executable processing for each type of content as the relevant information v371. As a concrete example, in the case of content corresponding to a "movie," the display control section 321 may display the relevant information v371 of a phrase "go to the store" associated with processing for accessing a store selling a movie. Further, when corresponding content is a "song," the display control section 321 may display the relevant information v371 of a phrase "random play" associated with a random play process.

Further, the display control section 321 may present a word or phrase receivable by a voice input such as "home" or "end" as the relevant information v371 even though the corresponding display information is not displayed on the screen v34.

A determination as to whether or not an ambiguous word or phrase such as "well . . . " has been uttered may be performed such that the utterance content analyzing unit 332 determines whether or not the voice information corresponding to the collected voice signal corresponds (identical) to a keyword represented by the ambiguous word or phrase. The determination result by the utterance content analyzing unit 332 is sent to the display control section 321 through the analysis result acquiring unit 322. Through this operation, the display control section 321 can determine whether the user 1 has uttered an ambiguous word or phrase such as "well . . . ."

Further, the display control section 321 may cause the content specifying unit 361 to acquire information of the content presented as the relevant information v371 in advance and associate the acquired information with the icon v311 when the icon v311 is displayed. As another example, the display control section 321 may cause the content specifying unit 361 to acquire information of content corresponding to each icon v311 when it is detected that the user 1 utters an ambiguous word or phrase such as "well . . . " Further, information presented as the relevant information v371 may be stored in advance in a component (for example, a recording medium installed in the display control section 321) readable by the display control section 321.

Next, an example illustrated in FIG. 12 will be described. A screen v35 illustrated in FIG. 12 is an example of a screen when an utterable word or phrase for display information in the selected state is presented in association with corresponding display information for reference as the relevant information based on the screen v30 (see FIG. 2).

In the example illustrated in FIG. 12, the display control section 321 presents a word or phrase representing executable processing for content corresponding to display information in the state in which display information corresponding to voice recognition is selected (hereinafter, referred to as a "selected state"). For example, in FIG. 12, the display control section 321 associates the icon v311a with content corresponding to a game. In this game, it is assumed that there are start menu items such as "start" and "continue" (associated in advance). In this case, when the user 1 utters an ambiguous word or phrase such as "well . . . " the display control section 321 may present a start menu for activating a game corresponding to the icon v311 in the selected state, that is, "start" and "continue," as the relevant information v371a.

Further, the information displayed as the relevant information v371 is not limited to a start menu of corresponding content. For example, when the icon v311 corresponds to a music player, the display control section 321 may present a playable music list as the relevant information v371 based on a previously generated play list. As another example, the display control section 321 may present an operation executable by corresponding content such as "play music" or "go to the store." The relevant information may be stored in the content DB 360 in association with the content. The display control section 321 preferably causes the content specifying unit 361 to specify information related to desired content among information of respective content stored in the content DB 360 through the content information acquiring unit 323.

The examples illustrated in FIGS. 11 and 12 may be applied to an existing application. For example, a screen v36 illustrated in FIG. 13 represents an example applied to a map application. In the example illustrated in FIG. 13, the display control section 321 presents a word or phrase representing an executable operation as the relevant information v375 for reference in association with a corresponding position in connection with a position (for example, a position of a building or the like) corresponding to voice recognition in a map displayed on the screen v36.

For example, a photograph or a moving image captured at a certain position may be stored in advance, and the display control section 321 may display a phrase such as "view photograph" or "play moving image" associated with an operation for referring to the photograph or the moving image in association with a corresponding position as relevant information v375a. Further, when a corresponding position is a restaurant, the display control section 321 may display a phrase such as "view recommendations" associated with an operation for displaying recommended dishes of the restaurant in association with the corresponding position as relevant information v375b. Further, information (a word or phrase) displayed as the relevant information v375a and v375b or content (for example, a photograph, a moving image, or a menu) displayed as processing corresponding to the relevant information v375a and v375b is performed may be stored in the content DB 360 in association with the positional information. In this case, the display control section 321 may cause the content specifying unit 361 to acquire information (a word or phrase) or content displayed as the relevant information v375a and v375b using positional information as a search key through the content information acquiring unit 323. Hereinafter, the relevant information v371, v373, and v375 may be described as simply "relevant information" when it is unnecessary to particularly distinguish them.

In the examples illustrated in FIGS. 11 to 13, when the user 1 utters an ambiguous word or phrase such as "well . . . " the relevant information is displayed, but the present embodiment is not necessarily limited to this method. For example, there may be cases in which the user 1 is thinking but not speaking when the user 1 does not know a word or phrase that can be input by voice. For this reason, when there is a silence for a certain period of time (that is, when no voice signal is detected), the display control section 321 may display the relevant information. In this case, when there is no notification from the signal acquiring unit 310 for a certain period of time, it is preferable that the display control section 321 display the relevant information.

Further, the number of pieces of information displayed as the relevant information may be appropriately changed. For example, when a certain number or more of pieces of display information corresponding to voice recognition are displayed, the display control section 321 may display the relevant information a certain number at a time (for example, one at a time) instead of displaying all pieces of relevant information in order to prevent a screen from becoming complicated. In this case, a keyword (for example, "help") causing all pieces of relevant information to be displayed may be decided in advance. Further, the display control section 321 may cause a number of pieces of the relevant information that does not cause a screen to become complicated to be consecutively displayed at a timing at which the screen is initially displayed as a tutorial.

Further, content uttered by another user may be stored in the history storage unit 350 as history in connection with content, and the display control section 321 may cause the history to be displayed as the relevant information. In this case, it is preferable that the content specifying unit 361 search for and extract history corresponding to content instructed by the display control section 321 from the history storage unit 350. Further, the utterance content analyzing unit 332 may store the voice information in the history storage unit 350 in association with information representing content that is in an activated state at that time. Through this operation, the content specifying unit 361 can determine content in the activated state when each item of the history is uttered.

Further, the display control section 321 may cause display information not corresponding to voice recognition not to be displayed when the relevant information is displayed. Further, in order to efficiently use a region in which display information in the non-display state has been displayed, the display control section 321 may adjust the layout of display information and relevant information displayed on the screen and display the information. Through this configuration, the display control section 321 can prevent a screen from becoming complicated even when displayed information increases as the relevant information is displayed.

1-5-2. Operation of Second Example

Figure 14:
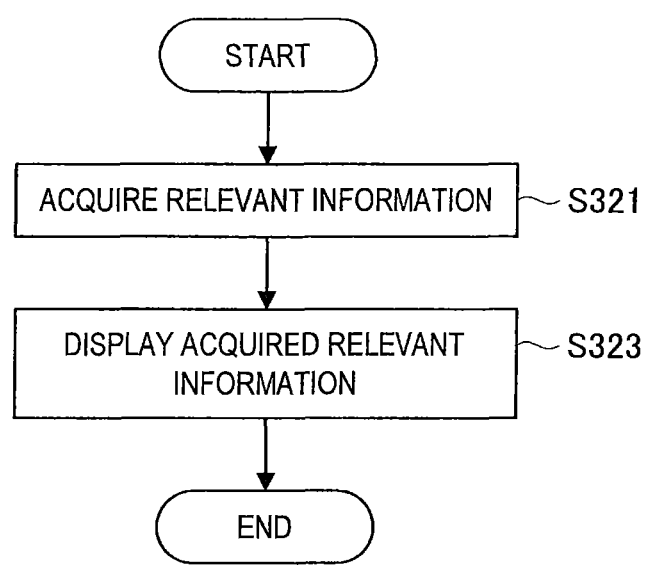
FIG. 14 is a flowchart illustrating an example of display control of the information processing apparatus according to the second example of the first embodiment.

Next, an operation of the display device 100 according to the second example of the first embodiment will be described with reference to FIG. 14 focusing on a display control operation different in processing from the first example using the example of the screen v34 illustrated in FIG. 11. FIG. 14 is a flowchart illustrating an example of display control of the information processing apparatus 10 according to the second example of the present embodiment. The process excluding the display control described in step S310 in the flowchart illustrated in FIG. 9 is the same as in the first example, and thus a detailed description thereof will be omitted.

(Step S321)

When the sound collecting device 110 collects the voice signal, the display control section 321 receives a notification representing that the voice signal is detected from the signal acquiring unit 310. When this notification is received, the display control section 321 acquires information representing whether or not the user 1 has uttered a certain word or phrase (an ambiguous word or phrase) such as "well . . . " from the utterance content analyzing unit 332 of the analyzing unit 330 through the analysis result acquiring unit 322. When it is detected that the user 1 has uttered a certain word or phrase, the display control section 321 causes the content information acquiring unit 323 to acquire information of content associated with the icon v311 for each icon v311 displayed on the screen v34 as the relevant information v371.

Further, a factor by which the display control section 321 causes the content information acquiring unit 323 to acquire the relevant information v371 is not particularly limited. For example, the display control section 321 may cause the content information acquiring unit 323 to acquire the relevant information v371 in advance at a timing at which the icon v311 is initially displayed, and the display control section 321 may cause the content information acquiring unit 323 to acquire the relevant information v371 at a timing at which an ambiguous word or phrase uttered by the user 1 is detected.

(Step S323)

The display control section 321 causes the relevant information v371 acquired by the content information acquiring unit 323 to be displayed on the screen v34 in association with the corresponding icon v311. At this time, the display control section 321 causes corresponding display information not to be displayed on the screen v34, but may present a word or phrase receivable by a voice input such as "home" or "end" as the relevant information v371.

As described above, the information processing apparatus 10 according to the second example of the present embodiment presents display information corresponding to an utterable word or phrase for reference based on the detection status of the voice signal. Thus, the user 1 can recognize when and where to say what with regard to a displayed screen in order to obtain a desired response.

1-6. Third Example of First Embodiment

1-6-1. Outline of Third Example

An exemplary concrete operation of the information processing apparatus 10 according to the third example of the first embodiment will be described. In a UI using voice recognition, there are cases in which voice recognition fails and the user does not understand why voice recognition fails. One of the reasons for which voice recognition fails is that an input level of the voice signal is higher or lower than a level suitable for a voice recognition engine. In this regard, in the information processing apparatus 10 according to the third example of the present embodiment, the display control section 321 give feedback in an identifiable manner on whether or not the level of the voice signal collected by the sound collecting device 110 is appropriate. Next, a configuration and an operation of a screen of the information processing apparatus 10 according to the third example of the present embodiment will be described with reference to FIGS. 15A to 15C. FIGS. 15A to 15C are diagrams illustrating an exemplary display according to the third example of the present embodiment.

A screen v38 illustrated in FIG. 15B represents a screen when the level of the voice signal uttered by the user 1 is the level appropriate for the voice recognition engine. In the example illustrated in FIG. 15B, when the level of the voice signal collected by the sound collecting device 110 is included within a certain range (that is, represents the level appropriate for the voice recognition engine), the display control section 321 causes certain display information to be displayed in a different form from the case where no voice signal is collected.

Display information v318 illustrated in FIG. 15B represents a state in which certain display information is displayed in a predetermined display form when the level of the voice signal is included within a certain range. As a concrete example, in the example illustrated in FIG. 15B, the display control section 321 causes certain display information to be displayed as the display information v318 in an animated manner as if it were waving in the wind. At this time, the display control section 321 preferably causes the display information v318 to be displayed in a display form in which it is intuitively understood that the level of the collected voice signal represents the level appropriate to perform voice recognition.

Further, certain display information may be displayed in a different form from the case where no voice signal is collected, and in this case, the user 1 can recognize that the voice signal is acquired and voice recognition is being performed.

A screen v37 illustrated in FIG. 15A represents a screen when the level of the voice signal uttered by the user 1 is smaller than the level appropriate for the voice recognition engine. In the example illustrated in FIG. 15A, when the level of the voice signal collected by the sound collecting device 110 is lower than the level of the certain range (that is, lower than the level appropriate for the voice recognition engine), the display control section 321 causes certain display information to be displayed in a form different from the display information v318.

Display information v317 illustrated in FIG. 15A represents a state in which certain display information is displayed in a predetermined display form when the level of the voice signal is lower than the level of the certain range (that is, lower than a certain threshold value). As a concrete example, in the example illustrated in FIG. 15A, the display control section 321 causes certain display information to be displayed as the display information v317 in an animated manner as if it were waving in the wind more lightly than that for the display information v318. At this time, the display control section 321 preferably causes the display information v317 to be displayed in a display form in which it is intuitively understood that the level of the collected voice signal is lower than the level appropriate to perform voice recognition.

A screen v39 illustrated in FIG. 15C represents a screen when the level of the voice signal uttered by the user 1 is higher than the level appropriate for the voice recognition engine. In the example illustrated in FIG. 15C, when the level of the voice signal collected by the sound collecting device 110 is higher than the level of the certain range (that is, higher than the level appropriate for the voice recognition engine), the display control section 321 causes certain display information to be displayed in a form different from the display information v318.

Display information v319 illustrated in FIG. 15C represents a state in which certain display information is displayed in a predetermined display form when the level of the voice signal is higher than the level of the certain range (that is, higher than a certain threshold value). As a concrete example, in the example illustrated in FIG. 15C, the display control section 321 causes the display information v319 to be displayed in an animated manner as if certain display information were being deformed by large force (for example, crumpled). At this time, the display control section 321 preferably causes the display information v319 to be displayed in a display form in which it is intuitively understood that the level of the collected voice signal is higher than the level appropriate to perform voice recognition.

Figure 16A:
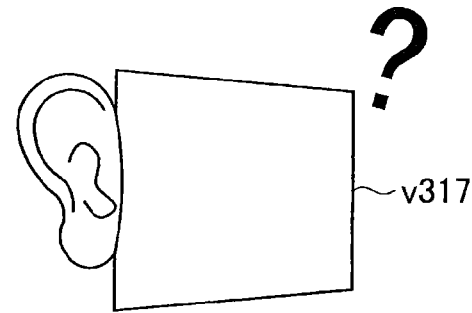
FIG. 16A is a diagram illustrating an exemplary display according to the third example of the first embodiment.
Figure 16B:
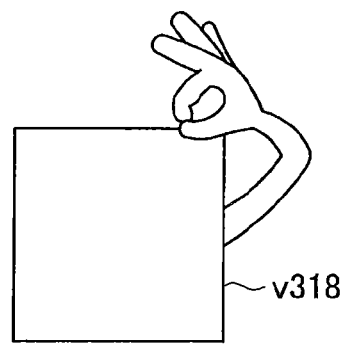
FIG. 16B is a diagram illustrating an exemplary display according to the third example of the first embodiment.

Further, examples illustrated in FIGS. 16A to 16 represent different forms of the display information v317, v318, and v319. In the example illustrated in FIG. 16B, when the level of the voice signal is included in a certain range, the display control section 321 causes the display information v318 to be displayed in the display form in which certain display information simulates an OK mark. As the display information v318 is displayed as described above, the user 1 can intuitively recognize that the level of the voice signal is appropriate.

Further, when the level of the voice signal is lower than the level of the certain range, the display control section 321 causes the display information v317 to be displayed in a display form in which certain display information simulates an operation of a person bending an ear when a volume is small as illustrated in FIG. 16A. As the display information v317 is displayed as described above, the user 1 can intuitively recognize that the level of the voice signal is lower than the level appropriate to perform voice recognition.

Figure 16C:
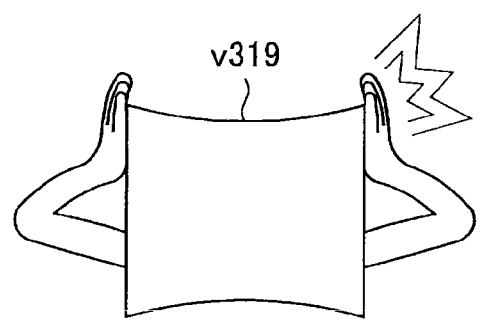
FIG. 16C is a diagram illustrating an exemplary display according to the third example of the first embodiment.

Further, when the level of the voice signal is higher than the level of the certain range, the display control section 321 causes the display information v319 to be displayed in a display form in which certain display information simulates an operation of a person covering his or her ears when a volume is large as illustrated in FIG. 16C. As the display information v319 is displayed as described above, the user 1 can intuitively recognize that the level of the voice signal is lower than the level appropriate to perform voice recognition.

As described above, the information processing apparatus 10 according to the third example of the present embodiment causes certain display information to be displayed in a different display form according to whether or not the level of the voice signal collected by the sound collecting device 110 is included within a certain range. Thus, the user 1 can intuitively recognize whether or not the level of the uttered voice signal is appropriate according to a display form. Further, whether or not the level of the uttered voice signal is appropriate is presented as a display form of certain display information other than text information, and thus it is possible even for users who use different languages to similarly recognize whether or not the level of the uttered voice signal is appropriate.

Further, display information corresponding to voice recognition such as the icon v311 (see FIG. 5) in the first example may be used as display information whose display form changes according to the level of the voice signal. As another example, dedicated display information for giving feedback on whether or not the level of the voice signal is appropriate may be used.

In the above example, the display control section 321 compares the level of the acquired voice signal with the certain threshold value and decides one of three types of display forms which is to be displayed, but the display form is not limited to the above example as long as it is possible to determine whether or not the level of the voice signal is appropriate. For example, the display control section 321 may cause certain display information to be displayed such that a display form continuously changes according to the level of the acquired voice signal.

1-6-2. Operation of Third Example

Figure 17:
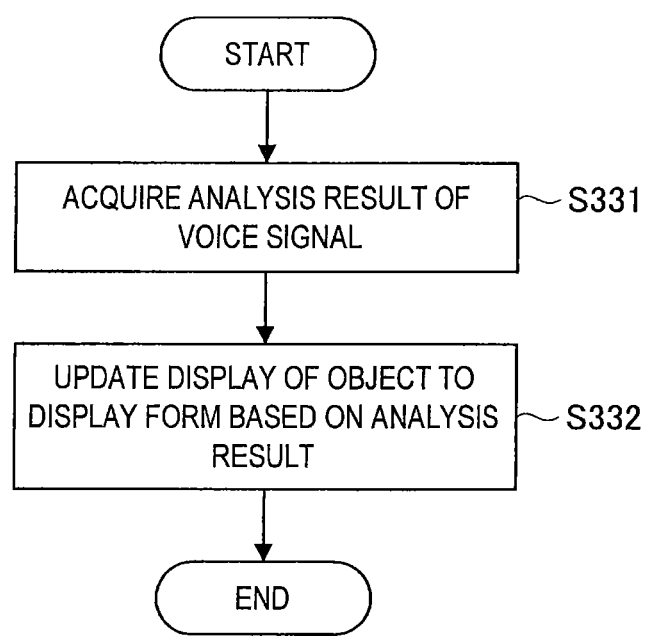
FIG. 17 is a flowchart illustrating an example of display control of the information processing apparatus according to the third example of the first embodiment.

Next, an operation of the display device 100 according to the third example of the first embodiment will be described with reference to FIG. 17 focusing on a display control operation different in processing from the first example. FIG. 17 is a flowchart illustrating an example of display control of the information processing apparatus 10 according to the third example of the present embodiment. The process excluding the display control described in step S310 in the flowchart illustrated in FIG. 9 is the same as in the first example, and thus a detailed description thereof will be omitted.

(Step S331)

When the sound collecting device 110 collects the voice signal, the display control section 321 receives a notification representing that the voice signal is detected from the signal acquiring unit 310. When this notification is received, the display control section 321 acquires information representing the level of the acquired voice signal from the level analyzing unit 333 of the analyzing unit 330 as the analysis result of the voice signal through the analysis result acquiring unit 322.

(Step S332)

The display control section 321 determines whether or not the level of the voice signal acquired as the analysis result is included within a certain range, and specifies a display form according to a determination result. The display control section 321 updates a display of certain display information so that a display is performed in the specified display form. Through this operation, for example, when the level of the acquired voice signal is included within the certain range, the certain display information is displayed in the display form represented by the display information v318 of FIGS. 15A to 15C or FIGS. 16A to 16C. Further, when the level of the acquired voice signal is lower than the level of the certain range, the certain display information is displayed in the display form represented by the display information v317 of FIGS. 15A to 15C or FIGS. 16A to 16C. Similarly, when the level of the acquired voice signal is higher than the level of the certain range, the certain display information is displayed in the display form represented by the display information v319 of FIGS. 15A to 15C or FIGS. 16A to 16C.

As described above, the information processing apparatus 10 according to the third example of the present embodiment measures the level of the voice signal, and gives feedback in an identifiable manner on whether or not the level of the collected voice signal is appropriate according to a measurement result. Through this configuration, it is possible to improve a voice recognition rate by encouraging the user 1 to adjust a volume of his or her speaking voice.

1-7. Conclusion of First Embodiment

The configuration and the concrete embodiment of the information processing apparatus 10 according to the first embodiment have been described above. As described above, in the information processing apparatus 10 according to the first embodiment, when an input of the voice signal is detected, among pieces of display information displayed on a screen, display information corresponding to voice recognition is displayed to be discernible from other display information not corresponding to voice recognition. Through this configuration, the user 1 can intuitively recognize display information operable by voice recognition among pieces of display information displayed on the screen.

Further, the information processing apparatus 10 according to the present embodiment presents an utterable word or phrase in association with corresponding display information based on the detection status of the voice signal for reference. Through this operation, the user 1 can recognize where and when to say what with regard to a displayed screen in order to obtain a desired response.

Furthermore, the information processing apparatus 10 according to the present embodiment measures the level of the voice signal, and gives feedback in an identifiable manner on whether or not the level of the collected voice signal is appropriate according to a measurement result. Through this configuration, it is possible to improve a voice recognition rate by encouraging the user 1 to adjust a volume of his or her speaking voice.

Further, the operation of each component can be implemented by a program operating a central processing unit (CPU) of the information processing apparatus 10. The program may be configured to be executed through an operating system (OS) installed in the apparatus. Further, the location in which the program is stored is not limited as long as the program is readable by an apparatus including the above described components. For example, the program may be stored in a storage medium connected from the outside of the apparatus. In this case, when the storage medium storing the program is connected to the apparatus, the program may be executed by the CPU of the apparatus.

2. Second Embodiment of Present Disclosure

2-1. Outline of Second Embodiment

First, an outline of the second embodiment of the present disclosure will be described. The information processing apparatus 10 according to the second embodiment of the present disclosure has an overall configuration illustrated in FIG. 1, similarly to the first embodiment. The information processing apparatus 10 according to the second embodiment of the present disclosure analyzes a sound collected by the sound collecting device 110 through the display device 100, and performs various processes using the analysis result through the display device 100. Examples of the process using the analysis result of the sound collected by the sound collecting device 110 include a display process of causing text converted from the sound collected by the sound collecting device 110 to be displayed on the display unit 102, a process of executing a program based on the sound collected by the sound collecting device 110, and an Internet search process based on the sound collected by the sound collecting device 110.

Further, the information processing apparatus 10 according to the second embodiment of the present disclosure performs a voice recognition process of causing the user 1 to feel as if processing is being performed in real time without causing the user 1 to have a feeling of having to wait until processing is performed based on uttered content after the user 1 speaks into the sound collecting device 110. In the information processing apparatus 10 according to an embodiment of the present disclosure which will be described below, processing involving visual feedback is performed as the voice recognition process of causing the user to feel as if processing is performed in real time.

The outline of the second embodiment of the present disclosure has been described above. Next, an exemplary functional configuration of the information processing apparatus 10 according to the second embodiment of the present disclosure will be described.

2-2. Configuration of Second Embodiment

Figure 18:
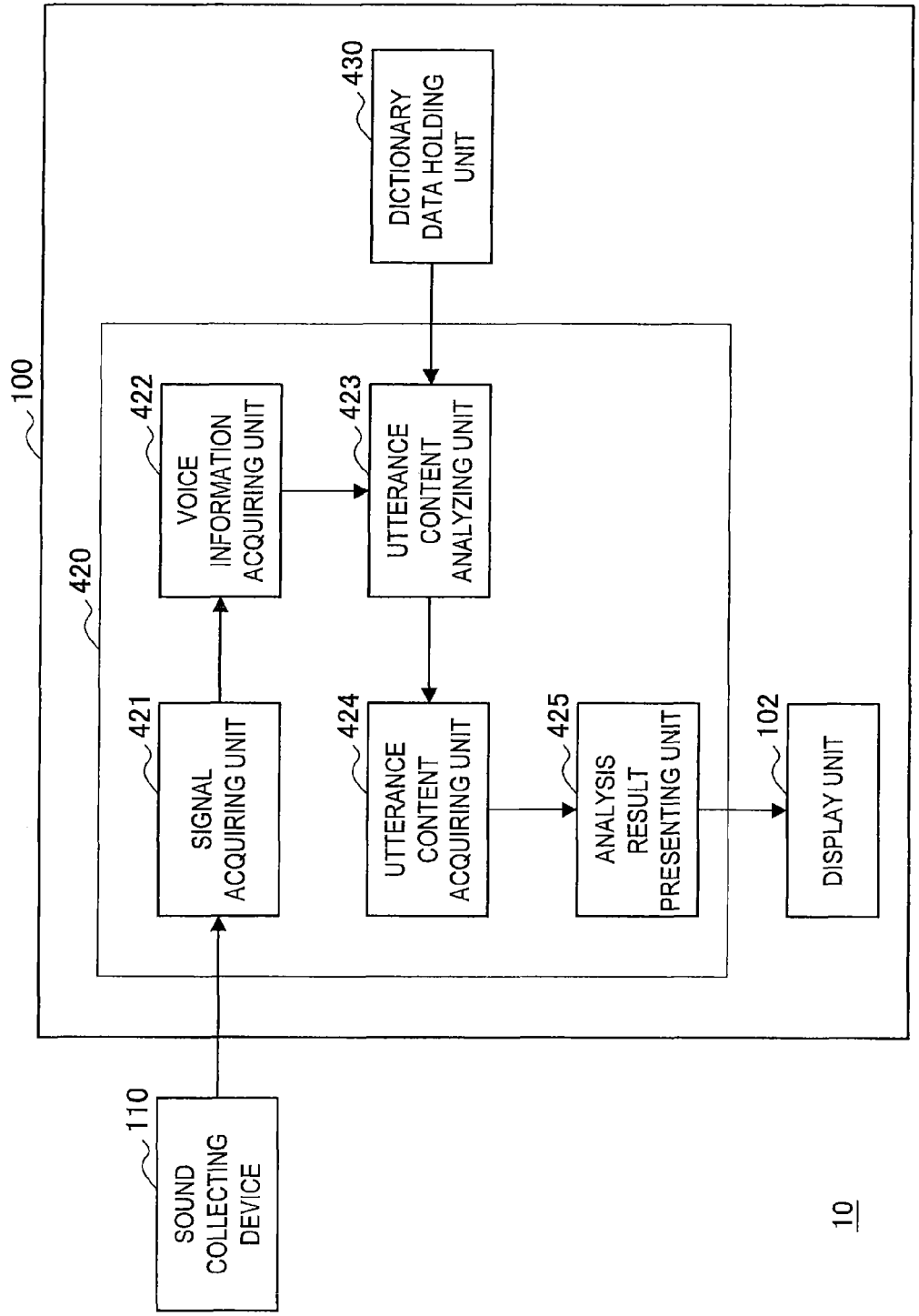
FIG. 18 is an explanatory diagram illustrating an exemplary functional configuration of an information processing apparatus 10 according to an embodiment of the present disclosure.

FIG. 18 is an explanatory diagram illustrating an exemplary functional configuration of the information processing apparatus 10 according to the second embodiment of the present disclosure. The exemplary functional configuration of the information processing apparatus 10 according to the second embodiment of the present disclosure will be described below with reference to FIG. 18.

The information processing apparatus 10 according to an embodiment of the present disclosure includes a sound collecting device 110, a display control unit 420, a dictionary data holding unit 430, and a display unit 102 as illustrated in FIG. 18. In the example illustrated in FIG. 18, both the display control unit 420 and the display unit 102 are equipped in the display device 100.

(Display Control Unit 420)

The display control unit 420 controls an operation of the display device 100, and is configured with a processor such as a CPU. The display control unit 420 includes a signal acquiring unit 421, a voice information acquiring unit 422, an utterance content analyzing unit 423, an utterance content acquiring unit 424, and an analysis result presenting unit 425 as illustrated in FIG. 18.

The sound collecting device 110 is a device that collects a sound as described above, and is, for example, a device that collects content uttered by the user 1. The sound collected by the sound collecting device 110 is transmitted to the display control unit 420 of the display device 100 as the voice information, and the display control unit 420 analyzes content of the sound collected by the sound collecting device 110.

(Signal Acquiring Unit 421)

The signal acquiring unit 421 acquires the voice signal including the sound collected by the sound collecting device 110 from the sound collecting device 110. The signal acquiring unit 421 supplies the acquired voice signal to the voice information acquiring unit 422.

(Voice Information Acquiring Unit 422)

The voice information acquiring unit 422 acquires the voice signal supplied from the signal acquiring unit 421 as the voice information. When the voice signal supplied from the signal acquiring unit 421 is acquired as the voice information, the voice information acquiring unit 422 supplies the acquired voice information to the utterance content analyzing unit 423 as necessary.

(Utterance Content Analyzing Unit 423)

The utterance content analyzing unit 423 sequentially analyzes the voice signal that is collected by the sound collecting device 110 and supplied from the voice information acquiring unit 422. The utterance content analyzing unit 423 analyzes the sound collected by the sound collecting device 110, and obtains information of the sound such as a volume, a frequency, an uttering time, a word, and phonemes. The utterance content analyzing unit 423 may use dictionary data held in the dictionary data holding unit 430 when analyzing content of the sound collected by the sound collecting device 110. Upon obtaining information by analysis of the sound collected by the sound collecting device 110, the utterance content analyzing unit 423 sequentially supplies the information to the utterance content acquiring unit 424.

(Utterance Content Acquiring Unit 424)

The utterance content acquiring unit 424 sequentially acquires the analysis result of the utterance content analyzing unit 423 that is sequentially supplied from the utterance content analyzing unit 423. When the results sequentially analyzed by the utterance content analyzing unit 423 are sequentially acquired, the utterance content acquiring unit 424 sequentially supplies the sequentially acquired analysis results to the analysis result presenting unit 425.

(Analysis Result Providing Unit 425)

The analysis result presenting unit 425 converts the information that is obtained by analysis performed by the utterance content analyzing unit 423 and sequentially supplied from the utterance content acquiring unit 424 into an appropriate format, and causes the converted information to be displayed on the display unit 102. In an existing general voice recognition, content of an utterance obtained from the beginning to the end of the speaker's speech is analyzed, and information of an uttered word or sentence that is the analysis result is presented after the analysis is completed. In the information processing apparatus 10 according to the second embodiment of the present disclosure, even while the user 1 is speaking into the sound collecting device 110, the analysis result presenting unit 425 sequentially obtains information associated with the utterance from the utterance content acquiring unit 424, and causes the obtained information to be displayed on the display unit 102.

As described above, information associated with the utterance is displayed on the display unit 102 even while the user 1 is speaking into the sound collecting device 110, and thus the information processing apparatus 10 according to the second embodiment of the present disclosure can perform the voice recognition process of causing the user to feel as if processing is being performed in real time without causing the user 1 to have a feeling of having to wait.

(Dictionary Data Holding Unit 430)

The dictionary data holding unit 430 holds dictionary data used when the utterance content analyzing unit 423 analyzes a sound as described above. For example, the dictionary data holding unit 430 holds information such as notation, reading, and a part of speech on various words. As will be described later, the dictionary data held in the dictionary data holding unit 430 may be used when the analysis result presenting unit 425 generates information.

The exemplary functional configuration of the information processing apparatus 10 according to the second embodiment of the present disclosure has been described above with reference to FIG. 18. Next, an exemplary operation of the information processing apparatus 10 according to the second embodiment of the present disclosure will be described.

2-3. Operation of Second Embodiment

Figure 19:
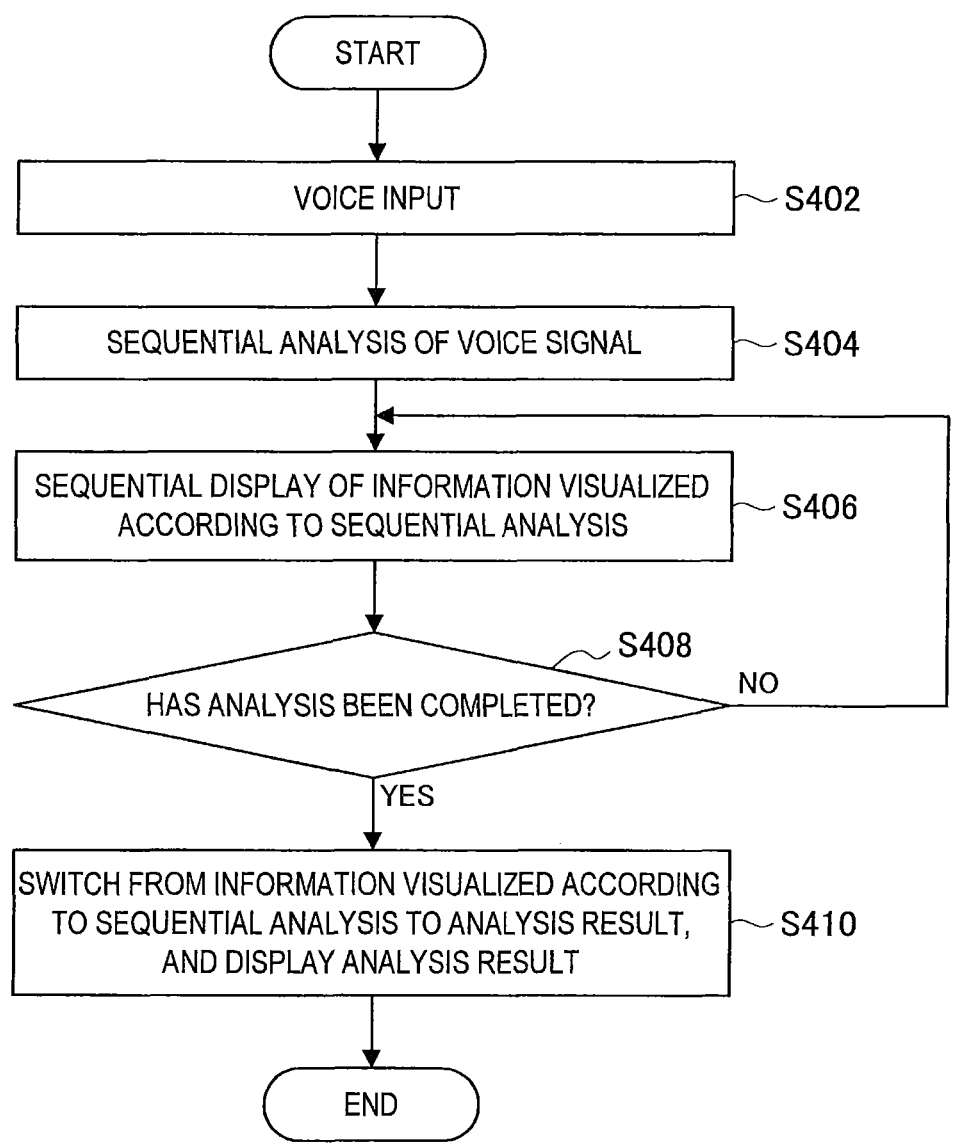
FIG. 19 is a flowchart illustrating an exemplary operation of the information processing apparatus 10 according to a second embodiment.

FIG. 19 is a flowchart illustrating an exemplary operation of the information processing apparatus 10 according to the second embodiment of the present disclosure. The flowchart illustrated in FIG. 19 illustrates an exemplary operation of the information processing apparatus 10 according to the second embodiment of the present disclosure that sequentially acquires information by analysis of the voice information obtained by sound collection of the sound collecting device 110 and sequentially displays information based on the information obtained by the analysis of the voice information. An exemplary operation of the information processing apparatus 10 according to the second embodiment of the present disclosure will be described with reference to FIG. 19.

When the user 1 speaks into the sound collecting device 110, the sound collected by the sound collecting device 110 is supplied to the signal acquiring unit 421 as the voice signal, and the voice information is input from the signal acquiring unit 421 to the voice information acquiring unit 422 (step S402).

When the sound collected by the sound collecting device 110 is supplied to the signal acquiring unit 421 as the voice signal and the voice information is input from the signal acquiring unit 421 to the voice information acquiring unit 422 in step S402, the utterance content analyzing unit 423 sequentially analyzes the voice signal that is collected by the sound collecting device 110 and supplied from the voice information acquiring unit 422 (step S404). When the voice signal is sequentially analyzed, the utterance content analyzing unit 423 sequentially supplies information obtained by the analysis to the utterance content acquiring unit 424. When the user 1 continuously speaks while the utterance content analyzing unit 423 is analyzing the voice signal in step S304, the sound collecting device 110 collects a sound uttered by the user 1, and supplies the sound to the signal acquiring unit 421.

When the utterance content analyzing unit 423 sequentially analyzes the voice signal and sequentially supplies the information obtained by the analysis to the utterance content acquiring unit 424 in step S404, the analysis result presenting unit 425 converts the information that is obtained by sequential analysis performed by the utterance content analyzing unit 423 and sequentially supplied from the utterance content acquiring unit 424 into an appropriate format, for example, visualized information, and causes the visualized information to be sequentially displayed on the display unit 102 (step S406).

Through the sequential analysis performed by the utterance content analyzing unit 423, the analysis result presenting unit 425 can sequentially display information based on the sequential analysis. Further, in the present embodiment, there may or may not be a correlation between the information obtained through the sequential analysis of the voice signal performed by the utterance content analyzing unit 423 and the information sequentially displayed by the analysis result presenting unit 425.

The analysis result presenting unit 425 determines whether or not the utterance content analyzing unit 423 has completed analysis of content uttered by the user 1 when the information obtained by the sequential analysis performed by the utterance content analyzing unit 423 is sequentially displayed on the display unit 102 (step S408). For example, the determination of step S408 may be performed such that, in the state in which a flag representing that the utterance content analyzing unit 423 has completed analysis of content uttered by the user 1 is set, the analysis result presenting unit 425 determines whether or not the information obtained through the analysis has been provided to the utterance content acquiring unit 424.

When it is determined as a result of the determination of step S408 that the utterance content analyzing unit 423 has not completed the analysis of the content uttered by the user 1, the analysis result presenting unit 425 continuously performs the sequential display by the display unit 102 in step S406.

However, when it is determined as a result of the determination of step S408 that the utterance content analyzing unit 423 has completed the analysis of the content uttered by the user 1, the analysis result presenting unit 425 switches from the sequential display of the information visualized by the sequential analysis to the analysis result obtained as the utterance content analyzing unit 423 completes the analysis, and causes the analysis result to be displayed on the display unit 102 (step S410).

As the information processing apparatus 10 according to the second embodiment of the present disclosure operates as described above, information associated with the utterance is displayed on the display unit 102 even while the user 1 is speaking into the sound collecting device 110. Since the information processing apparatus 10 according to the second embodiment of the present disclosure causes information associated with the utterance to be displayed on the display unit 102 even when the user 1 is speaking into the sound collecting device 110, it is possible to perform the voice recognition process as if it were performed in real time without causing the user 1 to have a feeling of having to wait.

The exemplary operation of the information processing apparatus 10 according to the second embodiment of the present disclosure has been described above. Next, exemplary information displayed on the display unit 102 according to the exemplary operation of the information processing apparatus 10 will be described.

2-4. Exemplary Screen Displayed in Second Embodiment

Figure 20:
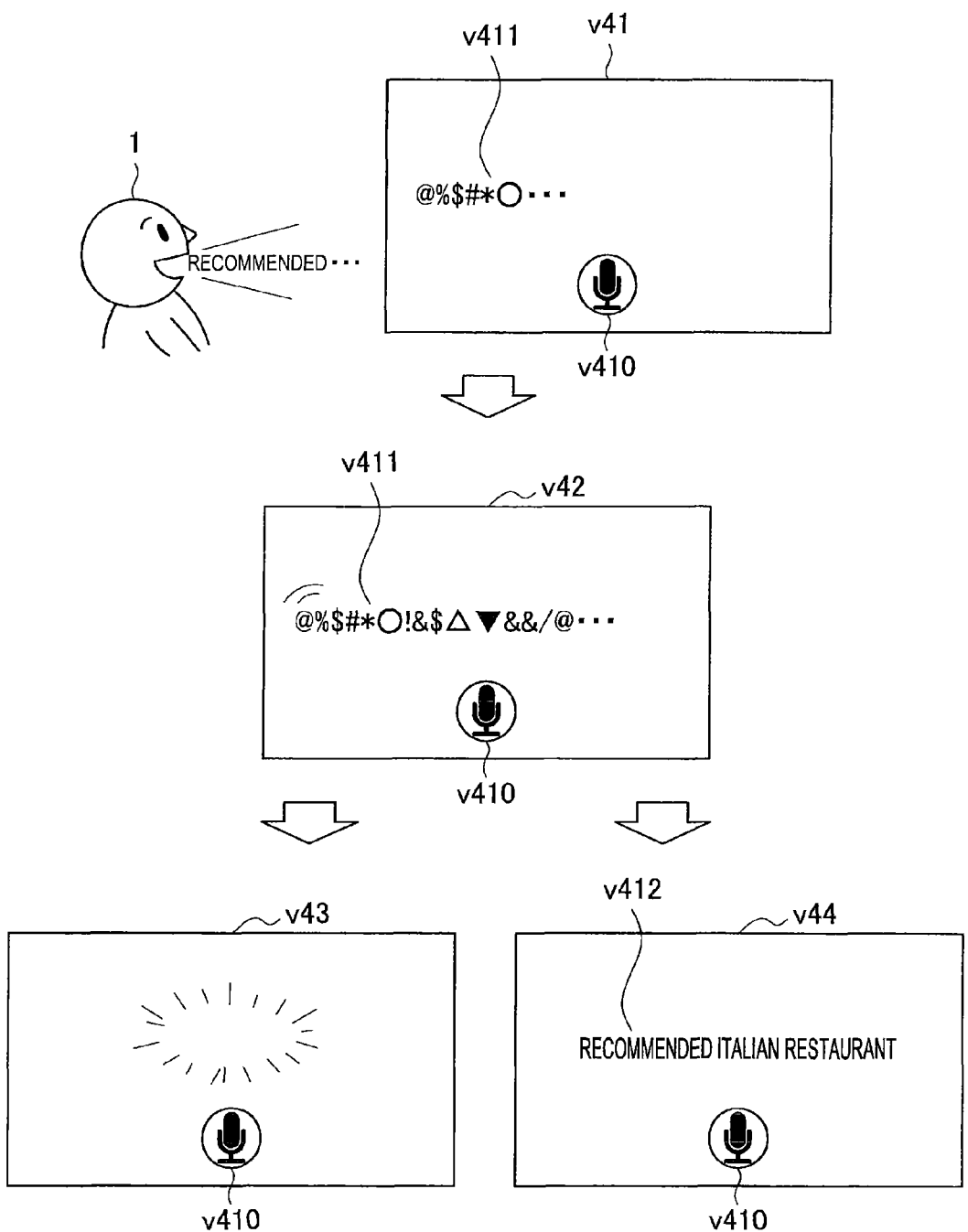
FIG. 20 is an explanatory diagram illustrating exemplary information displayed on a display unit 102 according to an operation of the information processing apparatus 10 according to the second embodiment.

FIG. 20 is an explanatory diagram illustrating exemplary information displayed on the display unit 102 according to an operation of the information processing apparatus 10 according to the second embodiment of the present disclosure. FIG. 20 illustrates a transition in content displayed on the display unit 102 according to the operation of the information processing apparatus 10 while the user 1 is speaking into the sound collecting device 110.

When the user 1 starts to speak into the sound collecting device 110, the utterance content analyzing unit 423 starts analysis of content uttered by the user 1. When the analysis of the content uttered by the user 1 starts, the utterance content analyzing unit 423 sequentially provides information obtained by the analysis to the utterance content acquiring unit 424 even before the analysis of the content uttered by the user 1 is completed. Then, the analysis result presenting unit 425 generates information in which the content uttered by the user 1 is visualized using the information sequentially acquired by the utterance content acquiring unit 424, and causes the information to be displayed on the display unit 102.

FIG. 20 illustrates screens v41, v42, v43, and v44 displayed on the display unit 102 according to the operation of the information processing apparatus 10 while the user 1 is speaking into the sound collecting device 110. An icon v410 representing a microphone is displayed on the screens v41, v42, v43, and v44.

A first screen on the top of FIG. 20 represents the screen v41 displayed on the display unit 102 immediately after the user 1 starts to speak into the sound collecting device 110. When the user 1 is assumed to be saying "recommended Chinese food," the screen on the top of FIG. 20 represents a state in which up to "reco" is said. As illustrated in the first screen of FIG. 20, immediately after the user 1 starts to speak into the sound collecting device 110, the analysis result presenting unit 425 visualizes information obtained by the utterance and causes the visualized information to be displayed on the display unit 102. In the first screen of FIG. 20, abstract symbols irrelevant to content that the user 1 is saying are displayed on the screen v41 as information v411, but the utterance content analyzing unit 423 can recognize that "reco" is said once the user 1 has said up to "reco," and when this fact is acquired by the utterance content acquiring unit 424, the analysis result presenting unit 425 may display "reco" as the information v411 of the screen v41.

A second screen from the top of FIG. 20 represents the screen v42 displayed on the display unit 102 when the user 1 continues speaking from the state illustrated in the first screen. When the user 1 is assumed to be saying "recommended Chinese food," the second screen from the top of FIG. 20 represents a state in which up to "recommended Chinese" is said. In the second screen from the top of FIG. 20, similarly to the first screen of FIG. 20, symbols irrelevant to content that the user 1 is saying are displayed on the screen v41 as the information v411.

Third screens from the top of FIG. 20 represent the screens v43 and v44 displayed on the display unit 102 in the state in which the user 1 has finished speaking. When the user 1 has almost finished speaking, the utterance content analyzing unit 423 decides an analysis result of content said by the user 1, and presents the analysis result to the utterance content acquiring unit 424. The analysis result presenting unit 425 displays the analysis result in which the content said by the user 1 is fixed by erasing the information v411 displayed on the display unit 102 up to that time as in the screen v43 and replacing the information v411 with information v412 as in the screen v44.

In FIG. 20, abstract symbols are illustrated as the information displayed on the display unit 102 while the user 1 is speaking into the sound collecting device 110, but the present disclosure is not limited to this example.

Figure 21:
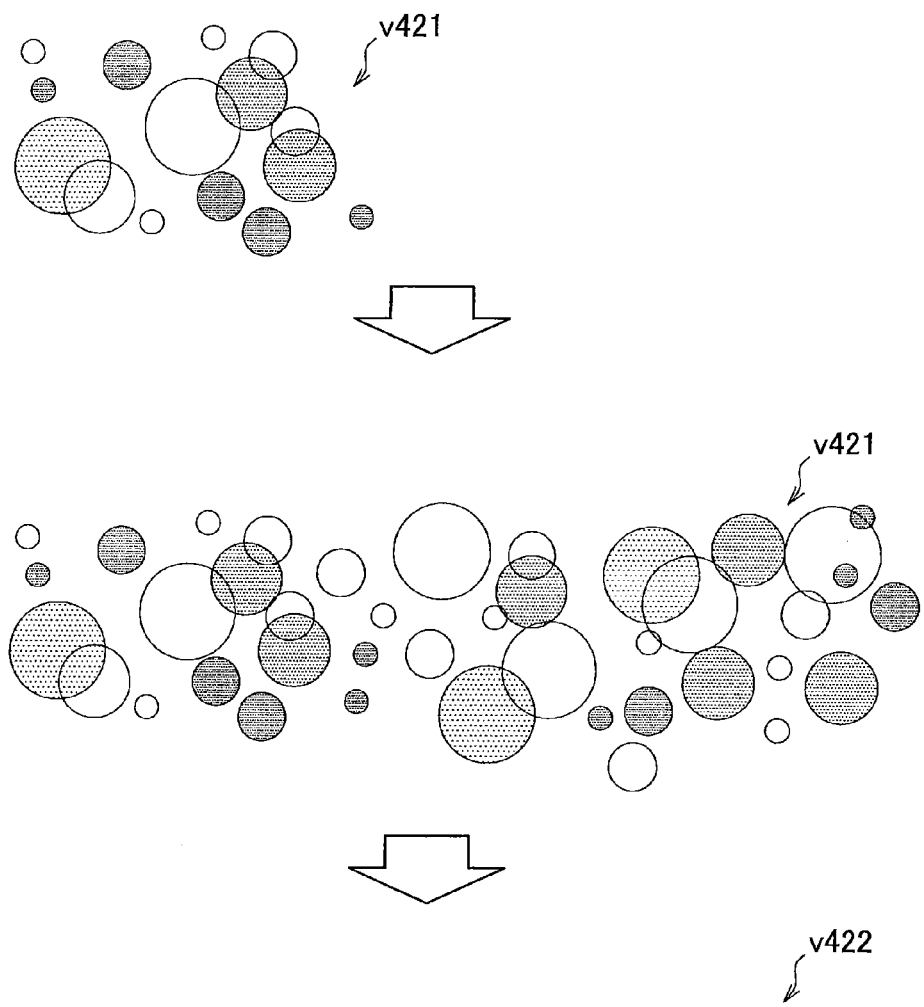
FIG. 21 is an explanatory diagram illustrating exemplary information displayed on a display unit 102 according to an operation of the information processing apparatus 10 according to the second embodiment.

FIG. 21 is an explanatory diagram illustrating exemplary information displayed on the display unit 102 according to the operation of the information processing apparatus 10 according to the second embodiment of the present disclosure. FIG. 21 illustrates a transition in content displayed on the display unit 102 according to the operation of the information processing apparatus 10 while the user 1 is speaking into the sound collecting device 110.

The analysis result presenting unit 425 may cause abstract graphics to be displayed on the display unit 102 as information v421 displayed while the user 1 is speaking into the sound collecting device 110 as illustrated in FIG. 21.

A first view from the top FIG. 21 illustrates the information v421 displayed on the display unit 102 directly after the user 1 starts to speak into the sound collecting device 110 as in the first screen of FIG. 20, and a second view from the top of FIG. 21 illustrates the information v421 displayed on the display unit 102 when the user continues speaking from the state illustrated in the first view as in the second screen from the top of FIG. 20. As described above, the analysis result presenting unit 425 may increase a display width of abstract graphics according to a period of time in which the user 1 speaks.

A third view from the top of FIG. 21 illustrates information v422 displayed on the display unit 102 in the state in which the user 1 has finished speaking. The information v422 represents an analysis result of content which is uttered by the user 1 and decided by the utterance content analyzing unit 423. In FIG. 21, the utterance content analyzing unit 423 analyzes that the user 1 has said "recommended Italian restaurants," and thus the analysis result presenting unit 425 causes "recommended Italian restaurants" to be displayed on the display unit 102 as the information v422.

Figure 22:
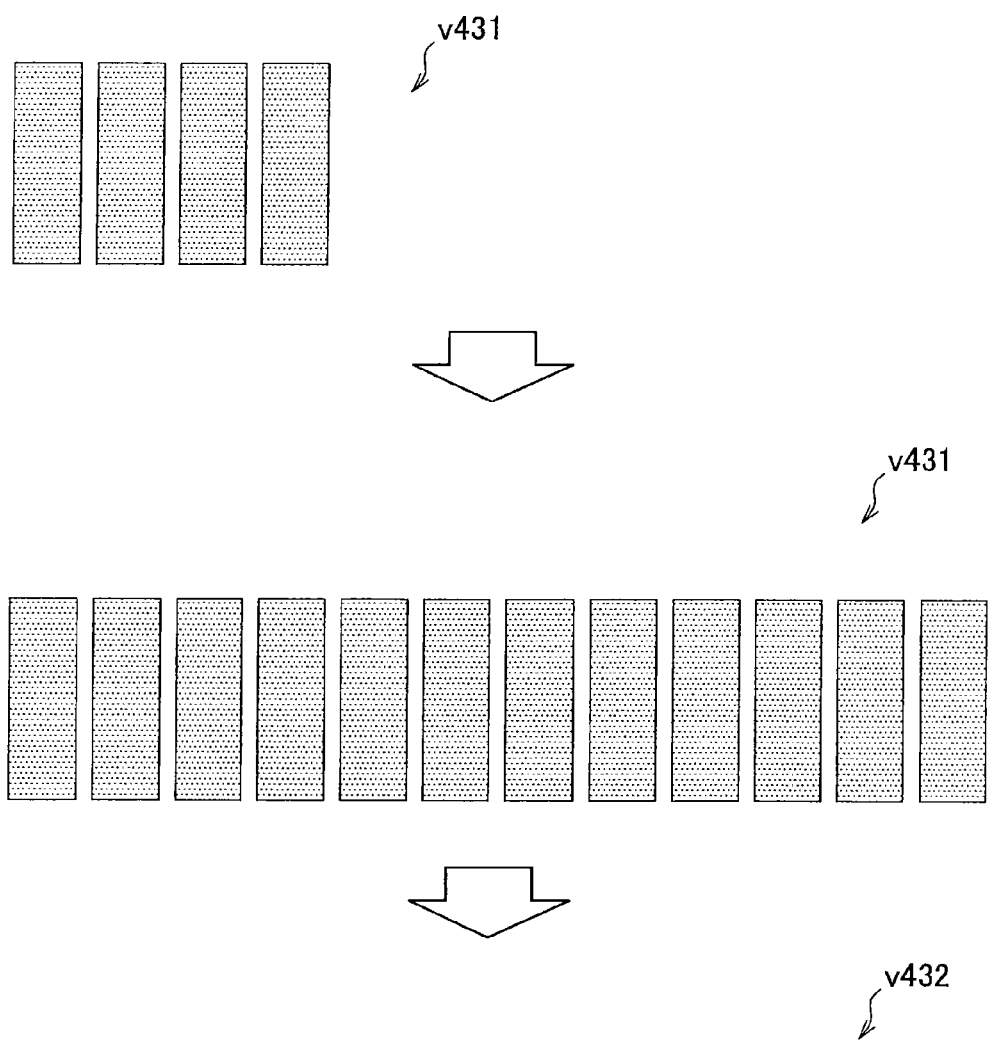
FIG. 22 is an explanatory diagram illustrating exemplary information displayed on a display unit 102 according to an operation of the information processing apparatus 10 according to the second embodiment.

FIG. 22 is an explanatory diagram illustrating exemplary information displayed on the display unit 102 according to the operation of the information processing apparatus 10 according to the second embodiment of the present disclosure. FIG. 22 illustrates a transition in content displayed on the display unit 102 according to the operation of the information processing apparatus 10 while the user 1 is speaking into the sound collecting device 110.

The analysis result presenting unit 425 may cause an indicator to be displayed on the display unit 102 as information v431 displayed while the user 1 is speaking into the sound collecting device 110 as illustrated in FIG. 22.

A first view of FIG. 22 illustrates the information v431 displayed on the display unit 102 immediately after the user 1 speaks into the sound collecting device 110 as in the first view of FIG. 20, and a second view from the top of FIG. 22 illustrates the information v431 displayed on the display unit 102 when the user 1 continues speaking from the state illustrated in the first view as in the second view from the top of FIG. 20. As described above, the analysis result presenting unit 425 may increase a display width of the indicator according to a period of time in which the user 1 speaks.

A third view from the top of FIG. 22 illustrates information v432 displayed on the display unit 102 in the state in which the user 1 has finished speaking. The information v432 is an analysis result of content which is uttered by the user 1 and decided by the utterance content analyzing unit 423. In FIG. 22, the utterance content analyzing unit 423 analyzes that the user 1 has said "recommended Italian restaurants," and thus the analysis result presenting unit 425 causes "recommended Italian restaurants" to be displayed on the display unit 102 as the information v432.

Figure 23:
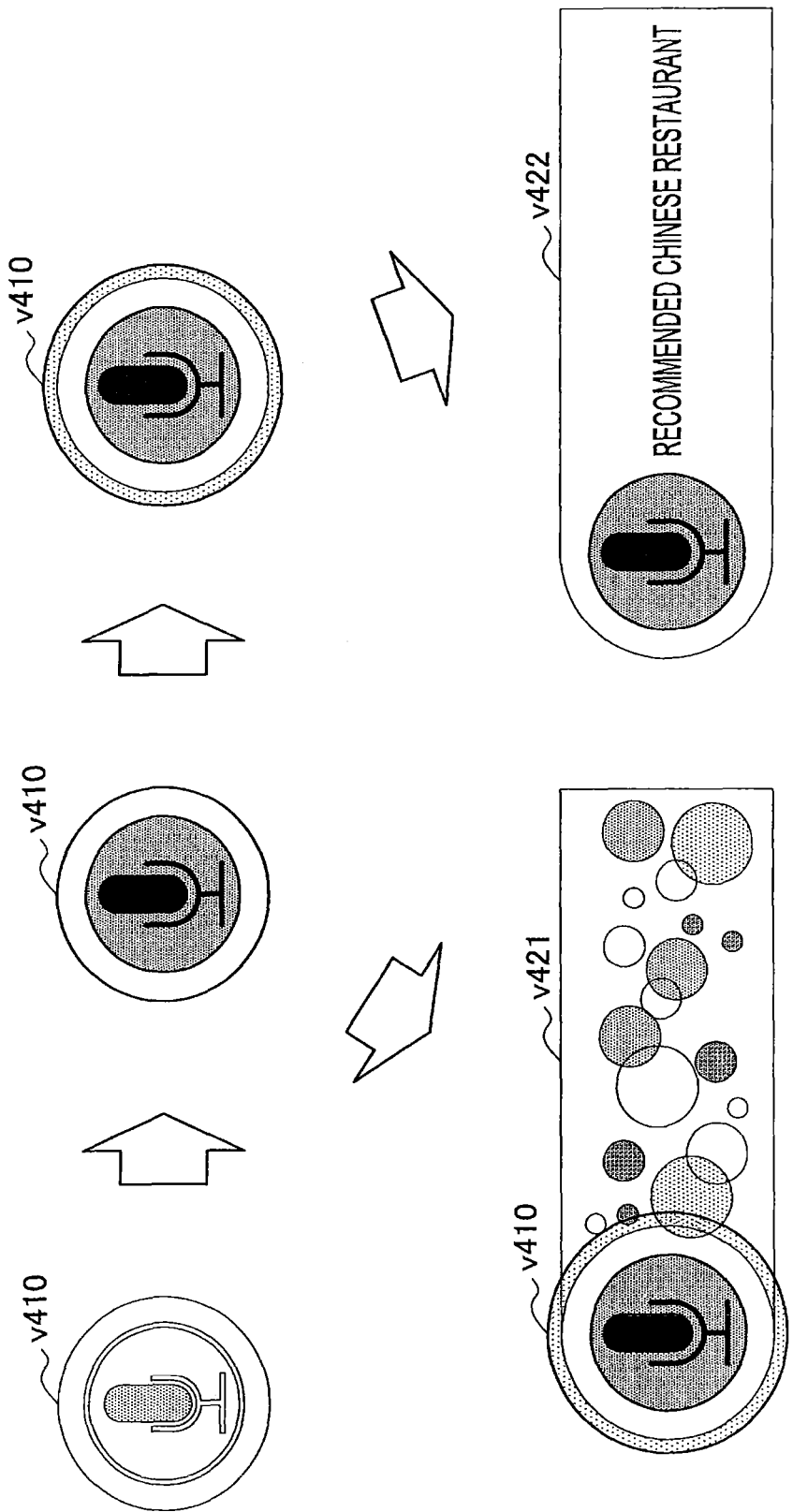
FIG. 23 is an explanatory diagram illustrating exemplary information displayed on a display unit 102 according to an operation of the information processing apparatus 10 according to the second embodiment.

FIG. 23 is an explanatory diagram illustrating exemplary information displayed on the display unit 102 according to the operation of the information processing apparatus 10 according to the second embodiment of the present disclosure. FIG. 23 illustrates an exemplary flow from the start of voice recognition by the information processing apparatus 10 to the end thereof.

FIG. 23 illustrates a state in which there is no voice input by the user 1. In an inactive state in which there is no voice input by the user 1, the analysis result presenting unit 425 gives feedback to the user 1, for example, by a display of graying out and not displaying the information v410 displayed as a microphone icon.

FIG. 23 illustrates a state in which a voice starts to be input to the sound collecting device 110 at a timing at which the user 1 speaks from the state in which there is no voice input by the user 1. When a voice starts to be input to the sound collecting device 110, the analysis result presenting unit 425 displays the information v410 displayed as a microphone icon as illustrated in FIG. 23.

FIG. 23 illustrates a state in which the user 1 is speaking from the state in which a voice starts to be input to the sound collecting device 110. While the voice signal is being received as the user 1 speaks, the analysis result presenting unit 425 causes the display unit 102 to perform a display according to a volume level as feedback on reception of the voice signal as illustrated in FIG. 23.

FIG. 23 illustrates a state in which the user 1 is speaking from the state in which a voice starts to be input to the sound collecting device 110. FIG. 23 illustrates an example of giving feedback on real-time voice recognition. The feedback illustrated in FIG. 23 is displayed on the display unit 102 through the analysis result presenting unit 425 during voice reception and signal analysis after generation of the voice signal of the speech of the user 1 is stopped.

In the example illustrated in FIG. 23, a display region of graphics including a plurality of small and large circles may be decided according to the length of a word or phrase uttered by the user 1. The length of a word or phrase uttered by the user 1 is estimated based on an utterance period of time (voice section) and the length of a registered dictionary by the utterance content analyzing unit 423, and adjusted to be close to the same width as a recognized word or phrase. FIG. 23 illustrates an example in which a display region of graphics including a plurality of small and large circles extends to the right side from the information v410 displayed by the microphone icon.

FIG. 23 illustrates a state in which the user 1 ends speaking and a voice recognition result by the utterance content analyzing unit 423 is displayed. For example, the abstract graphics illustrated in FIG. 23 fade out while changing to the voice recognition result by the utterance content analyzing unit 423, and then disappear from the display unit 102.

The information processing apparatus 10 according to the second embodiment of the present disclosure secures a region on which a recognition result is displayed before the analysis result presenting unit 425 receives a final voice recognition result as illustrated in FIG. 23.

In voice recognition, typically, the user 1 has to wait for the analysis process of the voice signal after the voice signal ends. However, the information processing apparatus 10 according to the second embodiment of the present disclosure smoothly connects a real-time voice recognition expression illustrated in FIG. 23 with a result display expression and thus can reduce an intuitive waiting time of the user 1. In other words, the information processing apparatus 10 according to the second embodiment of the present disclosure displays information through the display unit 102 as described above, and thus it is possible to cause the user 1 to feel as if a recognition result is displayed at the same time when the voice signal ends (or while the signal is being received).

As an expression of smoothly connecting the real-time voice recognition expression illustrated in FIG. 23 with the result display expression, for example, there is the following expression.

For example, the analysis result presenting unit 425 estimates a volume level, an utterance period of time, and the length of a registered word by analyzing the utterance content of the user 1, and may cause abstract graphics or symbols to be displayed on the display unit 102.

Figure 24:
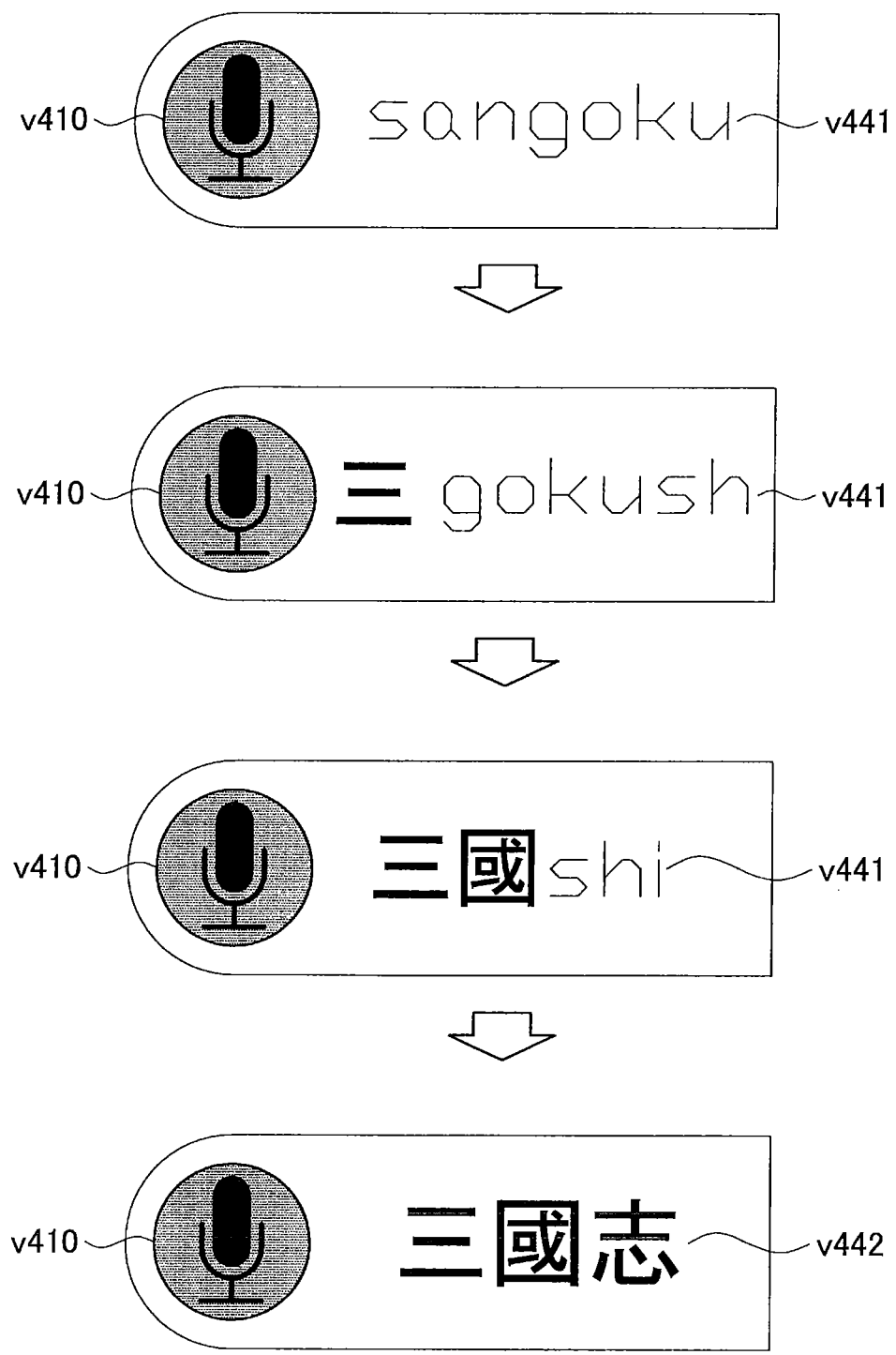
FIG. 24 is an explanatory diagram illustrating exemplary information displayed on a display unit 102 according to an operation of the information processing apparatus 10 according to the second embodiment.

When phoneme information is obtained by the analysis of the utterance content analyzing unit 423 even while the utterance content of the user 1 is being analyzed, the analysis result presenting unit 425 may display the phoneme information in real time. FIG. 24 is an explanatory diagram illustrating exemplary information displayed on the display unit 102 according to the operation of the information processing apparatus 10 according to the second embodiment of the present disclosure. FIG. 24 illustrates an exemplary flow from the start of voice recognition by the information processing apparatus 10 to the end thereof, and in this example, phoneme information is displayed in real time.

When phoneme information is obtained by the analysis of the utterance content analyzing unit 423 even while the utterance content of the user 1 is being analyzed, the analysis result presenting unit 425 may sequentially display the phoneme information and change a display such as a word conversion by a keyboard input. In the example illustrated in FIG. 24, phonemes "sa•n•go•ku•shi" are recognized through the analysis of the utterance content analyzing unit 423, and the analysis result presenting unit 425 converts "sa•n•go•ku•shi" to "Records of the Three Kingdoms (written in Chinese characters)" based on the recognition result and causes "Records of the Three Kingdoms (written in Chinese characters)" to be displayed.

Further, it is possible for the utterance content analyzing unit 423 to erroneously recognize phonemes. In this case, for example, the analysis result presenting unit 425 may compare each phoneme with phoneme information of a word held in the dictionary data holding unit 430, and when there is phoneme information having a high degree of similarity, the phoneme information may be recognized as a word uttered by the user 1, and an erroneously displayed phoneme may be corrected.

Figure 25:
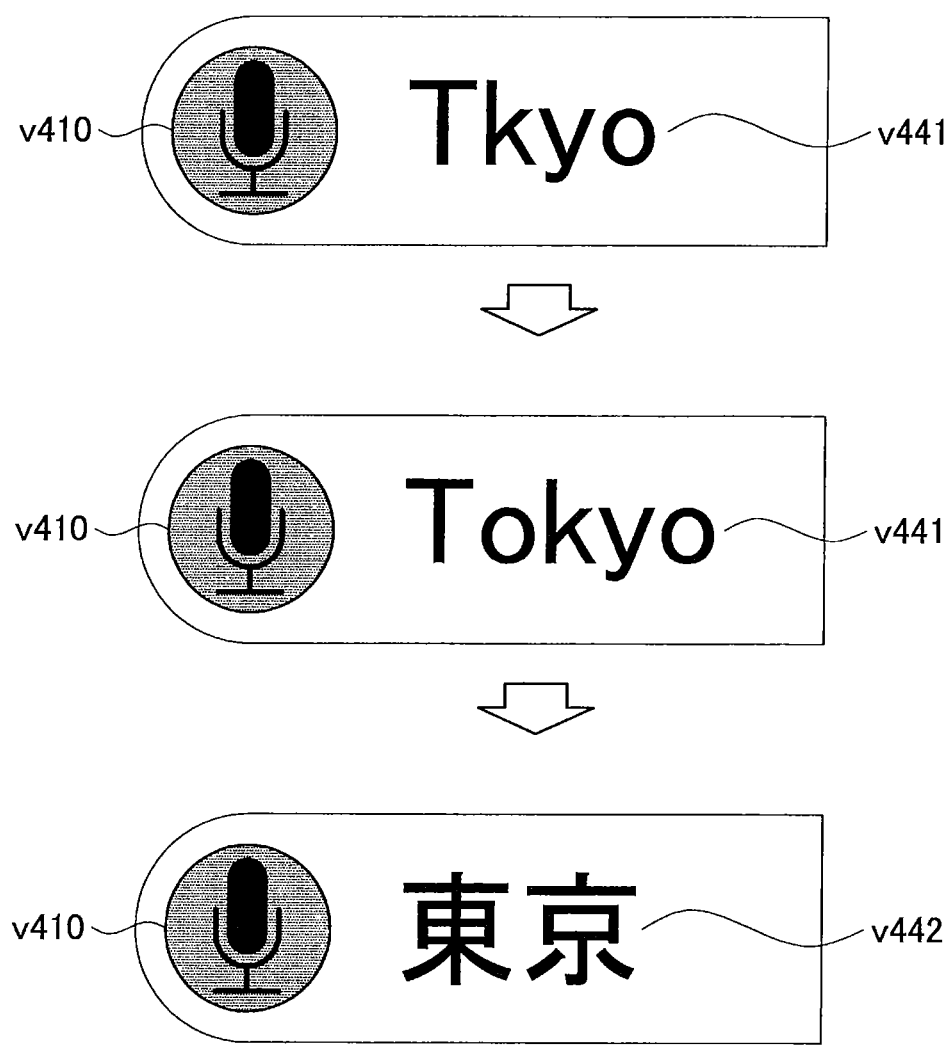
FIG. 25 is an explanatory diagram illustrating exemplary information displayed on a display unit 102 according to an operation of the information processing apparatus 10 according to the second embodiment.

Further, when a phoneme string is grammatically incorrect according to a language, the analysis result presenting unit 425 may recognize that the phoneme string has a partial error, and convert it into a correct phoneme string. FIG. 25 is an explanatory diagram illustrating exemplary information displayed on the display unit 102 according to the operation of the information processing apparatus 10 according to the second embodiment of the present disclosure. FIG. 25 illustrates an exemplary flow from the start of voice recognition by the information processing apparatus 10 to the end thereof, and in this example, phoneme information is displayed in real time.

A first view of FIG. 25 illustrates a state in which a phoneme string "Tkyo" is output through the analysis of the utterance content analyzing unit 423, and then the analysis result presenting unit 425 displays "Tkyo." However, the analysis result presenting unit 425 compares "Tkyo" with phoneme information of a word held in, for example, the dictionary data holding unit 430, a server on a network, or the like, and can recognize that the phoneme string is an error of "Tokyo." In this case, the analysis result presenting unit 425 may change a display from "Tkyo" to "Tokyo" as illustrated in the second view from the top of FIG. 25. Finally, when the analysis result is received from the utterance content analyzing unit 423, the analysis result presenting unit 425 may change a display from "Tokyo" to "Tokyo (written in Chinese characters)" as illustrated in the third view from the top of FIG. 25.

Further, for example, the analysis result presenting unit 425 may perform a display such that a word is randomly displayed from a group of words according to the context, and replaced with a word recognized by the utterance content analyzing unit 423 when the recognized word is received. Here, the context refers to a group of words registered in an application or a service that is being executed, and refers to, for example, a word frequently used in the application or the service or a word that is uttered most by the user 1 and obtained from an arbitrary recommending engine when a registered dictionary is not used in voice recognition. The randomly displayed word is likely to be different from a word actually uttered by the user 1. Thus, the analysis result presenting unit 425 may employ a display form that changes in a short timing such as a slot such as a display form in which a blur is applied when a word is randomly displayed.

Figure 26:
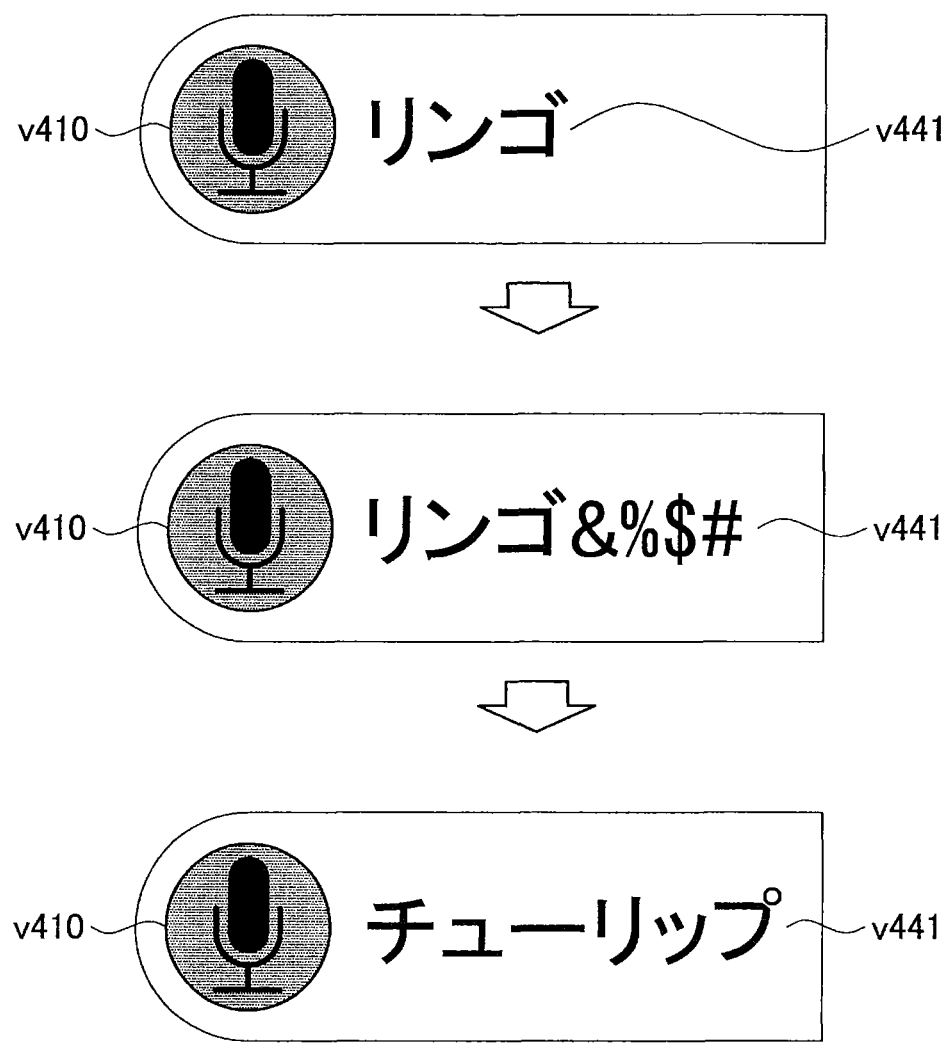
FIG. 26 is an explanatory diagram illustrating exemplary information displayed on a display unit 102 according to an operation of the information processing apparatus 10 according to the second embodiment.

FIG. 26 is an explanatory diagram illustrating exemplary information displayed on the display unit 102 according to the operation of the information processing apparatus 10 according to the second embodiment of the present disclosure. FIG. 26 illustrates an exemplary flow from the start of voice recognition by the information processing apparatus 10 to the end thereof, and in this example, phoneme information is displayed in real time.

A first view of FIG. 26 illustrates a state in which a 3-character word uttered by the user 1 is output through the analysis of the utterance content analyzing unit 423, and the analysis result presenting unit 425 displays "apple (written in katakana)" from among 3-character words using information obtained by the analysis of the utterance content analyzing unit 423. In this case, the user 1 is unlikely to have actually said the word "apple (written in katakana)," but as a certain word is displayed, the information processing apparatus 10 according to the second embodiment of the present disclosure can reduce an intuitive waiting time of the user 1.

A second view from the top of FIG. 26 illustrates an exemplary display when the user 1 continues speaking from the state of the first view. The analysis result presenting unit 425 acquires the analysis result from the utterance content analyzing unit 423, and causes abstract symbols or graphics or the like to be displayed at the right side of "apple (written in katakana)" displayed in the first view.

A third view from the top of FIG. 26 illustrates an exemplary display when the user 1 completes speaking, and the utterance content analyzing unit 423 decides the analysis result. The analysis result presenting unit 425 acquires the analysis result from the utterance content analyzing unit 423, and displays a word "tulip (written in katakana)" which is the analysis result of the utterance content analyzing unit 423.

The analysis result presenting unit 425 may cause the symbols, graphics, phoneme information, and the like illustrated thus far to be displayed to distinguish the speakers when the utterance content analyzing unit 423 can perform analysis capable by which the speakers can be distinguished. For example, when a speaker A utters "ai (written in hiragana; phonemes: ai)," then a speaker B utters "ueo (written in hiragana; phonemes: ueo)," and the utterance content analyzing unit 423 can perform analysis to identify the speaker, the analysis result presenting unit 425 may display "ai" and "ueo" to be distinguished from each other.

2-5. Modified Example of Second Embodiment

The example in which the analysis result presenting unit 425 sequentially acquires the analysis result of the utterance content analyzing unit 423, and displays information based on the analysis of the utterance content analyzing unit 423 in real time has been described so far. However, when the user 1 makes a certain cancellation operation while the utterance content analyzing unit 423 is analyzing the utterance content of the user 1, the analysis result presenting unit 425 may perform a display such that a display of information is cancelled.

Figure 27:
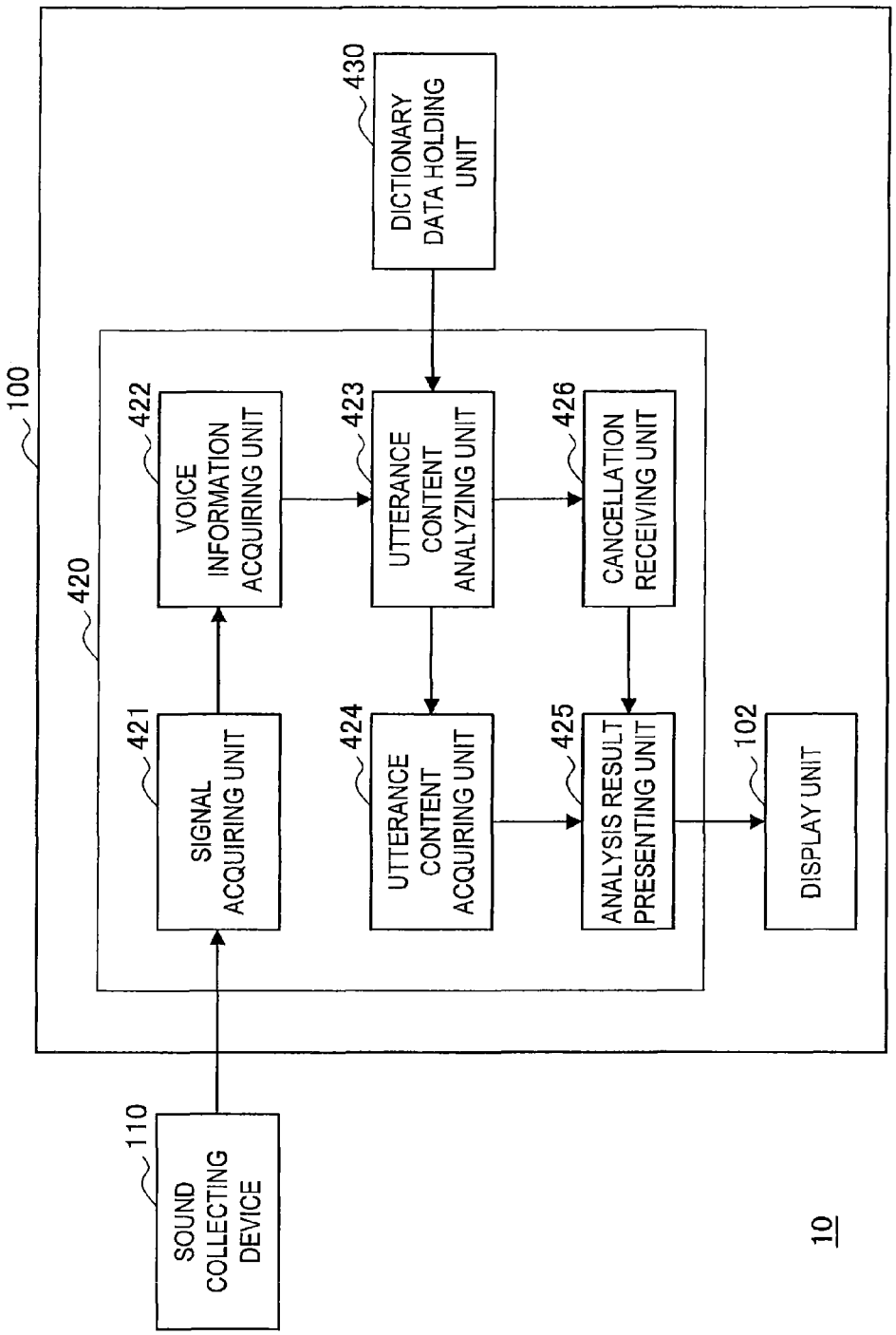
FIG. 27 is an explanatory diagram illustrating a modified example of the information processing apparatus 10 according to the second embodiment.

FIG. 27 is an explanatory diagram illustrating a modified example of the information processing apparatus 10 according to the second embodiment of the present disclosure. FIG. 27 illustrates a configuration in which a cancellation receiving unit 426 is internally added to the display device 100 in the configuration of FIG. 18.

(Cancellation Receiving Unit 426)

The cancellation receiving unit 426 receives a cancellation operation of cancelling a display of information while information is being displayed by the analysis result presenting unit 425. Examples of a method of notifying the display device 100 of the cancellation include a cancellation operation using a remote controller, forced termination by activation of any other service or the like, a cancellation operation by utterance of the user 1, and a cancellation operation by the user's gesture. Upon receiving the display cancellation operation, the cancellation receiving unit 426 transmits information representing that the cancellation operation has been received to the analysis result presenting unit 425. The analysis result presenting unit 425 receives the information representing that the cancellation operation has been received from the cancellation receiving unit 426, and performs a display of cancelling a display of information.

Figure 28:
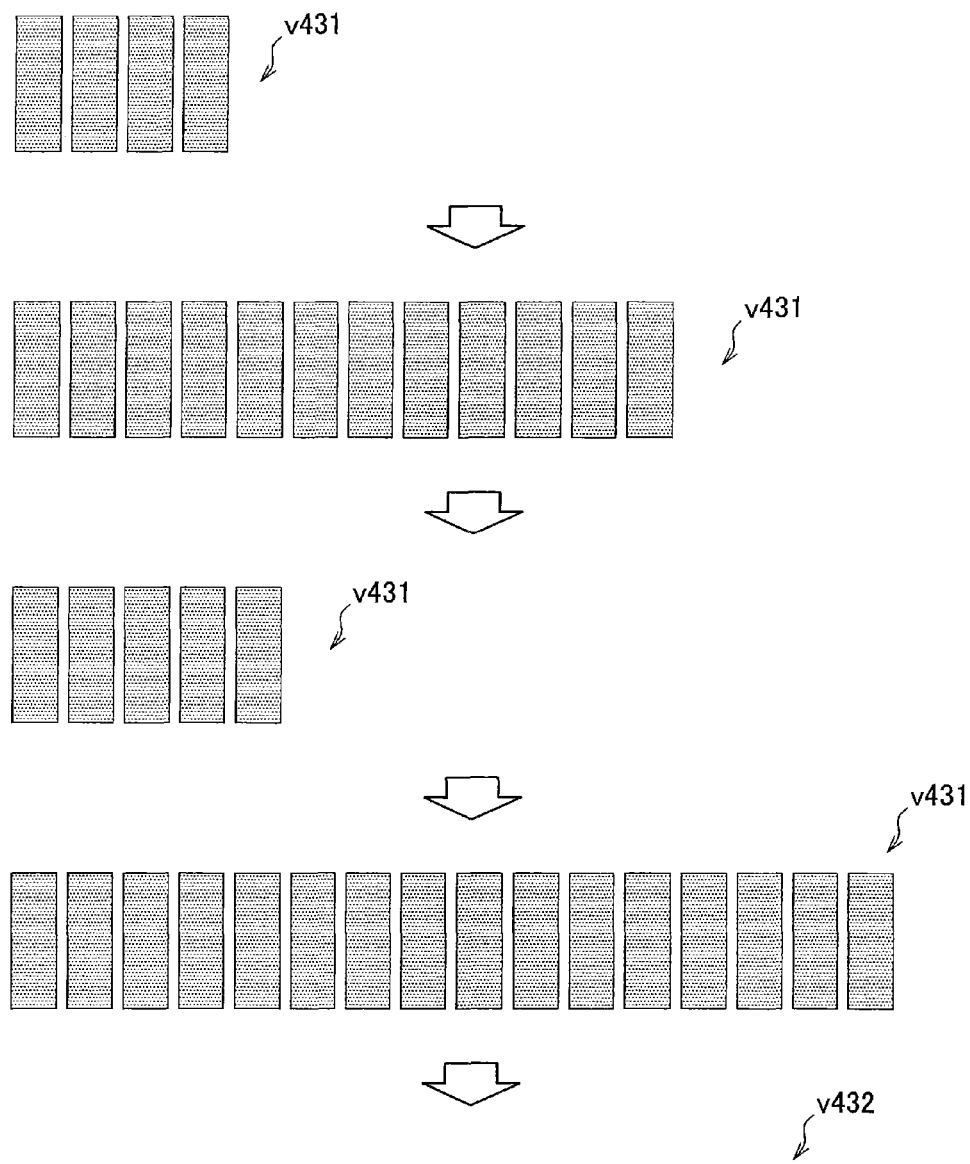
FIG. 28 is an explanatory diagram illustrating exemplary information displayed on the display unit 102 according to the operation of the information processing apparatus 10 according to the modified example of the second embodiment.

FIG. 27 is an explanatory diagram illustrating exemplary information displayed on the display unit 102 according to the operation of the information processing apparatus 10 according to the second embodiment of the present disclosure. FIG. 28 illustrates an exemplary flow from the start of voice recognition by the information processing apparatus 10 to the end thereof, and in this example, information is displayed again after the display device 100 performs a display so that a display of information is cancelled.

A first view of FIG. 28 illustrates information v431 displayed on the display unit 102 immediately after the user 1 starts to speak into the sound collecting device 110, and a second view from the top of FIG. 28 illustrates information v431 displayed on the display unit 102 when the user 1 continues speaking from the state illustrated in the first view as in the second view from the top of FIG. 20.

In the state of the second view from the top of FIG. 28, when the user (the user 1) performs a certain cancellation operation, the analysis result presenting unit 425 performs a display of reducing an extended indicator as in the third view from the top of FIG. 28. For example, when the user 1 utters "stop" after uttering "recommended Italian," the utterance content analyzing unit 423 analyzes the portion "stop" and can recognize that the cancellation operation has been made by the user 1. The utterance content analyzing unit 423 transfers information representing that the cancellation operation has been made by the user 1 to the cancellation receiving unit 426, and the cancellation receiving unit 426 notifies the analysis result presenting unit 425 of the fact that the cancellation operation has been made by the user 1. When it is recognized that the cancellation operation has been made by the user 1, the analysis result presenting unit 425 performs a display of reducing an extended indicator as in the third view from the top of FIG. 28.

When the user 1 utters "Chinese food" after uttering "stop," the analysis result presenting unit 425 performs a display of extending a reduced indicator again in the third view from the top of FIG. 28. Then, when the utterance content analyzing unit 423 completes the analysis, the analysis result presenting unit 425 smoothly changes a display from an analysis result display ("recommended Chinese food"), and displays the analysis result as in the fifth view from the top of FIG. 28.

As described above, as information is displayed again after a display is performed such that a display of information is cancelled, the display device 100 can graphically show the user that the cancellation operation has been recognized and the voice recognition process has been performed again after the cancellation operation has been recognized.

The above embodiment has been described in connection with the information processing apparatus 10 that analyzes content uttered by the user 1, and includes the sound collecting device 110 connected to the display device 100 that displays the analysis result, but the present disclosure is not limited to this example. For example, analysis of content uttered by the user 1, generation of information to be displayed, and a display of content uttered by the user 1 may be performed in separate devices. In other words, a device including the display control unit 420 illustrated in FIG. 18 and a device including the display unit 102 may be different devices.

Further, for the components included in the display control unit 420 illustrated in FIG. 18, the utterance content analyzing unit 423 and the analysis result presenting unit 425 may be mounted in different devices. In other words, the process of analyzing content uttered by the user 1 and the process of generating information to be displayed based on content uttered by the user 1 may be performed in different devices.

2-6. Modified Example of Second Embodiment

As described above, according to the second embodiment of the present disclosure, it is possible to provide the information processing apparatus 10 capable of performing the voice recognition process that causes the user to feel as if it is being performed in real time without causing the user 1 who is speaking into the sound collecting device 110 to have a feeling of having to wait. The information processing apparatus 10 according to the second embodiment of the present disclosure sequentially analyzes content uttered by the user 1, and causes content based on the sequential analysis to be sequentially displayed on the display device 100.

As the content based on the sequential analysis is sequentially displayed on the display device 100, the user 1 using the information processing apparatus 10 according to the second embodiment of the present disclosure can be given feedback immediately after speaking into the sound collecting device 110. Thus, the information processing apparatus 10 according to the second embodiment of the present disclosure causes an effect of not causing the user who is speaking into the sound collecting device 110 to have a feeling of having to wait.

3. Third Embodiment

3-1. Outline of Third Embodiment

Next, an outline of an information processing apparatus according to a third embodiment will be described. Among U/Is capable of performing desired processing by voice recognition, there is a U/I that can be operated in a mode in which a voice input is constantly received as in a voice activity detection (VAD) mode. When a voice input is constantly received as in the VAD mode, there are cases in which it responds to ambient noise such as a dialogue in which a voice input is not intended or an ambient sound (for example, a voice output from a television) as well as a voice input intentionally input by the user. Further, in addition to the VAD mode, in a mode in which a user or a system designates a section available for voice recognition, there is a similar problem in a section available for voice recognition.

In this regard, according to the third embodiment, provided is an information processing apparatus capable of accumulating a recognition result of a collected voice signal as a history and causing an accumulated history to be accessibly displayed on a screen. Through this configuration, even when a noise is erroneously recognized, it is possible to prevent a situation in which processing corresponding to the noise is erroneously performed. The information processing apparatus according to the present embodiment will be described in detail.

3-2. Configuration of Third Embodiment

First, a configuration of the information processing apparatus 10 according to the third embodiment will be described with reference to FIG. 1. As illustrated in FIG. 1, the information processing apparatus 10 according to the third embodiment includes a display device 100 and a sound collecting device 110. The operation of the sound collecting device 110 is the same as in the information processing apparatus according to the first embodiment, and thus a detailed description thereof will be omitted.

The display device 100 includes a display unit 102, and in this device, an operation screen or an execution result of desired processing is output to the display unit 102. When the information processing apparatus 10 is activated, the display device 100 generates the operation screen, and causes the operation screen to be displayed on the display unit 102.

Figure 29:
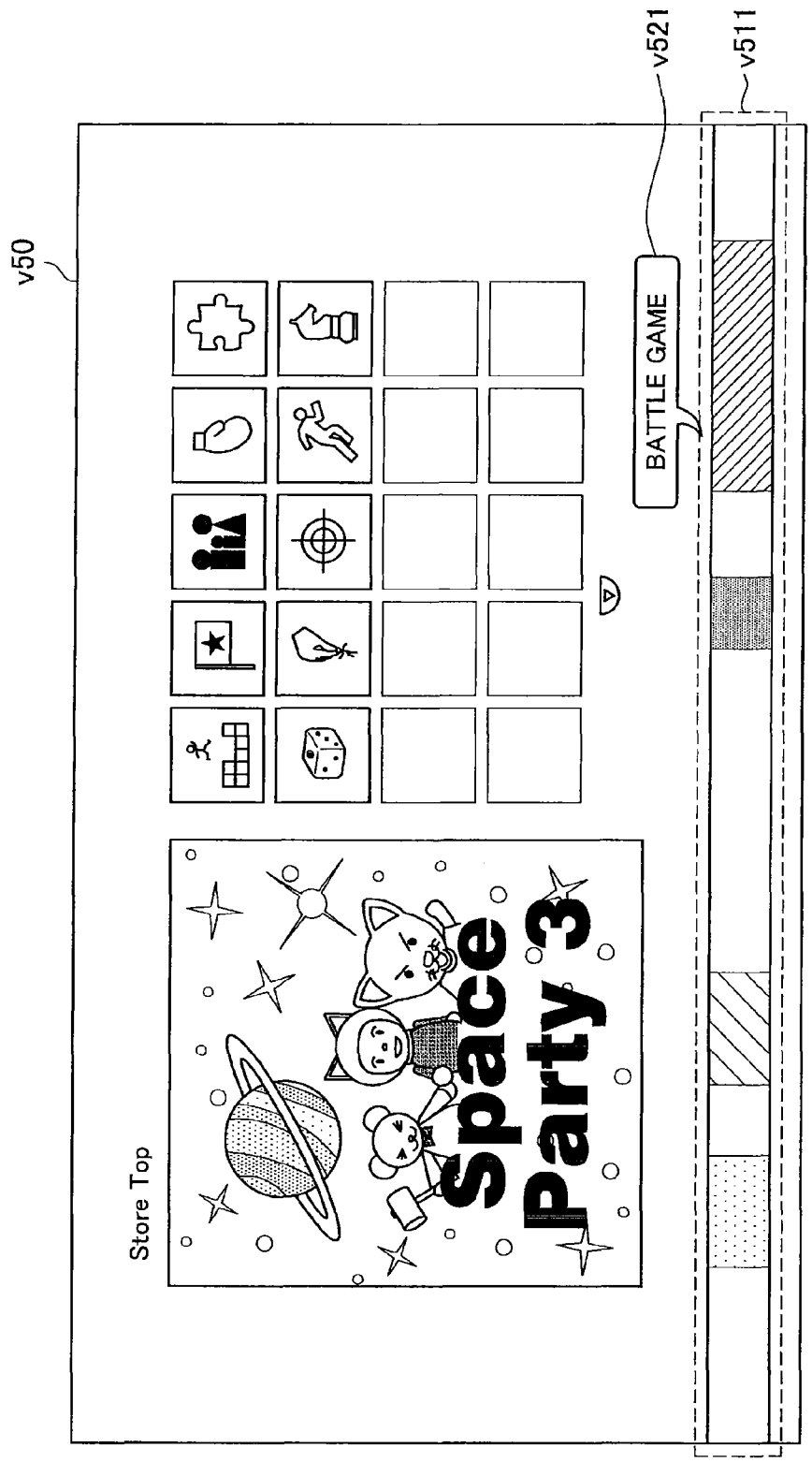
FIG. 29 is a diagram illustrating an exemplary screen configuration according to a third embodiment.

The display device 100 according to the present embodiment causes a recognition result of a voice signal collected by the sound collecting device 110 to be displayed on the screen as history information. For example, FIG. 29 is an explanatory diagram illustrating an exemplary screen configuration according to the third embodiment. A screen v50 is a screen displayed on the display unit 102 of the display device 100. As illustrated in FIG. 29, the screen v50 includes a voice bar v510 and history information v521.

For example, the voice bar v510 is configured such that a display form (for example, a color) changes according to a detection status of a voice signal collected by the sound collecting device 110. As described above, the display device 100 can intuitively notify the user 1 of the fact that the voice signal has been detected by changing the display form of the voice bar v510 according to the detection status of the voice signal. The details of the display form of the voice bar v510 will be described later as a third example.

The history information v521 represents a history of voice information representing utterance content obtained by performing the voice recognition process on the voice signal collected by the sound collecting device 110. In the display device 100 according to the present embodiment, when the voice information corresponding to the voice signal collected by the sound collecting device 110 is acquired, the acquired voice information is first accumulated without activating processing or content corresponding to the voice signal at that point in time. Then, when voice information corresponding to a certain keyword is acquired, the display device 100 acquires information of content corresponding to the history information v521 displayed on the screen v50, and displays the acquired content information as relevant information.

Further, in the state in which the relevant information is displayed, a word or phrase corresponding to one of pieces of displayed relevant information is acquired as voice information, and the display device 100 activates processing or content corresponding to the acquired voice information. Through this configuration, even when a noise is erroneously recognized, it is possible to prevent a situation in which processing corresponding to the noise is erroneously performed. The details of this operation will be described below together with a configuration of the display device 100.

3-3. Configuration of Display Device

Figure 30:
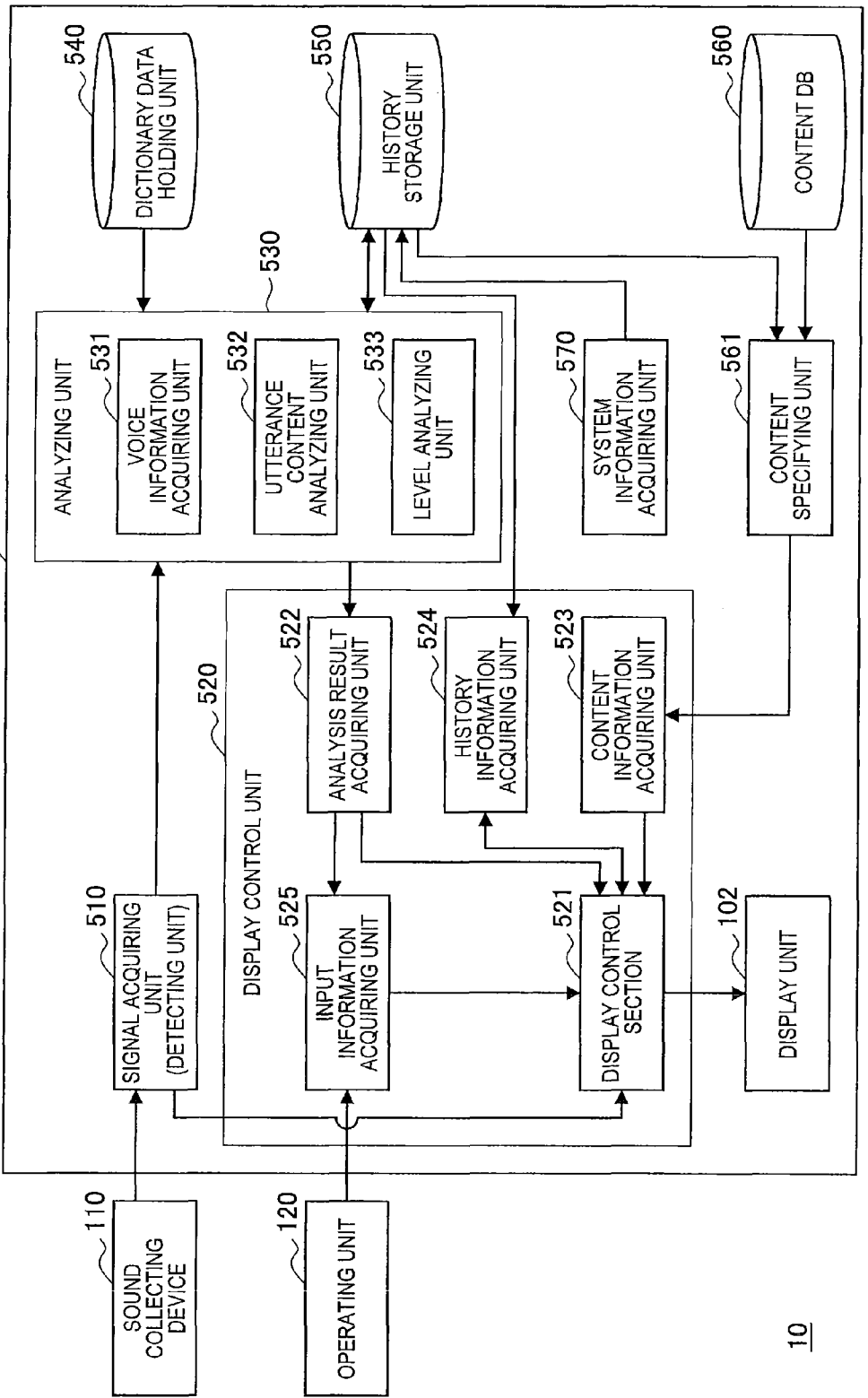
FIG. 30 is a diagram illustrating an exemplary configuration of a display device according to the third embodiment.

A configuration of the display device 100 according to the third embodiment will be described with reference to FIG. 30. FIG. 30 is a diagram illustrating an exemplary configuration of the display device 100 according to the third embodiment. As illustrated in FIG. 30, the display device 100 according to the present embodiment includes the display unit 102, a signal acquiring unit 510, a display control unit 520, an analyzing unit 530, a dictionary data holding unit 540, a history storage unit 550, a content DB 560, a content specifying unit 561, and a system information acquiring unit 570.

(Signal Acquiring Unit 510)

The signal acquiring unit 510 operates similarly to the signal acquiring unit 310 (see FIG. 2) according to the first embodiment. In other words, the signal acquiring unit 510 detects and acquires the voice signal collected by the sound collecting device 110. When the voice signal is detected, the signal acquiring unit 510 notifies a display control section 521 of the display control unit 520 which will be described later of the detection result. The signal acquiring unit 510 corresponds to an example of a "detecting unit" of the present disclosure.

The signal acquiring unit 510 outputs the acquired voice signal to the analyzing unit 530. Upon receiving the output, the analyzing unit 530 analyzes the voice signal acquired from the signal acquiring unit 510.

(Analyzing Unit 530)

The analyzing unit 530 is an analyzing unit that analyzes the voice signal acquired by the signal acquiring unit 510. Processing related to voice recognition is performed by the analyzing unit 530. The analyzing unit 530 includes a voice information acquiring unit 531, an utterance content analyzing unit 532, and a level analyzing unit 5333 as illustrated in FIG. 30. The analyzing unit 530 acquires the voice signal from the signal acquiring unit 510. The analyzing unit 530 causes the voice information acquiring unit 531, the utterance content analyzing unit 532, and the level analyzing unit 533 to analyze the acquired voice signal. The details of the analysis processes performed by the voice information acquiring unit 531, the utterance content analyzing unit 532, and the level analyzing unit 533 will be described later. The analyzing unit 530 outputs the analysis result of the voice signal to an analysis result acquiring unit 522.

The voice information acquiring unit 531 operates similarly to the voice information acquiring unit 331 (see FIG. 2) according to the first embodiment. In other words, the voice information acquiring unit 531 performs the voice recognition process on the voice signal, and generates text data (that is, voice information) representing utterance content. The voice information acquiring unit 531 outputs the acquired voice information to the utterance content analyzing unit 532.

The utterance content analyzing unit 532 analyzes the voice information, and interprets the meaning represented by the voice information. The utterance content analyzing unit 532 has the same function as the utterance content analyzing unit 332 (see FIG. 2) according to the first embodiment. In other words, the utterance content analyzing unit 532 has a function of determining whether or not the acquired voice information is identical to a keyword previously associated with processing. Further, the utterance content analyzing unit 532 may be configured to specify a keyword similar to the acquired voice information, similarly to the utterance content analyzing unit 332 according to the first embodiment. Further, a relation between a keyword list and processing corresponding to each keyword may be stored in, for example, the dictionary data holding unit 540 as dictionary data.

As described above, the utterance content analyzing unit 532 analyzes the voice information, interprets the meaning representing the voice information, determines whether or not there is a corresponding keyword, and notifies the analysis result acquiring unit 522 of the determination result. Further, when there is a keyword corresponding the voice information, the utterance content analyzing unit 532 outputs information representing processing corresponding to the keyword to the analysis result acquiring unit 522. Through this operation, the analysis result acquiring unit 522 can recognize what processing is to be executed. Further, when there is no keyword identical to the voice information, the utterance content analyzing unit 532 may output the voice information to the analysis result acquiring unit 522.

Further, the utterance content analyzing unit 532 may record the acquired voice information in the history storage unit 550 which will be described later as history. At this time, the utterance content analyzing unit 532 may store information specifying the history in the history storage unit 550 in association with the history as attribute information. For example, the utterance content analyzing unit 532 may store information representing content serving as a target of the acquired voice information in association with a history corresponding to the voice information as the attribute information. Further, the utterance content analyzing unit 532 may store information specifying the user that has spoken or the sound collecting device 110 collected in the history storage unit 550 in association with the history as the attribute information. Further, when the voice information is identical to a certain keyword, an operation may be performed so that the voice information is not registered as the history.

Further, the utterance content analyzing unit 532 may analyze the voice information using the natural language processing such as the morphological analysis or the syntax analysis and specify processing to be performed in response to an inquiry when the voice information is voice information indicating such an inquiry. For example, when the voice information indicates an inquiry "Are there no fun games?" the utterance content analyzing unit 532 operates to specify processing of "present popular games in the store" in response to the inquiry. Further, voice information indicating an inquiry, a word or phrase indicating a response to the inquiry, and information representing processing corresponding to the response may be associated to be generated as a list in advance and then stored in a certain storage unit readable by the utterance content analyzing unit 532. Here, voice information indicating an inquiry, a word or phrase indicating a response to the inquiry, and information representing processing corresponding to the response are assumed to be stored in the dictionary data holding unit 540.

The utterance content analyzing unit 532 performs the natural language processing on the voice information, and when the voice information is recognized as the voice information indicating the inquiry, the utterance content analyzing unit 532 compares the voice information with the list, and specifies corresponding processing. Then, the utterance content analyzing unit 532 notifies the display control section 521 of information representing the specified processing through the analysis result acquiring unit 522 which will be described later. Through this operation, when the voice information indicating the inquiry is input, the display control section 521 can recognize processing to be performed as the response.

Further, when the acquired voice information indicates an inquiry, the utterance content analyzing unit 532 may record the word or phrase indicating the response to the inquiry in the history storage unit 550 as history in association with the acquired voice information. As described above, as the word or phrase indicating the response is associated with the history, when the voice information indicating the inquiry is acquired, the display control section 521 which will be described later can present the word or phrase indicating the response as the history information instead of the history of the acquired voice information.

As a concrete example, when the voice information is the inquiry "Are there no fun games?" a phrase such as "HIT GAME LIST" indicating that "popular games in the store are presented" may be stored in association with the history of the voice information. Through this operation, when the user 1 inputs the voice information such as "Are there no fun games?" the display control section 521 may present, for example, a link to "present popular games in the store" as history information displayed as "HIT GAME LIST." Of course, a link to "present popular games in the store" may be presented as the history information represented by the history of the voice information such as "Are there no fun games?"

The above-described configuration is merely exemplary, and when the acquired voice information indicates an inquiry, a method thereof is not limited as long as the history information of the word or phrase indicating the response can be presented. For example, when the acquired voice information indicates an inquiry, the utterance content analyzing unit 532 may notify the display control section 521 of the word or phrase indicating the response through the analysis result acquiring unit 522. In this case, the display control section 521 may switch a display of the history information based on the history acquired through the history information acquiring unit 524 to the word or phrase indicating the response acquired from the utterance content analyzing unit 532.

The level analyzing unit 533 operates similarly to the level analyzing unit 333 (see FIG. 3) according to the first embodiment. The level analyzing unit 533 analyzes the voice signal, specifies a level of the signal, and outputs the specified level to the analysis result acquiring unit 522. The level analyzing unit 533 may output a peak value of the voice signal or may output an average value of levels. Further, the level analyzing unit 533 may operate to monitor the acquired voice signal and sequentially output the level of the voice signal.

(Dictionary Data Holding Unit 540)

The dictionary data holding unit 540 has the same configuration as the dictionary data holding unit 340 (see FIG. 3) according to the first embodiment. In other words, the dictionary data holding unit t40 stores various kinds of data used when the voice information acquiring unit t31 and the utterance content analyzing unit 532 perform their operations. Examples of various kinds of data include various kinds of models and dictionary data used when the voice information acquiring unit 531 performs the voice recognition process and dictionary data used when the utterance content analyzing unit 532 interprets the meaning of the voice information.

Further, the dictionary data holding unit 540 stores the voice information indicating the inquiry, the word or phrase indicating the response to the inquiry, and the information representing processing corresponding to the response in association with one another. Through this operation, the utterance content analyzing unit 532 can search the dictionary data holding unit 540 and specify a word or phrase indicating a response to a desired inquiry and processing corresponding to the response.

(System Information Acquiring Unit 570)

The system information acquiring unit 570 acquires a notification representing that certain processing has been performed and a result of the processing from a processing unit (not shown) of the information processing apparatus 10 when the processing has been performed by the processing unit. As a concrete example, when another user (for example, referred to as a user 2) logs into a certain system, the processing unit notifies the system information acquiring unit 570 of the fact that the user 2 has logged in. As another example, when mail directed to the user 1 is received, the system information acquiring unit 570 notifies the processing unit of the fact that mail directed to the user 1 has been received and content of the mail. The system information acquiring unit 570 stores information (which may be hereinafter referred to as "system information") notified of by the processing unit in the history storage unit 550 as history. A concrete operation using the history will be described later as a fourth example.

(History Storage Unit 550)

The history storage unit 550 stores the acquired voice information as a history. The history storage unit 550 may store the acquired voice information in association with information representing a timing at which the voice information is acquired. Through the configuration of the history storage unit 550, it is possible to specify information or content associated with certain voice information based on a previous voice recognition result, for example, it is possible to specify a "moving image watched yesterday."

Further, the history storage unit 550 may store voice information as a history based on content uttered by a user other than a certain user, for example, based on voice signals collected by a plurality of different sound collecting devices 110. Through the configuration of the history storage unit 550, it is possible to specify information or content associated with voice information that is most frequently used by a plurality of users other than a single user based on a previous voice recognition result, for example, it is possible to specify a "song played most last week."

Further, the history storage unit 550 may store the system information notified of by the system information acquiring unit 570 as history as well as the voice information. At this time, the history storage unit 550 may store the history of the voice information and the history of the system information separately from each other.

(Display Control Unit 520)

The display control unit 520 performs processing related to generation and display update of the screen v50. The display control unit 520 includes the display control section 521, the analysis result acquiring unit 522, a content information acquiring unit 523, a history information acquiring unit 524, and an input information acquiring unit 525 as illustrated in FIG. 30.

The analysis result acquiring unit 522 acquires the analysis result of the voice signal, that is acquired in the signal acquiring unit 510, from the analyzing unit 530, and outputs the acquired analysis result to the display control section 521. Examples of the analysis result of the voice signal include information representing whether or not the voice information corresponding to the acquired voice signal corresponds to a certain keyword and information representing the level of the voice signal. Further, when the voice information corresponds to a certain keyword, the analysis result of the voice signal may include information representing processing associated with the corresponding keyword. In this case, the display control section 521 that has received the analysis result can recognize processing to be performed in association with the keyword.

Further, when information representing that the voice information corresponds to a certain keyword is received from the analyzing unit 530, the analysis result acquiring unit 522 notifies the input information acquiring unit 525 of the information. A detailed operation based on this processing will be described later together with the details of the input information acquiring unit 525.

The content information acquiring unit 523 acquires information of content satisfying a certain condition from the content specifying unit 561 which will be described later. Specifically, the content information acquiring unit 523 generates a search condition for acquiring content based on an instruction given from the display control section 521, and outputs the generated search condition to the content specifying unit 561 which will be described later. As a response thereto, the content information acquiring unit 523 acquires information of content satisfying the search condition from the content specifying unit 561. The content information acquiring unit 523 outputs the acquired information of the content to the display control section 521. Through this configuration, the display control section 521 can acquire, for example, information of content corresponding to desired voice information and cause the acquired information of content to be displayed as relevant information relevant to the voice information.

The history information acquiring unit 524 receives an instruction of the display control section 521, acquires history satisfying a certain condition from the history storage unit 550, and outputs the acquired history to the display control section 521.

As a concrete example, the history storage unit 550 may acquire history recorded after a timing at which the screen v50 is initially displayed based on the instruction from the display control section 521. Through this operation, for example, the user 1 causes the screen v50 to be displayed on the display device 100, and then history corresponding to voice information input as an utterance of the user 1 is displayed on the screen v50. As another example, the history storage unit 550 may acquire history recorded during a certain period of time (for example, over the past three days) based on the instruction from the display control section 521.

Further, the processing performed by the history information acquiring unit 524 may be performed, for example, in synchronization with a timing at which the signal acquiring unit 510 detects the voice information. Through this configuration, it is possible to cause information based on the history of the detected voice information to be displayed on the screen v50 in real time.

When the acquired voice information corresponds to a certain keyword, the input information acquiring unit 525 acquires a notification representing that the voice information corresponds to a certain keyword from the analysis result acquiring unit 522. When this notification is received, the input information acquiring unit 525 notifies the display control section 521 of the fact that there is an input (in this case, an input of a certain keyword as the voice information) based on a predetermined operation. Through this operation, when a certain keyword is input as the voice information, the display control section 521 can update a display of the screen v50 as processing corresponding to the keyword is performed. As a concrete example, when the voice information corresponding to a certain keyword (for example, "Actions") is acquired, the display control section 521 perform an operation of causing the content information acquiring unit 523 to acquire information of content related to the history information displayed on the screen v50 as the relevant information. The details of this operation of the input information acquiring unit 525 will be described later in a second example of the present embodiment.

Further, an input device such as a mouse, keyboard, or a touch panel may be installed in the information processing apparatus 10 as an operating unit 120, and the input information acquiring unit 525 may be configured to acquire information representing operation content from the operating unit 120. Through this configuration, for example, when a predetermined operation is performed on the operating unit 120, the input information acquiring unit 525 can notify the display control section 521 of the fact that an input based on the predetermined operation has been input to the operating unit 120. As a concrete example, when a certain input operation is performed on the operating unit 120 configured with a touch panel, the display control section 521 can give the display control section 521 the same notification when the voice information corresponding to the certain keyword is acquired. In other words, when a certain operation is performed on the operating unit 120 as well as when there is a voice input, the same processing when the voice input is made can be performed.

The display control section 521 first generates the screen v50 when the display device 100 is activated. Parts such as images used to generate the screen v50 may be stored in a component readable by the display control section 321 in advance. Through this operation, certain display information including the voice bar v510 is displayed on the screen v50.

Further, when the display device 100 is activated, the display control section 521 may generate the history information v521 on the history already accumulated in the history storage unit 550 and cause the history information v521 to be displayed on the screen v50. In this case, it is preferable that the display control section 521 acquire history from the history storage unit 550 based on a certain condition through the history information acquiring unit 524 and cause the history information v521 of the acquired history to be displayed on the screen v50. Through this operation, for example, an operation of "displaying the history information v521 on past history of up to one day prior to a current point in time" is possible.

The display control section 521 causes the generated screen v50 to be displayed on the display unit 102. As a result, the screen v50 is displayed on the display unit 102.

Further, when the signal acquiring unit 510 acquires the voice signal, the display control section 521 acquires the analysis result of the acquired voice signal from the analyzing unit 530 through the analysis result acquiring unit 522.

As a concrete example, the display control section 521 receives a determination result as to whether or not voice information based on the acquired voice signal is identical to a certain keyword from the utterance content analyzing unit 532. When the voice information based on the acquired voice signal corresponds to the certain keyword, the display control section 521 acquires information representing processing corresponding to the keyword from the utterance content analyzing unit 532 through the analysis result acquiring unit 522. When the information representing processing corresponding to the certain keyword is received from the utterance content analyzing unit 532 through the analysis result acquiring unit 522, the display control section 521 performs the processing represented by the information. The details of this operation of the display control section 521 will be described later as the second example of the present embodiment.

Further, when the voice information based on the acquired voice signal is not identical to the certain keyword, the display control section 521 may newly display history information of history corresponding to the voice information. In this case, when the determination result is received from the utterance content analyzing unit 532, the display control section 521 acquires history of the voice information corresponding to the acquired voice signal from the history storage unit 550 through the history information acquiring unit 524. The display control section 521 generates history information based on the acquired history, and causes the generated history information to be displayed on the screen v50. The details of this operation of the display control section 521 will be described later as the first example of the present embodiment.

Further, the display control section 521 may have a function of acquiring information relevant to the voice information corresponding to the history information as relevant information. In this case, the display control section 521 may cause the content information acquiring unit 523 to acquire a list of content relevant to the history information displayed on the screen v50, and display the acquired list of content as the relevant information. As a concrete processing example of this function, the display control section 521 first extracts history associated with the history information. Then, the display control section 521 outputs the extracted history to the content information acquiring unit 523, and gives an instruction for acquiring the relevant information to the content information acquiring unit 523. In response to the instruction, the display control section 521 acquires a list of content from the content specifying unit 561 through the content information acquiring unit 523. The display control section 521 displays the list of content acquired from the content specifying unit 561 as the relevant information in association with corresponding history information. The details of this operation of the display control section 521 will be described later as the second example of the present embodiment.

Further, the display control section 521 updates a display of the voice bar v510 according to the detection status of the voice signal. As a concrete example, the display control section 521 displays a case in which the voice signal is detected (when the user is speaking) and a case in which the voice signal is not detected (when there is no sound) to be discernible from each other through the voice bar v510. The details of this operation of the display control section 521 will be described later as a third example of the present embodiment.

(Content DB 560)

The content DB 560 stores the content in association with attribute information representing attributes of the content. The attribute information is information specifying the content, and specifically, examples of the attribute information include information representing a type of content such as a game, a song, or a moving image and information related to content such as a release date, a singer, and a maker of a distributor. For example, the attribute information may include information representing whether or not content corresponds to voice recognition. Since the attribute information represents whether or not voice recognition is supported, the display control section 521 can determine whether or not voice recognition is supported for the content and switch a display form of display information corresponding to content according to whether or not voice recognition is supported.

(Content Specifying Unit 561)

The content specifying unit 561 extracts information of content satisfying a desired search condition from the content DB 560. Specifically, the content specifying unit 561 acquires a search condition specifying content from the content information acquiring unit 523. The content specifying unit 561 compares the acquired search condition with the attribute information of the content, and extracts content satisfying the search condition from the content DB 560. The content specifying unit 561 outputs information of the extracted content to the content information acquiring unit 523 as the response to the search condition (search result).

Further, the content specifying unit 561 may extract content information using a combination of histories of the voice information stored in the history storage unit 550. For example, the content specifying unit 561 may specify voice information (or a word or phrase included in voice information) that is very frequently used during a certain period of time and extract content corresponding to the voice information from the content DB 560. Through this configuration, the content specifying unit 561 can extract indirectly designated content such as a "song played most last week" or a "moving image watched yesterday."

Further, the content specifying unit 561 may be configured to extract a history of utterances in connection with desired content from the history storage unit 550. Through this configuration, the content specifying unit 561 can extract content uttered by another user in connection with certain content as information associated with corresponding content. Further, the content specifying unit 561 may be configured to extract other history uttered in connection with desired history as well as content from the history storage unit 550. Through this configuration, the content specifying unit 561 can extract content uttered by another user as information relevant to the history in connection with a desired word or phrase (voice information).

Further, the respective components configuring the display device 100 need not necessarily be implemented as a single device, and for example, the respective components may be connected via a network. As a concrete example, the signal acquiring unit 510, the display control unit 520, and the display unit 102 may be configured as a terminal, and the analyzing unit 530, the dictionary data holding unit 540, the history storage unit 550, the content DB 560, the content specifying unit 561, and the system information acquiring unit 570 may be arranged on a server.

3-4. First Example of Third Embodiment 3-4-1. Outline of First Example

Figure 31:
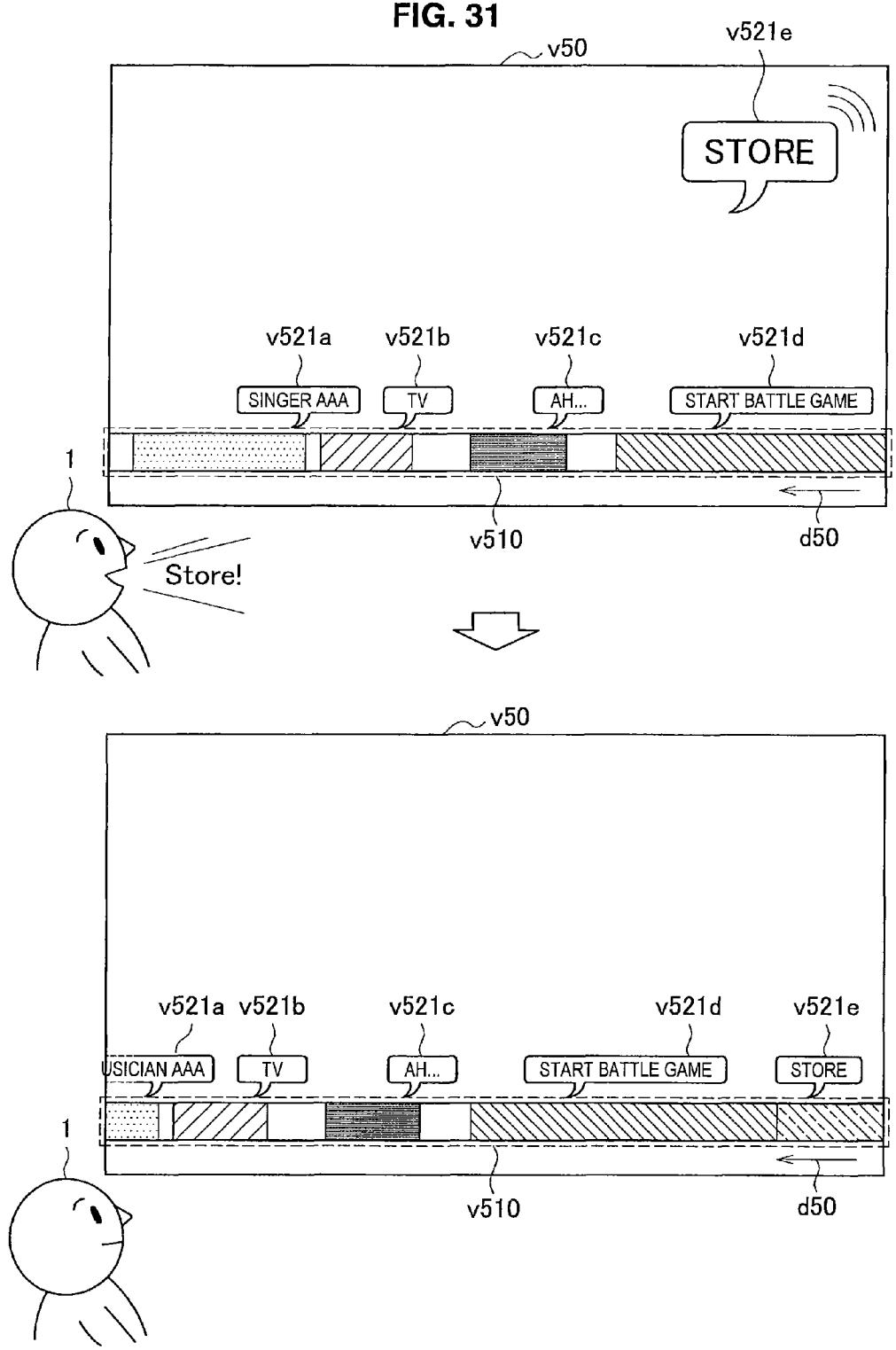
FIG. 31 is a diagram illustrating an exemplary display according to a first example of the third embodiment.

An exemplary concrete operation of the information processing apparatus 10 according to the first example of the third embodiment will be described. When voice information is acquired as the recognition result of the collected voice signal, the information processing apparatus 10 according to the first example of the present embodiment stores the acquired voice information as history without immediately performing processing or content corresponding to the voice information. Then, the display control section 521 of the information processing apparatus 10 causes the stored history to be displayed on the screen as display information (hereinafter referred to as "history information") accessible by voice recognition. In the first example, a configuration and an operation of a screen of the information processing apparatus 10 according to the first example of the present embodiment will be described with reference to FIG. 31 focusing on processing until the history is displayed as the history information. FIG. 31 is a diagram illustrating an exemplary display according to the first example of the present embodiment. An example of accessing the history information and performing processing will be described later as the second example.

The example of the screen v50 illustrated in FIG. 31 illustrates a state in which the user 1 utters a word "STORE" in a state in which history information v521a to v521d is displayed on the voice bar v510. Further, the history information v521e corresponds to the voice information associated with the utterance of the user 1. Hereinafter, when it is unnecessary to particularly distinguish the history information v521a to v521e from each other, there are cases in which they are referred to as simply "history information v521." Further, the first example of the present embodiment will be described focusing on the history information v521, and the details of the voice bar v510 will be described later separately as the third example.

The display control section 521 displays the history information v521a to v521d displayed on the voice bar v510 to be arranged in time series in the order in which the corresponding history is recorded. In the example illustrated in FIG. 31, the history information v521a is assumed to be oldest, and the history information v521b, v521c, and v521d is assumed to be newest in the described order.

Further, the display control section 521 may display the history information v521a to v521d to be scrolled in a direction in which the information is arranged in a chronological order. In the example illustrated in FIG. 31, the display control section 521 displays the history information v521a to v521d to be scrolled in a direction d50. As described above, a display is performed such that the history information v521a to v521d is scrolled, and thus the user 1 can intuitively recognize that the history information v521a to v521d is arranged chronologically and in a chronological direction.

When the user 1 utters the word "STORE" into the sound collecting device 110, a collected voice signal is recognized by the analyzing unit 530 and recorded as history. Then, the display control section 521 causes the history information v521e corresponding to the history of the collected voice information to be additionally displayed on the screen v50.

The display control section 521 causes the additionally displayed history information v521e to be displayed on the voice bar v510, similarly to the history information v521a to v521d already displayed. At this time, the history corresponding to the added history information v521e is updated. Thus, in the example illustrated in FIG. 31, the display control section 521 arranges the history information v521e on the right side (a side that is new in time series) of the history information v521d.

Further, with a scroll display in the direction d50, the display control section 521 may cause the history information v521 that has moved to the outside of the screen v50 not to be displayed without change or to be displayed again within the screen v50. For example, when the history information v521 has moved to the outside of the screen from the left end of the screen v50, the display control section 521 may cause the history information v521 to be displayed again within the screen v50 such that the history information v521 moves from the right end of the opposite side. Further, when the history information v521 is displayed again within the screen v50, the display control section 521 may adjust a timing at which the history information v521 is displayed again such that the newest history information v521 is displayed apart from the oldest history information v521 so that the new history information v521 and the old history information v521 can be recognized chronologically.

Figure 32:
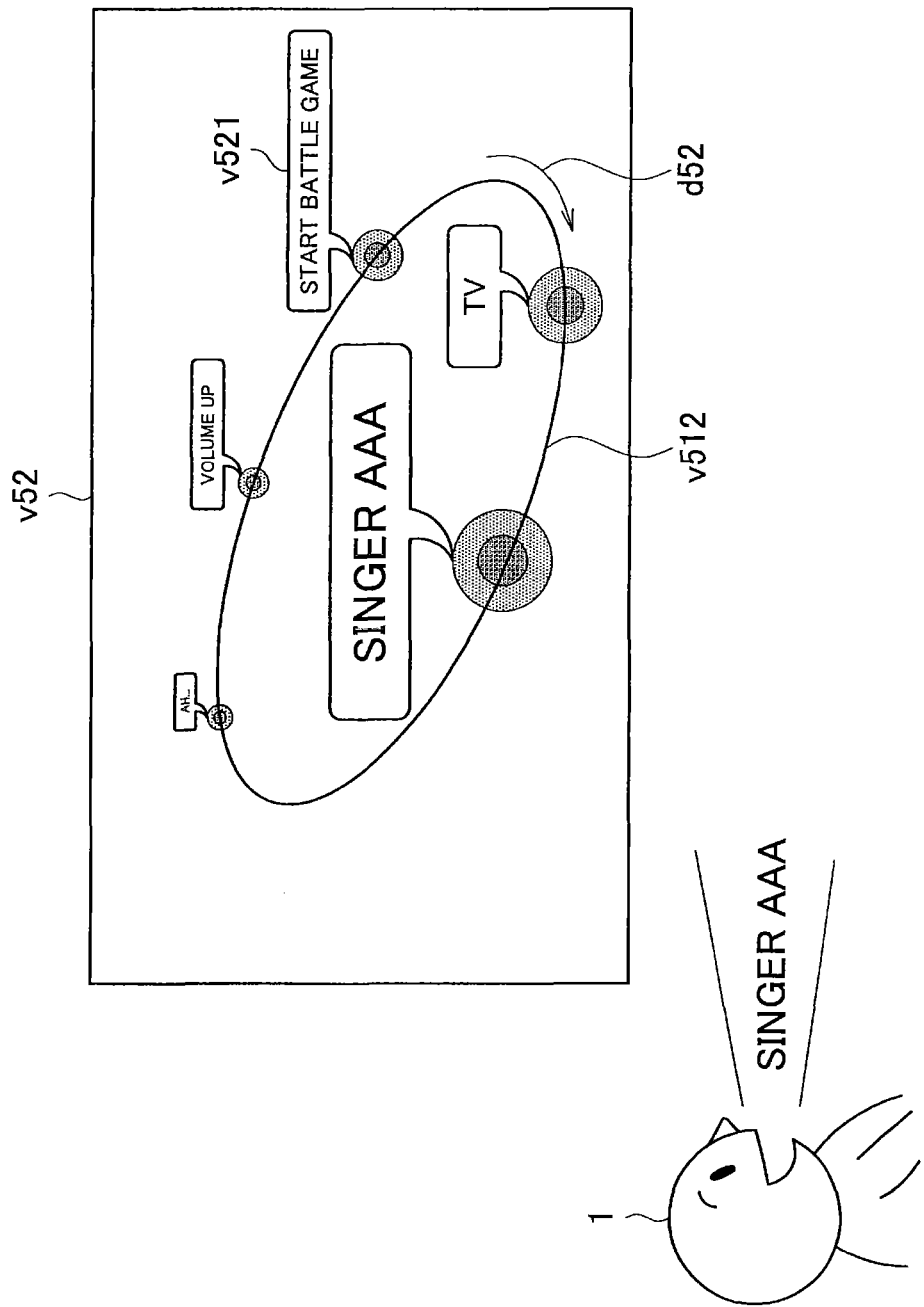
FIG. 32 is a diagram illustrating an exemplary display according to the first example of the third embodiment.

Further, the display form of the history information v521 is not limited to the display form of the screen v50 illustrated in FIG. 31. For example, FIG. 32 illustrates an exemplary display according to the first example of the present embodiment, and illustrates a screen v52 different in a display form from the screen v50 illustrated in FIG. 31. As illustrated in FIG. 32, the display control section 521 may display the screen v52 in which the history information v521 is arranged in the form of a ring. In this case, the display control section 521 may display the history information v521 to be arranged in a time series, similarly to the screen v50 illustrated in FIG. 31.

Further, similarly to the screen v50 illustrated in FIG. 31, the display control section 521 may display the history information v521 to be scrolled in a certain direction along a ring. For example, a direction d52 illustrated in FIG. 32 corresponds to the direction d50 of FIG. 31. In this case, the display control section 521 displays the history information v521 to be scrolled in the direction d52 in the screen v52.

3-4-2. Operation of First Example

Figure 33:
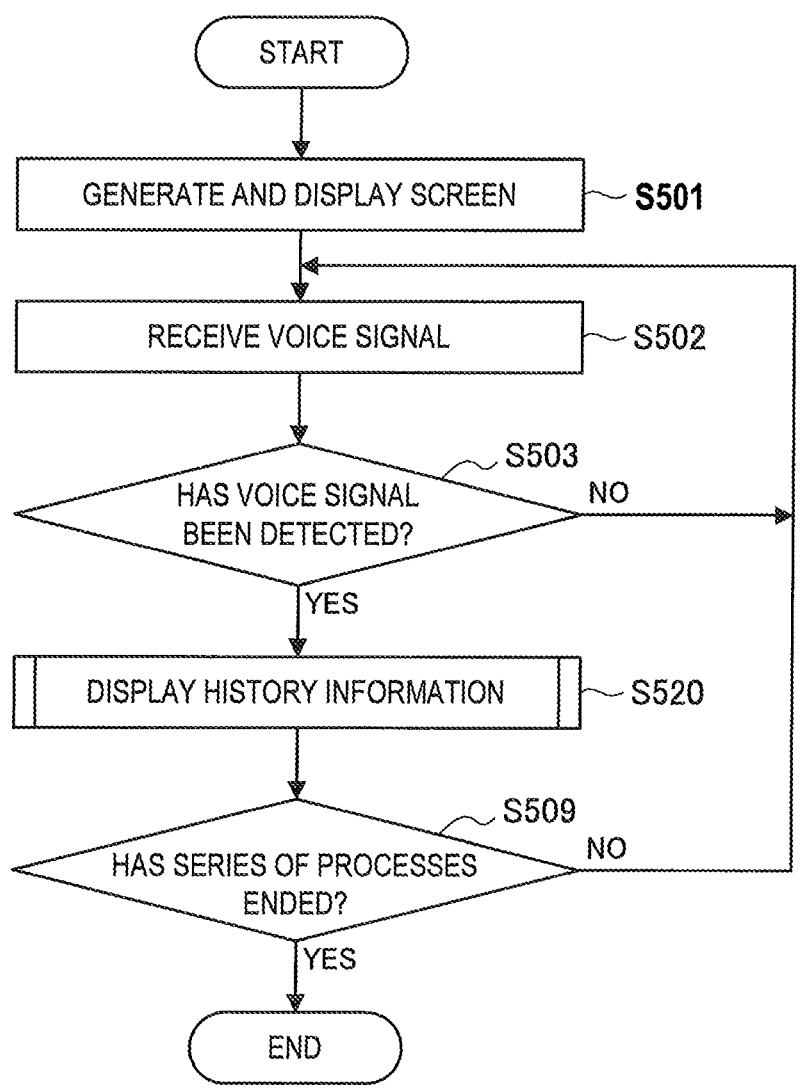
FIG. 33 is a flowchart illustrating an exemplary information display operation of the information processing apparatus according to the first example of the third embodiment.
Figure 34:
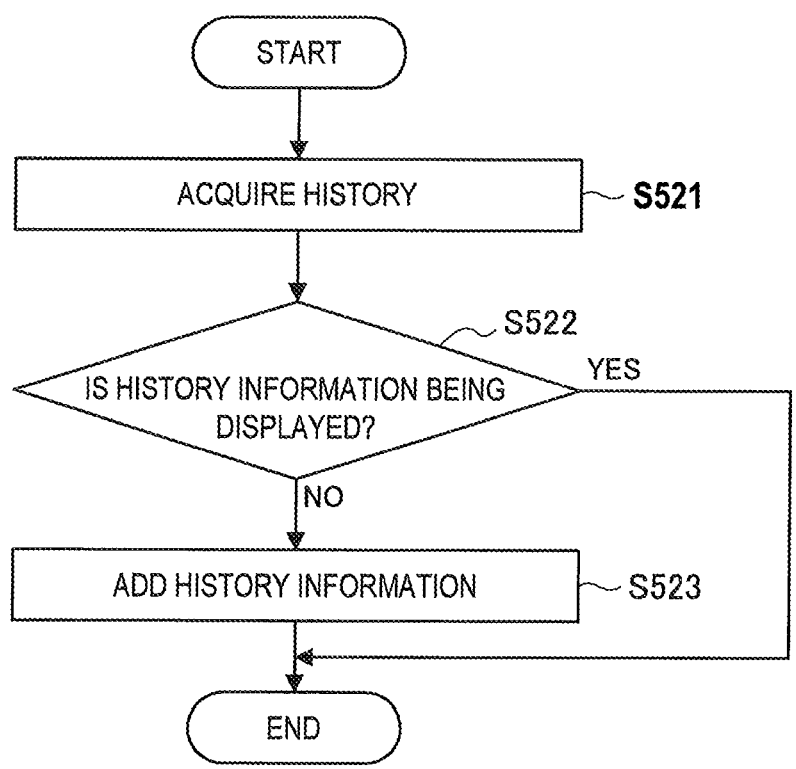
FIG. 34 is a flowchart illustrating an exemplary history information display process of the information processing apparatus according to the first example of the third embodiment.

Next, the operation of the information processing apparatus 10 according to the first example of the present embodiment will be described with reference to FIGS. 33 and 34. FIG. 33 will be referred to first. FIG. 33 is a flowchart illustrating an exemplary information display operation of the information processing apparatus 10 according to the first example of the present embodiment.

(Step S501)

When the display device 100 is activated, the display control section 521 first generates the screen v50. The parts such as images used to generate the screen v50 may be stored in a component readable by the display control section 521. Through this operation, certain display information including the voice bar v510 is displayed on the screen v50.

Further, when the display device 100 is activated, the display control section 521 may generate the history information v521 for the history already accumulated in the history storage unit 550 and cause the history information v521 to be displayed on the screen v50. In this case, it is preferable that the display control section 521 acquire a history from the history storage unit 550 based on a certain condition through the history information acquiring unit 524 and cause the history information v521 of the acquired history to be displayed on the screen v50. Through this operation, for example, an operation of "displaying the history information v521 on past history of up to one day prior to a current point in time" is possible.

The display control section 521 causes the generated screen v50 to be displayed on the display unit 102. As described above, as an initial operation, the display control section 521 generates the screen v50, and causes the generated screen v50 to be displayed on the display unit 102.

(Step S502)

When the screen v50 is generated and the generated screen v50 is displayed on the display unit 102, the display device 100 starts to receive the voice signal. Specifically, the signal acquiring unit 510 starts to acquire the voice signal collected by the sound collecting device 110.

(Step S503)

The signal acquiring unit 510 continuously performs processing related to acquisition of the voice signal as long the voice recognition process is in an enabled state (for example, as long as the display device 100 is in an activated state) (NO in Step S503).

(Step S520)

When the signal acquiring unit 510 acquires the voice signal and detects the voice signal (YES in Step S503), the display device 100 performs the voice recognition process on the acquired voice signal, and causes corresponding voice information to be displayed on the screen v50 as history information. An operation related to a display of history information will be described below with reference to FIG. 34. FIG. 34 is a flowchart illustrating an exemplary history information display process of the information processing apparatus 10 according to the first example of the present embodiment.

(Step S521)

Upon acquiring the voice signal collected by the sound collecting device 110, the signal acquiring unit 510 outputs the acquired voice signal to the analyzing unit 530. The voice information acquiring unit 531 performs the voice recognition process on the voice signal output from the signal acquiring unit 510 to the analyzing unit 530, and generates voice information. The generated voice information is stored in the history storage unit 550 as history.

Further, the signal acquiring unit 510 notifies the display control section 521 of the detection of the voice signal. When a notification representing the detection of the voice signal is given from the signal acquiring unit 510, the display control section 521 acquires the history stored in the history storage unit 550 through the history information acquiring unit 524.

(Step S522)

After the history is acquired from the history storage unit 550, the display control section 521 checks whether or not the history information v521 corresponding to the acquired history is being displayed on the screen.

(Step S523)

When the history information v521 corresponding to the acquired history is not being displayed on the screen (NO in Step S522), the display control section 521 generates the history information v521 corresponding to the acquired history, and causes the generated history information to be displayed on the screen v50 in association with the acquired history. Further, when the history information v521 corresponding to the acquired history is already being displayed on the screen v50 (YES in Step S522), the display control section 521 may not perform processing related to generation and display of the history information v521.

(Step S509)

Here, FIG. 33 will be referred to again. When the voice signal is received, processing related to the display of the history information v521 in association with the reception of the voice signal is continuously performed unless the stop of the display device 100 is selected and a series of processes end (NO in Step S509). When the stop of the display device 100 is selected, the display device 100 ends and stops a series of processes (YES in Step S509).

As described above, when the voice information is acquired as the recognition result of the collected voice signal, the information processing apparatus 10 according to the first example of the present embodiment stores the acquired voice information as history without immediately performing processing or content corresponding to the voice information. Then, the information processing apparatus 10 causes the stored history to be displayed on the screen as display information accessible by voice recognition. Through this operation, even when an ambient noise such as such as a dialogue in which a voice input is not intended or an ambient sound (for example, a voice output from a television) is erroneously recognized, it is possible to prevent a situation in which processing corresponding to the noise is erroneously performed.

3-5. Second Example of Third Embodiment

3-5-1. Outline of Second Example

Next, as the second example of the third embodiment, an exemplary operation of the information processing apparatus for accessing the history information v521 by a voice input and performing processing corresponding to the history associated with the corresponding history information v521 will be described with reference to FIG. 35. FIG. 35 is a diagram illustrating an exemplary display according to the second example of the present embodiment, and illustrates an example in which the user 1 utters a predetermined keyword, relevant information v530 related to the history information v521 is displayed, and processing corresponding to the displayed relevant information is performed by the information processing apparatus 10.

An example of a screen v53 illustrated in FIG. 35 illustrates a state in which the user 1 utters a predetermined keyword such as "Actions" in the state in which the history information v521a to v521d is displayed on the voice bar v510.

In the information processing apparatus 10 according to the second example of the present embodiment, when content uttered by the user 1 corresponds (is identical) to a certain keyword, the display control section 521 displays information related to content or processing associated with the history information v521 displayed on the screen v53 as the relevant information v530.

For example, when the history information v521a is information representing a name of a musician, the display control section 521 displays a music (content) list associated with the musician as the relevant information v530a. Further, when the history information v521d is information representing a title of a game, the display control section 521 displays a list of a series of the game as the relevant information v530d.

Further, the relevant information v530 is displayed when there is information associated with history represented by the history information v521. Thus, the history information v521 may not include information representing that the relevant information v530 is not displayed. For example, voice information that is meaningless such as a noise and includes no information associated therewith may be included as the voice information recorded as the history. The history information v521b represents the history information v521 corresponding to the voice information including no information associated therewith as described above. For the history information v521 of the voice information including no information associated therewith, the display control section 521 does not display the relevant information v530 even when the user 1 utters a keyword.

As illustrated in the screen v53 of FIG. 35, when the user 1 utters a word or phrase corresponding to content or processing displayed as the relevant information v530 in the state in which the relevant information v530 is displayed, the display control section 521 causes the processing unit (not shown) of the display device 100 to perform the content or the processing corresponding to the word or phrase. For example, FIG. 35 illustrates a screen v55 when a word or phrase representing content v531b in the relevant information v530b of the history information v521b is uttered. In this case, the display control section 521 causes the processing unit to activate the content v531b and display display information v532b corresponding to the content v531b. For example, the display information v532b corresponding to content is assumed to indicate an activation screen in which the content is activated, a screen of the content itself, or display information related to the content such as an icon of the content.

Further, when there is no content corresponding to a word or phrase uttered by the user 1 in the state in which the relevant information v530 is displayed for the history information v521, the analyzing unit 530 determines whether or not the word or phrase corresponds to a certain keyword. When the uttered word or phrase corresponds to a certain keyword, the display control section 521 performs processing corresponding to the keyword, and when the uttered word or phrase does not correspond to any keyword, the display control section 521 newly adds the history information v521 corresponding to the word or phrase.

3-5-2. Operation of Second Example

Figure 36:
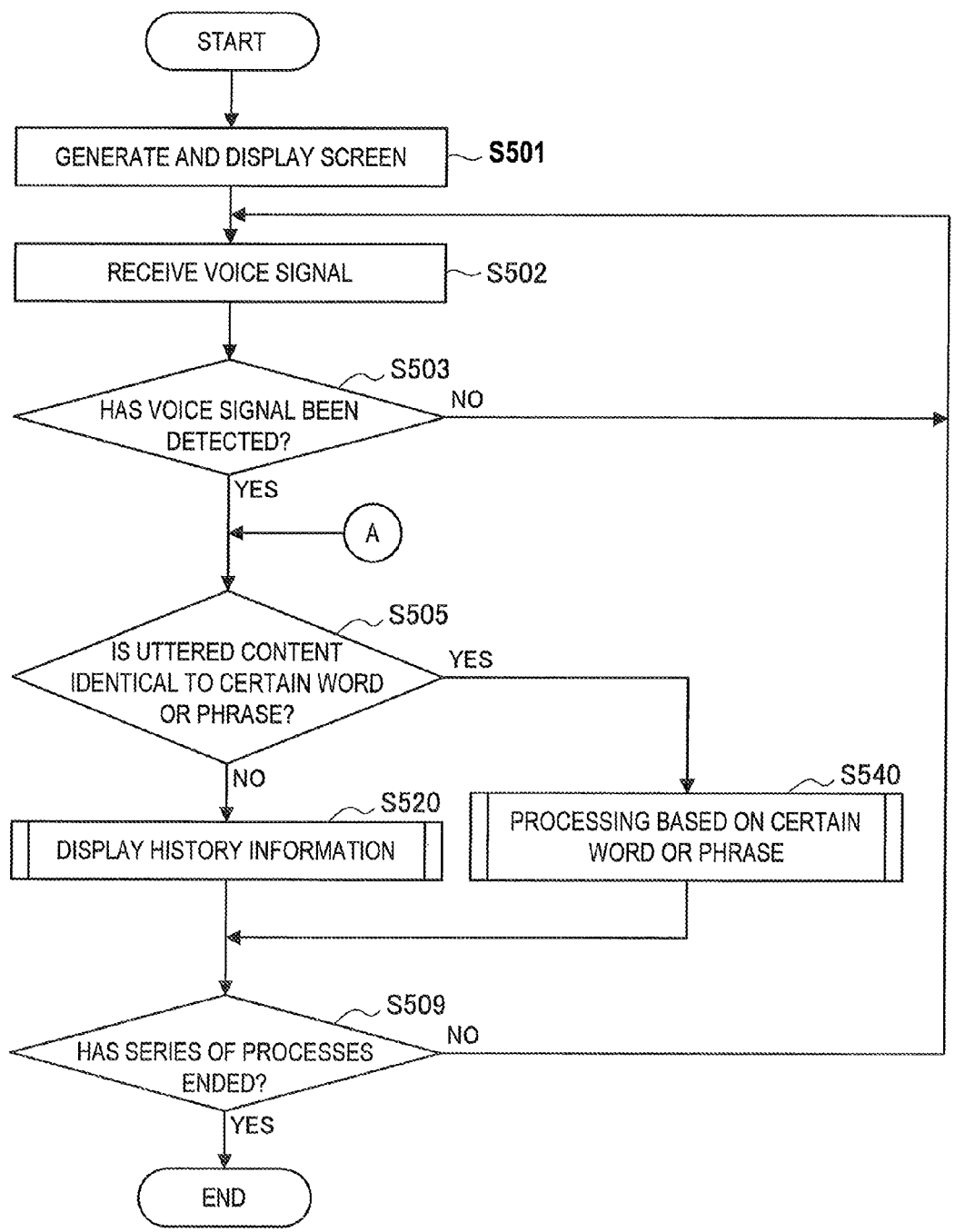
FIG. 36 is a flowchart illustrating an exemplary information display operation of the information processing apparatus according to the second example of the third embodiment.
Figure 37:
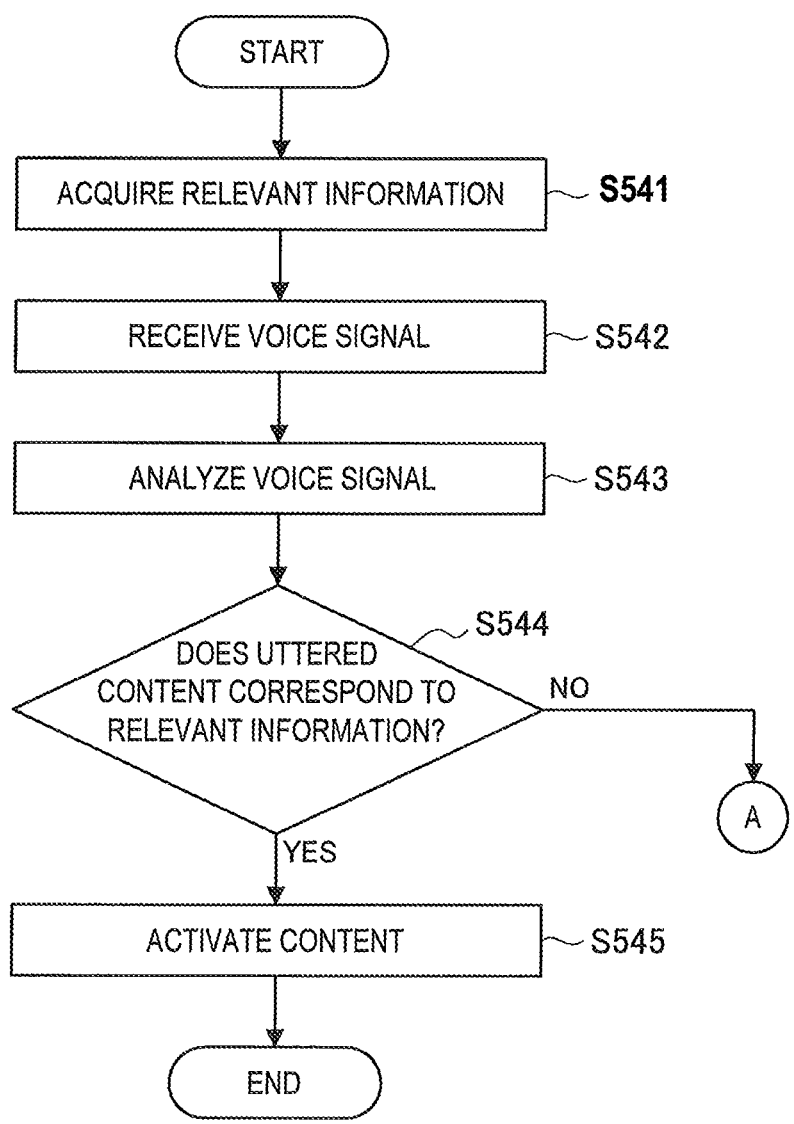
FIG. 37 is a flowchart illustrating exemplary processing of the information processing apparatus according to a second example of the third embodiment based on a certain word or phrase.

Next, the operation of the information processing apparatus 10 according to the second example of the present embodiment will be described with reference to FIGS. 36 and 37. FIG. 36 will be referred to first. FIG. 36 is a flowchart illustrating an exemplary information display operation of the information processing apparatus 10 according to the second example of the present embodiment. The following description will proceed focusing on the process of step S505 and steps subsequent thereto which are different from those of the first example, and a detailed description of the same process as in the first example will be omitted.

(Step S505)

When the voice signal collected by the sound collecting device 110 is acquired (detected) (YES in Step S503), the signal acquiring unit 510 outputs the acquired voice signal to the analyzing unit 530. The analyzing unit 530 outputs the acquired voice signal to the voice information acquiring unit 531. The voice information acquiring unit 531 performs the voice recognition process on the acquired voice signal, and generates the voice information. The voice information acquiring unit 531 outputs the generated voice information to the utterance content analyzing unit 532.

The utterance content analyzing unit 532 determines whether or not the acquired voice information is identical to a certain keyword (for example, "Actions" uttered by the user 1 in FIG. 35).

(Step S520)

When the acquired voice information is not identical to a certain keyword (No in step S505), the utterance content analyzing unit 532 causes the voice information to be stored in the history storage unit 550 as history. Processing related to a display of the history information v521 corresponding to the history stored in the history storage unit 550 is the same as in the first example (see FIG. 34). Thus, a detailed description thereof will be omitted.

(Step S540)

When the acquired voice information is identical to a certain keyword (YES in step S505), the utterance content analyzing unit 532 notifies the analysis result acquiring unit 522 of the determination result, and outputs information representing processing corresponding to the keyword to the analysis result acquiring unit 522. For example, when the acquired voice information is identical to the keyword "Actions" as illustrated in the example of FIG. 35, the utterance content analyzing unit 532 outputs information representing processing related to "generation and display of relevant information" to the analysis result acquiring unit 522. The following description will proceed under the assumption that processing related to "generation and display of relevant information" is specified as processing corresponding to the keyword.

The analysis result acquiring unit 522 receives the notification from the utterance content analyzing unit 532, and outputs the information representing processing corresponding to the acquired keyword to the display control section 521. An operation when the acquired voice information is identical to the certain keyword will be described below with reference to FIG. 37. FIG. 37 is a flowchart illustrating exemplary processing of the information processing apparatus 10 according to the second example of the present embodiment based on a certain word or phrase.

(Step S541)

Upon receiving information representing processing corresponding to a certain keyword from the utterance content analyzing unit 532 through the analysis result acquiring unit 522, the display control section 521 performs processing represented by the information.

For example, when the acquired voice information is identical to the keyword "Actions," the display control section 521 receives information representing processing related to "generation and display of relevant information."

The display control section 521 causes the content information acquiring unit 523 to acquire relevant information relevant to the history information v521 displayed on the screen v50 according to the information representing processing related to "generation and display of relevant information" acquired from the utterance content analyzing unit 532. Specifically, the display control section 521 first extracts history associated with the history information v521. Then, the display control section 521 outputs the extracted history to the content information acquiring unit 523, and gives an instruction for acquiring the relevant information to the content information acquiring unit 523.

Upon receiving the instruction from the display control section 521, the content information acquiring unit 523 generates a search condition for acquiring content using the acquired history (that is, the voice information) as a search key. The content information acquiring unit 523 outputs the generated search condition to the content specifying unit 561 for the acquired history.

The content specifying unit 561 searches the content DB 560 based on the search condition acquired from the content information acquiring unit 523, and extracts a list of content or processing (hereinafter referred to simply as "content") satisfying the search condition. The content specifying unit 561 outputs the extracted content list to the content information acquiring unit 523 as a response to the search condition. The content information acquiring unit 523 outputs the content list acquired for the history from the content specifying unit 561 to the display control section 521 for the corresponding history.

The display control section 521 displays the content list acquired for the history as the history information v530 in association with the history information v521 corresponding to the history (see FIG. 35).

(Step S542)

When the relevant information v530 is displayed for the history information v521, the display device 100 receives the voice signal again.

(Step S543)

When the sound collecting device 110 collects the voice signal again, the voice information acquiring unit 531 generates the voice information based on the collected voice signal. The generated voice information is output to the display control section 521 through the analysis result acquiring unit 522.

(Step S544)

The display control section 521 compares the voice information acquired from the voice information acquiring unit 531 with the content list included in the relevant information v530 of the history information v521, and specifies processing or a list corresponding to the acquired voice information.

(Step S545)

When the content corresponding to the acquired voice information is specified (YES in step S544), the display control section 521 causes the processing unit (not shown)

of the display device 100 to execute the content, and displays the display information v532 corresponding to the content.

Further, when it is difficult to specify the content corresponding to the acquired voice information (NO in step S544), preferably, the process proceeds to processing illustrated in step S505 of FIG. 36, and it is determined whether or not the voice information is identical to a certain keyword. The subsequent process is the same as the process performed by the information processing apparatus 10 according to the first example of the present embodiment. Thus, a detailed description thereof will be omitted.

In the above-described example, when a certain keyword is uttered, the relevant information v530 is displayed, but for example, an operating unit 120 such as a mouse, a keyboard, or a touch panel may be installed, and when a certain operation is performed through the operating unit 120, the relevant information v530 may be similarly displayed. In this case, as illustrated in FIG. 30, the input information acquiring unit 525 that determines whether or not operation content on the operating unit 120 is a certain operation may be installed.

When the user 1 performs an operation on the operating unit 120, information representing the operation content is output to the operating unit 120. The input information acquiring unit 525 detects and acquires operation information output from the operating unit 120. The input information acquiring unit 525 determines whether or not the acquired operation information represents certain operation content, and when the acquired operation information represents certain operation content, the input information acquiring unit 525 gives a notification representing that the operation information represents the certain operation content to the display control section 321. Upon receiving the notification, the display control section 321 performs the same operation when the information representing processing related to "generation and display of relevant information" is received.

Further, when the input information acquiring unit 525 is installed, the analysis result acquiring unit 522 may operate to output the information representing processing related to "generation and display of relevant information" to the input information acquiring unit 525. In this case, when the information representing processing related to "generation and display of relevant information" is received, the input information acquiring unit 525 may recognize the information in the same manner when the operation information representing the certain operation is acquired from the operating unit 120 and cause the display control section 521 to give a notification. Through this configuration, the information processing apparatus 10 according to the second example can simplify processing without causing the display control section 521 to perform complicated determination.

As described above, as a predetermined keyword is uttered, the information processing apparatus 10 according to the second example of the present embodiment displays the relevant information v530 associated with each history information v521, and performs processing corresponding to the displayed relevant information. Through this configuration, the information processing apparatus 10 according to the second example can access the displayed history information v521 at a timing desired by the user 1 and activate content associated with the history information v521. Thus, even when ambient noise such as a dialogue in which a voice input is not intended or an ambient sound (for example, a voice output from a television) is erroneously recognized, the information processing apparatus 10 according to the second example can prevent a situation in which processing corresponding to the noise is erroneously performed and perform desired processing at a desired timing.

3-6. Third Example of Third Embodiment 3-6-1. Outline of Third Example

Figure 38:
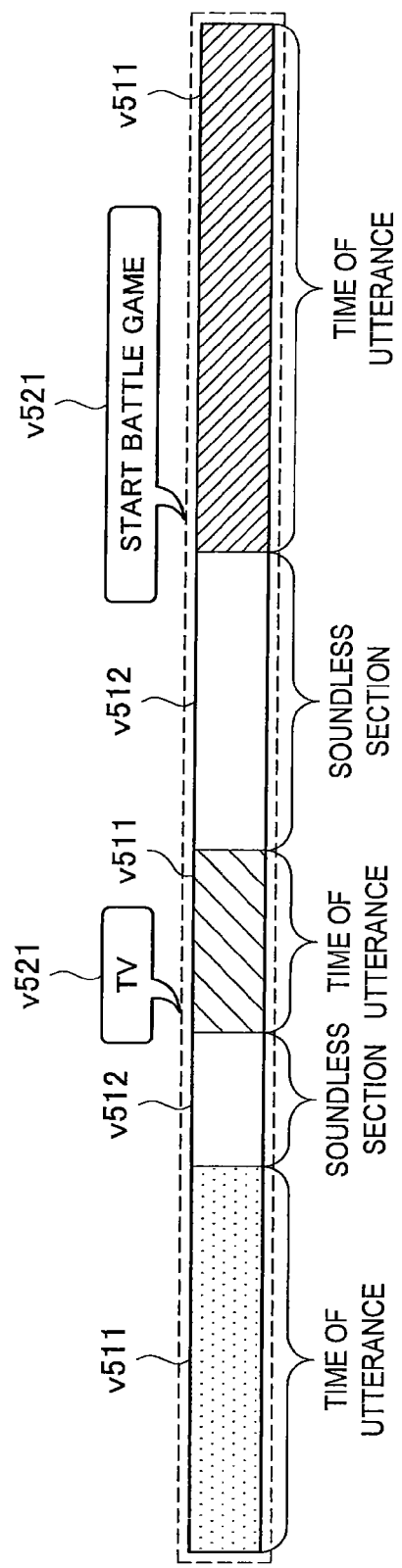
FIG. 38 is a diagram illustrating an exemplary voice bar according to the third example of the third embodiment.

A concrete example of the information processing apparatus 10 according to the third example of the third embodiment will be described. In the information processing apparatus 10 according to the third example of the present embodiment, the display control section 521 monitors the detection status of the voice signal collected from the sound collecting device 110, and displays the voice bar v510 identifying whether utterance has been performed at each timing, that is, whether or not the voice signal has been detected. The details of the voice bar v510 will be described below with reference to FIG. 38. FIG. 38 is a diagram illustrating an exemplary voice bar v510 according to the third example of the present embodiment.

As illustrated in FIG. 38, the voice bar v510 is configured to include a region v511 representing a time of utterance and a region v512 representing a soundless section. The region v511 represents a situation in which the voice signal is being detected, and the region v512 represents a situation in which the voice signal is not being detected. In the example illustrated in FIG. 38, a horizontal direction corresponds to a position (timing) in time series. As a concrete example, in the example illustrated in FIG. 38, the right end of the voice bar v510 represents a current point in time, and as a position moves in the left direction, it represents past timings.

In the example illustrated in FIG. 38, the display control section 521 causes the region v511 or v512 to be displayed from the right end of the voice bar v510 according to the detection status of the voice signal, and causes each region to move in the left direction as a time elapses. As the voice bar v510 is displayed as described above, the user 1 can intuitively recognize whether or not the voice signal has been detected (is being detected).

Further, the display control section 521 may cause the history information v521 to be displayed above the voice bar v510. At this time, the display control section 521 may cause the history information v521 to be displayed in association with a region v521 representing a timing at which the voice information corresponding to the history information v521 is uttered. As the history information v521 is displayed as described above, the user 1 can intuitively recognize a timing at which the voice information corresponding to the history information v521 is uttered.

Further, in the example illustrated in FIG. 38, the display control section 521 causes the history information v521 to be displayed above the voice bar v510, but the present disclosure is not necessarily limited to this display form. For example, FIG. 39 is a diagram illustrating another exemplary voice bar v510.

Figure 39:
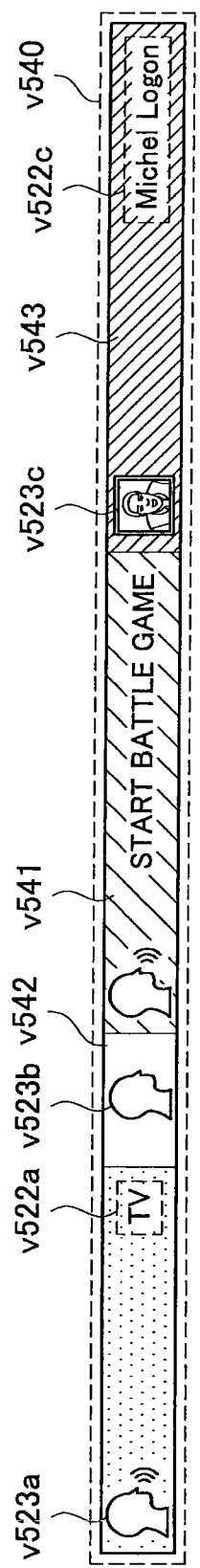
FIG. 39 is a diagram illustrating an exemplary voice bar according to the third example of the third embodiment.

In the example illustrated in FIG. 39, the display control section 521 displays a voice bar v540 including a region v541 representing a time of utterance and a region v542 representing a soundless section. The display control section 521 causes an icon v523a representing a time of utterance and history information v522a representing a history of uttered voice information to be displayed in and associated with the region v541 representing the time of utterance. Further, the display control section 521 causes an icon v523b representing a soundless section to be displayed in and associated with the region v542 representing a soundless section.

Further, the display control section 521 may cause system information (that is, information notified of by the processing unit as certain processing is executed) as well as uttered content to be displayed as the history information. For example, in the example illustrated in FIG. 39, the display control section 521 displays a result of a log-in process of the user as certain processing in association with a region corresponding to a timing at which the result of the process is acquired. Specifically, a region v543 is a region representing that system information has been acquired. The display control section 521 causes system information (for example, information representing that the user has logged in) to be displayed in and associated with the region v543 as history information v522c. Further, the display control section 521 may cause an icon v523c representing a history of certain processing to be displayed in the region v543. Further, the details of an example in which system information is displayed as history information will be described in the fourth example as well.

Further, a display form of each region is not limited as long as the region v511 and the region v512 can be identified. For example, as illustrated in FIG. 38, the display control section 521 may cause the region v511 and the region v512 to be displayed in different colors. Further, the display control section 521 may display colors displayed on the region v511 and v512 so that a hue or shading changes as time elapses. As the colors of the region v511 and v512 change as time elapses as described above, the user 1 can intuitively recognize that the voice signal is being continuously monitored (the voice recognition process is being performed).

Further, the display control section 521 may randomly decide the color of the region v511 representing the time of utterance for each region. In this case, the display control section 521 preferably displays the color according to an identifier such that each region is associated with the identifier (for example, a randomly decided identifier).

Further, the display control section 521 may change the color according to the lengths of the regions v511 and v512. In this case, preferably, a timer unit is installed in the display control section 521, and the display control section 521 measures a duration of a state in which utterance continues and a duration of a soundless state, and decides the color based on the measured values.

Further, the display control section 521 may change the color according to the level of the detected voice signal. For example, the display control section 521 may display warm colors such as red or orange when the level of the voice signal is high and change to colors having low intensity such as cold colors or gray-based colors as the level of the voice signal is lowered. Further, the level of the voice signal is preferably analyzed by the level analyzing unit 533 of the analyzing unit 530.

Further, the display control section 521 may change the color according to the frequency of the voice signal as well as the level of the voice signal. In this case, the analyzing unit 530 is preferably provided with a configuration capable of analyzing the frequency of the voice signal. As the color is changed according to the frequency of the voice signal as described above, the display control section 521 can perform a display, for example, to distinguish male speech from female speech.

Further, the display control section 521 may change the color of the region v511 according to the user who speaks. In this case, the display control section 521 may specify the user who is operating the information processing apparatus 10 based on, for example, log-in information of the user who has logged into the information processing apparatus 10.

Further, among the voice recognition engines using the voice recognition process, there is a voice recognition engine capable of outputting information representing a degree of reliability (degree of certainty) of the recognized voice information using a score value. For this reason, when the voice recognition engine capable of outputting the score value is being used, the display control section 521 may change the color of each region v511 according to the score value output from the voice recognition engine. As the color is changed according to the score value as described above, the user 1 can intuitively recognize the degree of reliability of the voice information recognized at that timing.

Further, when a plurality of sound collecting devices 110 are installed, the display control section 521 may change the color according to the sound collecting device 110 that has collected the voice signal. For example, positional information of each sound collecting device 110 may be stored in the display control section 521 in advance, and in this case, the display control section 521 can change the color according to a direction or a distance of a source of a voice signal. Further, when a plurality of users are using the different sound collecting devices 110, the display control section 521 can identifiably present the user who has spoken according to the sound collecting device 110 that has collected the voice signal. An example of an operation by a plurality of users will be described in the eighth example as well.

Further, when system information is displayed as illustrated in FIG. 39, the display control section 521 may change the color of each corresponding region according to the type of corresponding processing. As a concrete example, the display control section 521 may classify the type of processing according to a genre of processing such as "starting game," "playing recording," "playing music," and "receiving message."

Further, the display control section 521 may identify meaningless voice information such as "AH . . . " as an invalid recognition result and may not display history information corresponding to the invalid recognition result. Further, the display control section 521 may display history information corresponding to the invalid recognition result to be discernible from other history information, for example, such that the history information corresponding to the invalid recognition result is grayed out. Further, the display control section 521 may set a region of the voice bar corresponding to the invalid recognition result as an invalid region and display the invalid region to be discernible from other regions (a region representing a time of utterance or a region representing a soundless section). At this time, the display control section 521 may display the invalid region, for example, in a gray-based color so that regions other than the invalid region are highlighted. Further, the analyzing unit 530 may determine whether or not the voice information of the target is the invalid recognition result by comparing the voice information with dictionary data and then notify the display control section 521 of the determination result. As meaningless voice information is set as the invalid recognition result and a region or history information corresponding thereto is not displayed or is displayed to be discernible from other voice information as described above, it is possible to further highlight and display a region or history information corresponding to meaningful voice information.

Further, the display control section 521 may display the voice bar or the history information at only a desired timing.

As a concrete example, the display control section 521 may display the voice bar or the history information when the user 1 performs a certain operation (for example, the user performs an operation through the operating unit 120 or utters a certain keyword) and may not display the voice bar or the history information when the user 1 does not perform an operation. As another example, the display control section 521 may operate to display the voice bar or the history information when an input of a voice signal of a certain level or more is detected. As the voice bar or the history information is displayed only when a certain operation is recognized, that is, only when the user 1 desires to perform an operation as described above, it is possible to prevent the screen from becoming more complicated than necessary.

3-6-2. Operation of Third Example

Figure 40:
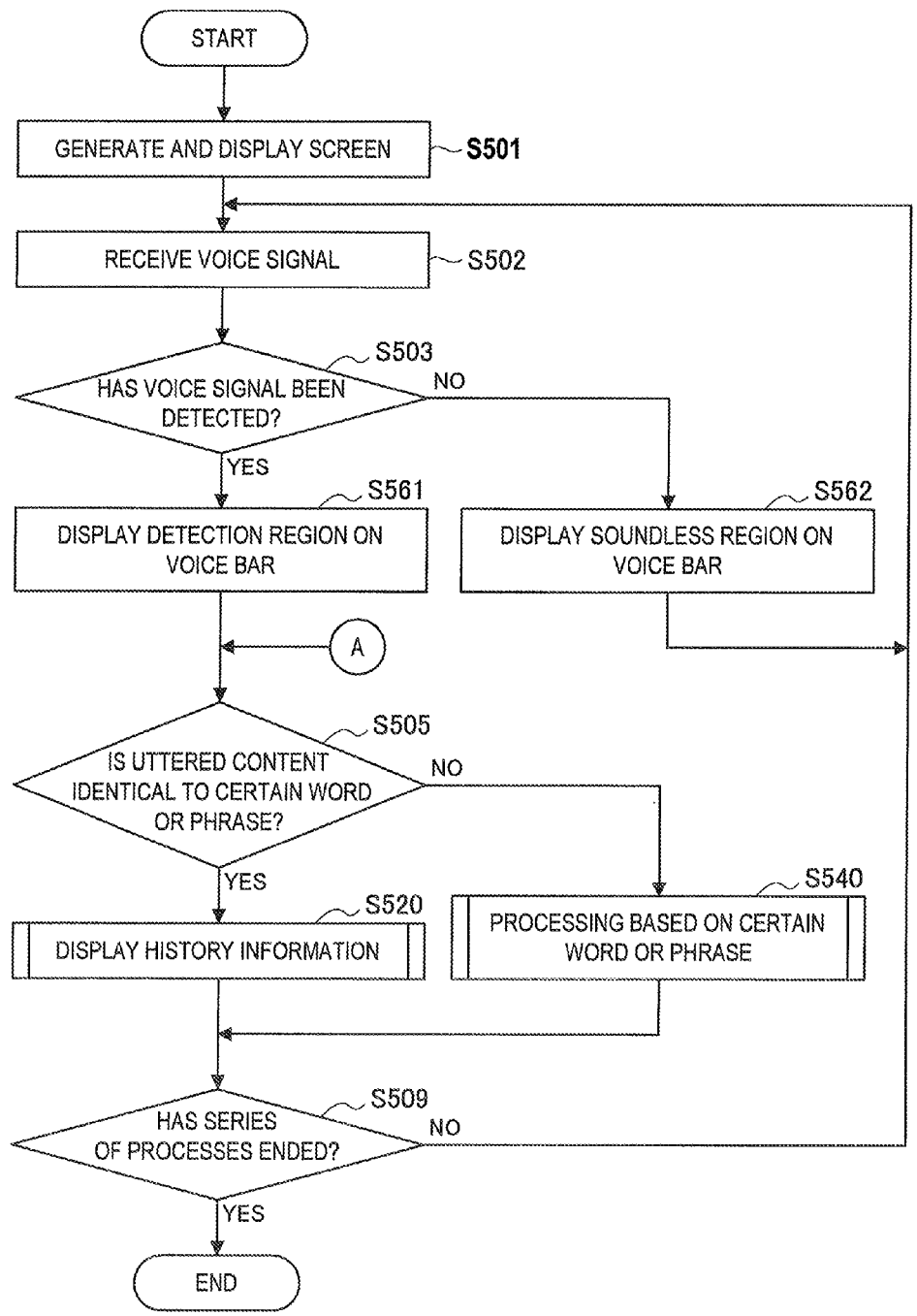
FIG. 40 is a flowchart illustrating an exemplary information display operation of the information processing apparatus according to the third example of the third embodiment.

Next, the operation of the information processing apparatus 10 according to the third example of the present embodiment will be described with reference to FIG. 40 in connection with the example in which the voice bar v510 illustrated in FIG. 38 is displayed. FIG. 40 is a flowchart illustrating an exemplary information display operation of the information processing apparatus 10 according to the third example of the present embodiment. Here, the description will proceed focusing on the process related to steps S502, S503, S561, and S562 different from the process according to the second example (see FIG. 36), and since the remaining process is the same as in the second example, a detailed description thereof will be omitted.

(Step S502)

When the screen v50 is generated and the generated screen v50 is displayed through the display unit 102, the display device 100 starts to receive the voice signal. Specifically, the signal acquiring unit 510 starts to acquire the voice signal collected by the sound collecting device 110. The signal acquiring unit 510 continues processing related to acquisition of the voice signal as long as the display device 100 is in the activated state (technically, as long as the voice recognition process is in the enabled state).

(Step S562)

While acquisition of the voice signal is not notified of by the signal acquiring unit 510 (NO in step S503), the display control section 521 causes the region v512 representing the soundless section to be displayed in the voice bar v510. At this time, the display control section 521 may change a display form of the region v512 according to a time elapsed after the region v512 is started.

(Step S561)

When the voice signal is detected (YES in step S503), the signal acquiring unit 510 notifies the display control section 521 of that the voice signal has been detected while the voice signal is being detected. While the signal acquiring unit 510 is notifying of the acquisition of the voice signal (YES in step S503), the display control section 521 causes the region v511 representing the time of utterance to be displayed in the voice bar v510.

Upon receiving the notification from the signal acquiring unit 510, the display control section 521 may acquire the analysis result of the voice signal from the analyzing unit 530 through the analysis result acquiring unit 522. In this case, the display control section 521 may change the display form of the region v511 according to the analysis result. As a concrete example, the display control section 521 may acquire information representing the level of the voice signal as the analysis result and change the color of the region v511 according to the level of the voice signal.

The subsequent process is the same as in the second example (see FIG. 36). Thus, a detailed description thereof will be omitted.

As described above, the information processing apparatus 10 according to the third example of the present embodiment monitors the detection status of the voice signal collected by the sound collecting device 110, and displays the voice bar v510 identifying whether or not utterance has been performed at each timing. Through this operation, the user 1 can intuitively identify whether or not an uttered voice has been recognized by the information processing apparatus 10.

3-7. Fourth Example of Third Embodiment

Figure 41:
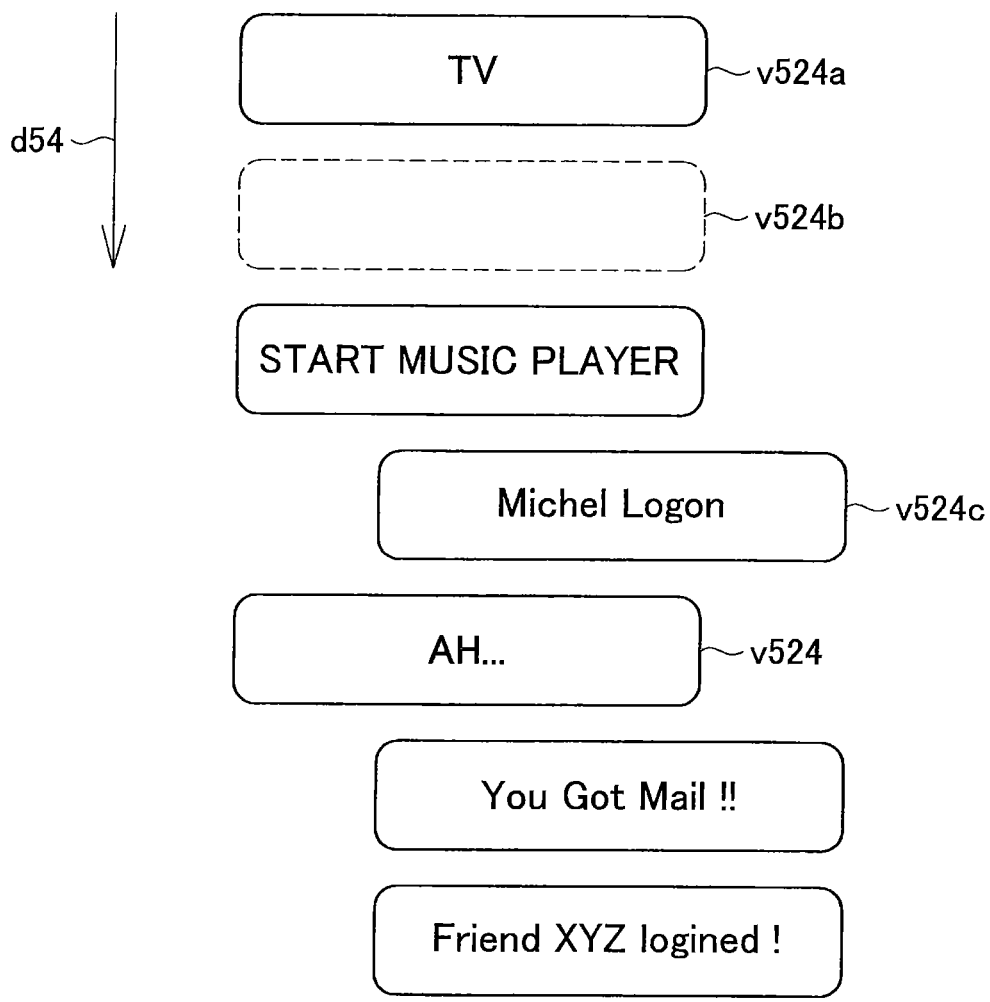
FIG. 41 is a diagram illustrating an exemplary display according to the fourth example of the third embodiment.

A concrete example of the information processing apparatus 10 according to a fourth example of the third embodiment will be described. In the information processing apparatus 10 according to the fourth example of the present embodiment, the display control section 521 presents system information (that is, information notified of by the processing unit as certain processing is executed) as the history information in addition to the history of the voice information. For example, the system information includes information output when predetermined processing is performed, for example, "when the user logs in" or "when mail is received." An example of presenting the history information will be described below with reference to FIG. 41. FIG. 41 is a diagram illustrating an exemplary display according to the fourth example of the present embodiment. The present disclosure is not limited to the example illustrated in FIG. 41, and the display control section 521 may present the history information corresponding to the system information as described above in the first and third examples.

In the example illustrated in FIG. 41, the display control section 521 displays history information v524 to be arranged chronologically as a message window. A direction d54 represents a chronological direction, with the newest history information v524 arranged at the lower end and the oldest history information v524 arranged at the upper end. The history information includes the history information v524 corresponding to the history of the voice information and the history information v524 corresponding to the system information. For example, the history information v524a corresponds to the history of the voice information of "TV" uttered in the past by the user 1. Further, the history information v524c corresponds to a process representing that "Michel logged on."

Further, the display control section 521 may identifiably display a soundless section, similarly to the third example. For example, a region v524b in which the history information v524 is not displayed represents a soundless section in which no voice signal is detected. As a method of detecting a soundless section, the same method as in the third example may be used. Of course, the display control section 521 may display the history information v524 to be arranged chronologically without displaying the region v524b representing the soundless section.

Further, the system information acquiring unit 570 causes the system information to be stored in the history storage unit 550 as a history. Specifically, when the processing unit (not shown) of the information processing apparatus 10 performs certain processing, system information corresponding to the processing is output to the system information acquiring unit 570. Then, the system information acquiring unit 570 causes the acquired system information to be stored in the history storage unit 550 as a history. As a result, the history storage unit 550 stores the history of the system information in addition to the history of the voice information. At this time, the history storage unit 550 may store the history of the voice information and the history of the system information to be discernible from each other.

The history of the system information stored in the history storage unit 550 is read by the history information acquiring unit 524, similarly to the history of the voice information. The display control section 521 causes the history read by the history information acquiring unit 524 to be displayed on the screen as the history information v524. At this time, the display control section 521 may display the history information v524 corresponding to the voice information and the history information v524 corresponding to the system information to be discernible from each other.

For example, in the example illustrated in FIG. 41, the display control section 521 switches the position in which the history information v524 is displayed to the left or the right according to one of the voice information and the system information to which the history information v524 corresponds. Further, as illustrated in the example of FIG. 39 of the third example, the display control section 521 may change the color of a corresponding region and display the history information v524 corresponding to the voice information and the history information v524 corresponding to the system information to be discernible from each other.

Further, the display control section 521 may change the display region of the history information according to one of the voice information and the system information to which the history information corresponds. For example, when a display form is a bar form as illustrated in FIG. 39 of the third example, the history information corresponding to the voice information and the history information corresponding to the system information may be displayed on different bars.

As described above, the information processing apparatus 10 according to the fourth example displays the history information corresponding to the system information together with the history information corresponding to the voice information. Through this configuration, it is possible to execute desired content with reference to content associated with system information, similarly to content associated with voice information. Further, since the history information corresponding to the voice information and the history information corresponding to the system information are displayed to be arranged chronologically, the user 1 can intuitively identify a timing at which the information is acquired.

3-8. Fifth Example of Third Embodiment

3-8-1. Outline of Fifth Example

Figure 42:
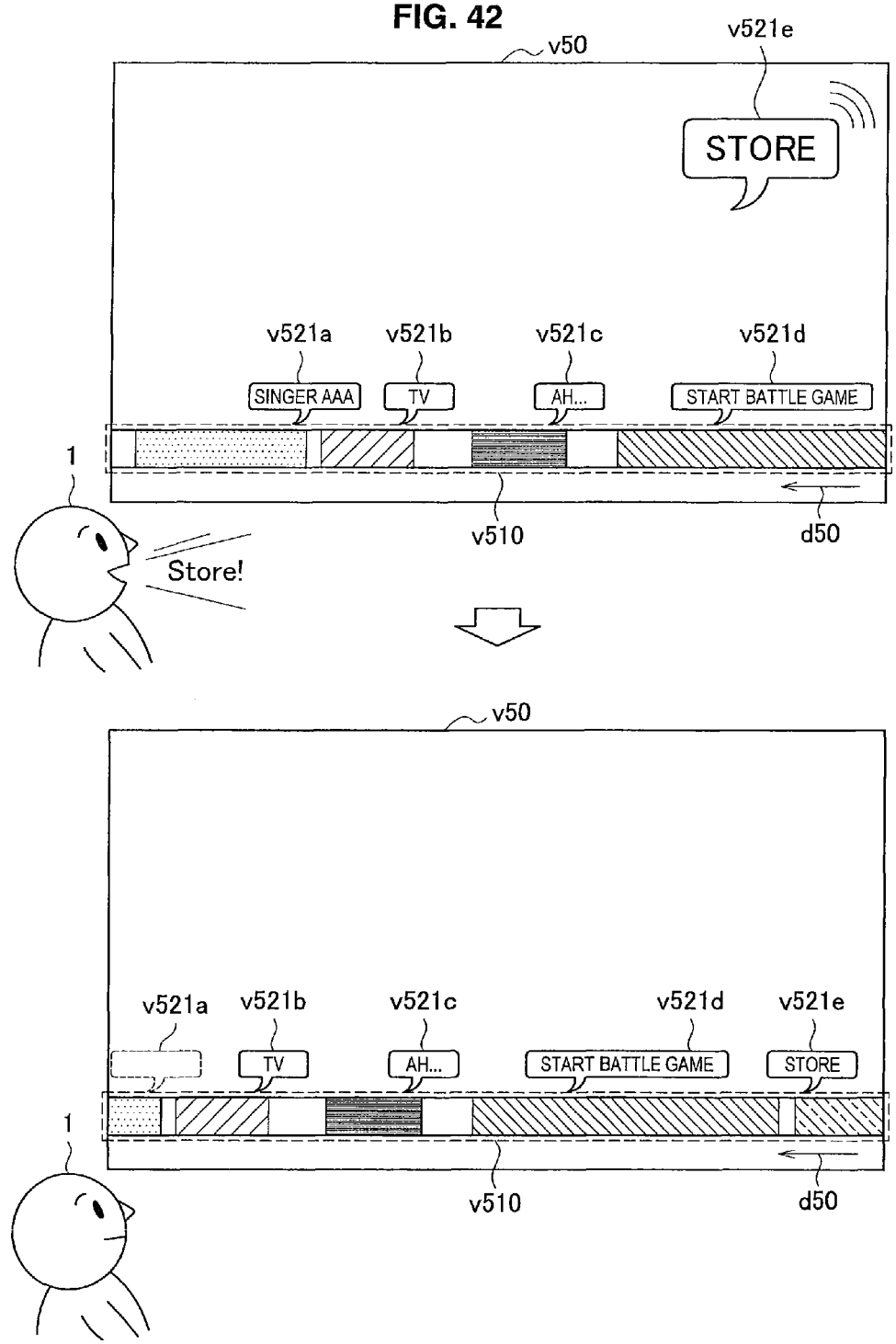
FIG. 42 is a diagram illustrating an exemplary display according to the fifth example of the third embodiment.

A concrete example of the information processing apparatus 10 according to a fifth example of the third embodiment will be described. When the number of pieces of history information displayed on the screen increases with the addition of the history, the screen becomes complicated, and thus there are cases in which it is difficult to identify the history information. In this regard, in the information processing apparatus 10 according to the fifth example of the present embodiment, when the pieces of history information displayed on the screen exceed a predetermined number, the display control section 521 causes the history information corresponding to some of the history not to be displayed so that the number of pieces of displayed history information is the predetermined number or less. As the number of pieces of history information displayed at the same time is limited as described above, it is possible to prevent the screen from becoming complicated with the increase in the history information. An example of the information processing apparatus 10 according to the fifth example of the present embodiment will be described below with reference to FIG. 42. FIG. 42 is a diagram illustrating an exemplary display according to the fifth example of the present embodiment.

FIG. 42 illustrates an example in which the display control section 521 causes the history information v521e to be additionally displayed based on the utterance of the user in the state in which the history information v521a to v521d is displayed on the voice bar v510 of the screen v50. In the history information v521a to v521d, the history information v521a is assumed to correspond to the oldest history, and the history information v521b, v521c, and v521d is assumed to correspond to newer history in the described order. Further, in the example illustrated in FIG. 42, the display control section 521 is assumed to set a maximum of the number (hereinafter, a maximum display number) of pieces of history information v521 that can be displayed at the same time to "4."

When the history information v521e is added on the voice bar v510, the number of pieces of the history information v521 being displayed is 5 and exceeds the maximum display number. In this case, the display control section 521 causes one piece of history information v521 among the history information v521a to v521d already being displayed not to be displayed. As a concrete example, in the example illustrated in FIG. 42, the display control section 521 causes the oldest history information v521a in a timing at which corresponding history is recorded not to be displayed.

Further, the history information v521 not to be displayed is not limited to a timing at which corresponding history is recorded. As another example, the display control section 521 may specify the history information v521 not to be displayed according to the number of acquired instances in the history (that is, the number of utterances recognized as the voice information). For example, the display control section 521 may cause the history information v521 that is smallest in the number of acquired instances in the history not to be displayed and cause the voice information that is large in the number of utterances, that is, the history information v521 corresponding to the voice information focused on by the user, to be preferentially displayed. Further, the display control section 521 may appropriately change a period of time in which the acquired number is determined according to an operation. For example, the display control section 521 may perform a determination on all history acquired in the past or may perform a determination on history acquired during a certain period of time (for example, over the past week) from a current point in time.

Further, as another example, the user 1 may register voice information to be preferentially displayed in advance. In this case, the display control section 521 may specify the history information v521 not to be displayed from the history information v521 other than the history information v521 corresponding to the history of the registered voice information. Through this operation, for example, the user 1 can register desired voice information as a favorite, and the display control section 521 can preferentially display the history information v521 corresponding to the registered voice information.

Further, the display form of the history information is not limited to the example of FIG. 42 (that is, the example of FIG. 31 corresponding to the first example). For example, the example of FIG. 39 described above in the third example may be applied. In this case, the display control section 521 preferably controls a display such that the number of the regions v541 associated with the history information v522 is the maximum display number or less. Further, the example of FIG. 41 described above in the fourth example may be applied. In this case, the display control section 521 preferably controls a display such that the number of pieces of the history information v524 displayed as a window is the maximum display number or less.

Further, the above description has been made in connection with the example of limiting the maximum display number, but the display control section 521 may reduce the size of the displayed history information v521 and display all of the history information v521 without limiting the maximum display number. As a display is performed such that the size of the history information v521 is changed as described above, even when the number of pieces of the history information v521 increases, it is possible to cause the history information v521 to be displayed without overlapping. Meanwhile, when the size of the history information v521 is reduced, there are cases in which it is difficult to recognize the individual history information v521. For this reason, the display control section 521 may decide a maximum reduction rate in advance and perform control such that the history information v521 is reduced within the range in which the size of the history information v521 does not exceed the maximum reduction rate.

Further, when it is difficult to secure a space to newly display the history information v521 without reduction of the size of the history information exceeding the maximum reduction rate, the display control section 521 may cause some history information v521 not to be displayed instead of changing the size of the history information v521. A selection criterion by which the display control section 521 causes the history information v521 not to be displayed is preferably decided similarly to when control is performed such that the number of pieces of information is the maximum display number or less.

Further, the display control section 521 may appropriately change the number of pieces of the history information v521 to be displayed the screen v50 or the size of the history information v521 to be displayed on the screen v50 using both the reduction rate and the display number of the history information as parameters. For example, the display control section 521 may set the maximum display number in a stepwise manner according to the reduction rate of the history information. Specifically, the display control section 521 classifies the size of the history information in three steps of "large," "medium," and "small." The display control section 521 sets the maximum display number to be small when the size corresponds to "large," and then when the size of the history information is changed to "medium" or "small," the display control section 521 may dynamically change the maximum display number according to each size. Similarly, the display control section 521 may change the size of the displayed history information in the stepwise manner according to the display number of the history information. Specifically, when the number of pieces of history information 5 or less, the display control section 521 sets the size of each piece of history information to "large," and then when the number of pieces of history information is changed to be 6 to 10 or 11 or more, the display control section 521 may change the size of each piece of history information to "medium" and "small" in the stepwise manner.

3-8-2. Operation of Fifth Example

Figure 43:
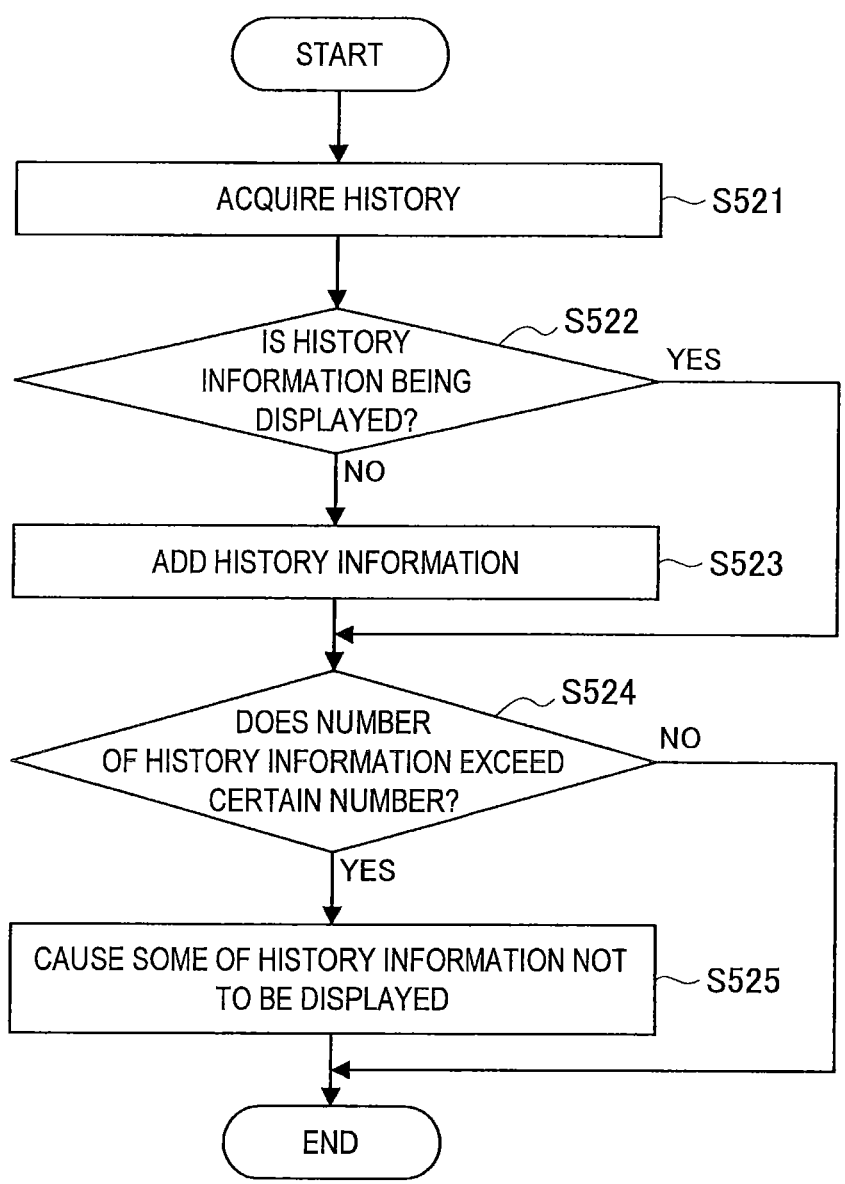
FIG. 43 is a flowchart illustrating an exemplary history information display process of the information processing apparatus 10 according to a fifth example of the third embodiment.

Next, the operation of the information processing apparatus 10 according to the fifth example of the present embodiment will be described with reference to FIG. 43. FIG. 43 is a flowchart illustrating an exemplary history information display process (that is, the process of step S520 in FIGS. 33, 36, and 40) of the information processing apparatus 10 according to the fifth example of the present embodiment. The following description will proceed focusing on an operation related to a history information display different from those of the first to fourth examples, and a detailed description of the remaining operations will be omitted.

(Step S521)
Upon acquiring the voice signal collected by the sound collecting device 110, the signal acquiring unit 510 outputs the acquired voice signal to the analyzing unit 530. The voice information acquiring unit 531 performs the voice recognition process on the voice signal output from the signal acquiring unit 510 to the analyzing unit 530, and generates voice information. The meaning of the generated voice information is interpreted, and then the generated voice information is stored in the history storage unit 550 as history.

Further, the signal acquiring unit 510 notifies the display control section 521 of the detection of the voice signal. When a notification representing the detection of the voice signal is given from the signal acquiring unit 510, the display control section 521 acquires the history stored in the history storage unit 550 through the history information acquiring unit 524.

(Step S522)
After the history is acquired from the history storage unit 550, the display control section 521 checks whether or not the history information v521 corresponding to the acquired history is being displayed on the screen.

(Step S523)
When the history information v521 corresponding to the acquired history is not being displayed on the screen (NO in Step S522), the display control section 521 generates the history information v521 corresponding to the acquired history, and causes the generated history information v521 to be displayed on the screen v50 in association with the acquired history. Further, when the history information v521 corresponding to the acquired history is already being displayed on the screen v50 (YES in Step S522), the display control section 521 may not perform processing related to generation and display of the history information v521.

(Step S524)
Then, the display control section 521 determines whether the number of pieces of the history information v521 being displayed on the screen v50 exceeds the maximum display number.

(Step S525)
When the number of pieces of the history information v521 exceeds the maximum display number (YES in step S524), the display control section 521 causes one piece of history information v521 among pieces of the history information v521 already being displayed not to be displayed. As a concrete example, the display control section 521 causes the history information v521 that is oldest among the pieces of the history information v521 being displayed at a timing at which corresponding history is recorded not to be displayed. However, when the number of pieces of the history information v521 does not exceed the maximum display number (NO in step S524), the history information v521 does not perform the process of causing information not to be displayed.

As described above, when the number of pieces of history information displayed on the screen exceeds the maximum display number, the information processing apparatus 10 according to the fifth example of the present embodiment causes history information corresponding to some history not to be displayed so that the number of pieces of displayed history information is the maximum display number or less. Through this operation, even when history information is newly added, similarly, the number of pieces of history information does not exceed the maximum display number, and thus it is possible to prevent a situation in which the screen becomes complicated with the increase in the displayed history information.

3-9. Sixth Example of Third Embodiment

3-9-1. Outline of Sixth Example

Figure 44:
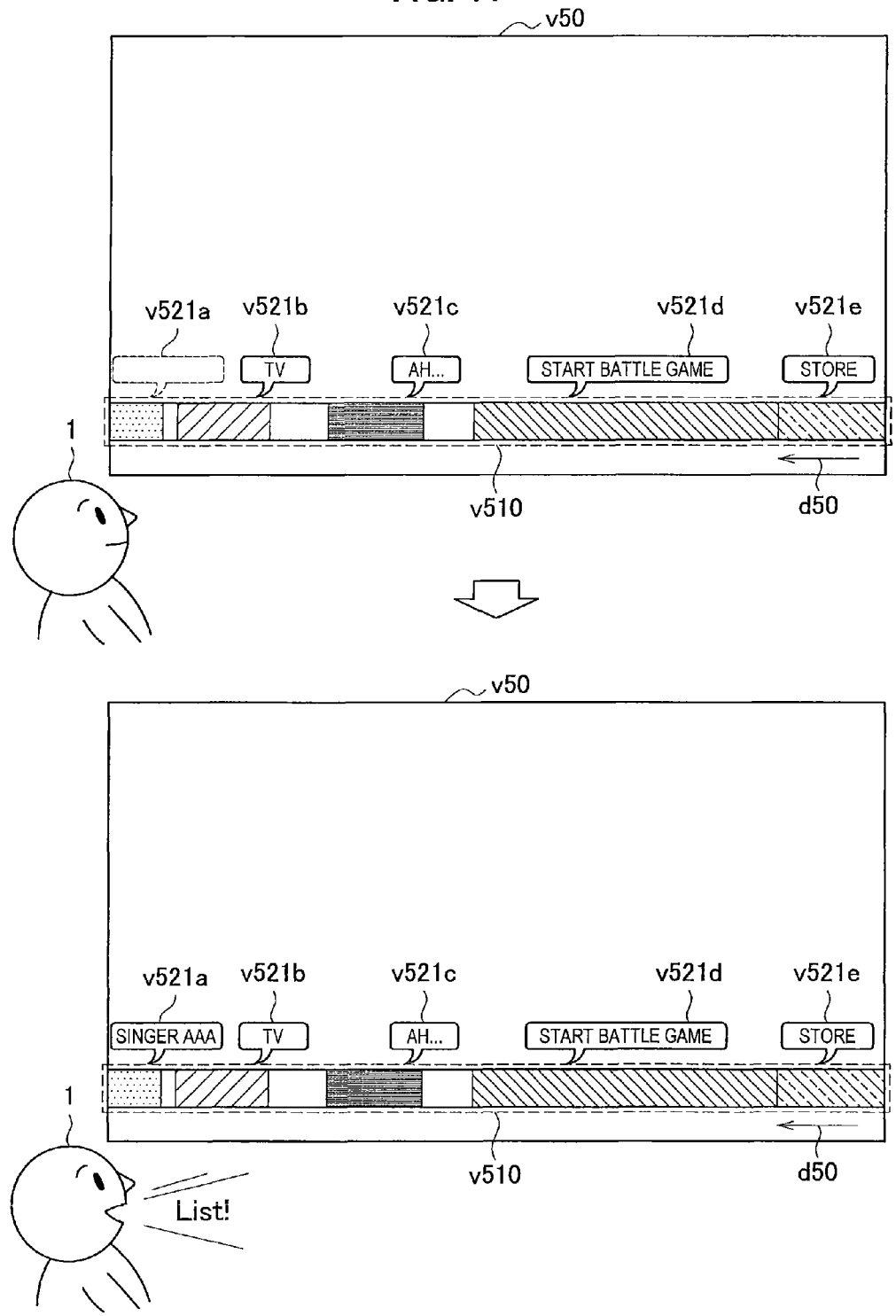
FIG. 44 is a diagram illustrating an exemplary display according to the sixth example of the third embodiment.

The fifth example has been described in connection with the example in which some history information is caused not to be displayed so that the number of pieces of history information displayed on the screen is the maximum display number or less. The present disclosure is not limited to the example described above in the fifth example, and for example, it is possible to perform an operation so that history information is not displayed again when the history information disappears from the screen according to the scroll movement. In this regard, in a sixth example of the third embodiment, an example in which history information caused not to be displayed is displayed to be accessible again will be described with reference to FIG. 44. FIG. 44 is a diagram illustrating an exemplary display according to the sixth example of the present embodiment.

The example illustrated in FIG. 44 illustrates a state in which the history information v521*a* is caused not to be displayed because history information v521*a* to v521*e* is added on the voice bar v510 of the screen v50 and so the display number of the history information v521 exceeds the maximum display number, that is, "4."

In the information processing apparatus 10 according to the sixth example of the present embodiment, the display control section 521 re-displays the history information v521 caused not to be displayed when the user 1 makes a predetermined operation in the state in which some history information v521 is caused not to be displayed. As a concrete example, in the example illustrated in FIG. 44, when a certain keyword "List" uttered by the user is detected, the display control section 521 re-displays the history information v521*a* caused not to be displayed. As history information caused not to be displayed is displayed based on a certain operation as described above, the user 1 can access the history information v521*a* caused not to be displayed again.

Further, the example illustrated in FIG. 44 has been described in connection with the example in which the history information v521 caused not to be displayed is re-displayed when the user 1 utters a certain keyword, but the present disclosure is not limited to this example as long as it is possible to specify a factor for re-displaying the history information v521 caused not to be displayed. As another example, the display control section 521 may re-display the history information v521 caused not to be displayed when the user 1 performs a certain operation on the operating unit 120. In this case, the input information acquiring unit 525 preferably analyzes content of the operation on the operating unit 120, detects that the certain operation has been performed, and notifies of the detection result. At this time, the input information acquiring unit 525 may give the same notification to the display control section 521 as when voice information corresponding to a certain keyword (for example, "List") is acquired.

Further, concrete examples of the certain operation include an operation of sliding a certain pattern or a tap operation when the operating unit 120 employs a touch panel or a touch pad. Further, when a sensor such as an acceleration sensor is mounted in the operating unit 120, the input information acquiring unit 525 may recognize a certain gesture operation as the certain operation. Further, when the operating unit 120 employs a keyboard or a mouse, the input information acquiring unit 525 may recognize an operation of pushing a certain button as the certain operation.

3-9-2. Operation of Sixth Example

Figure 45:
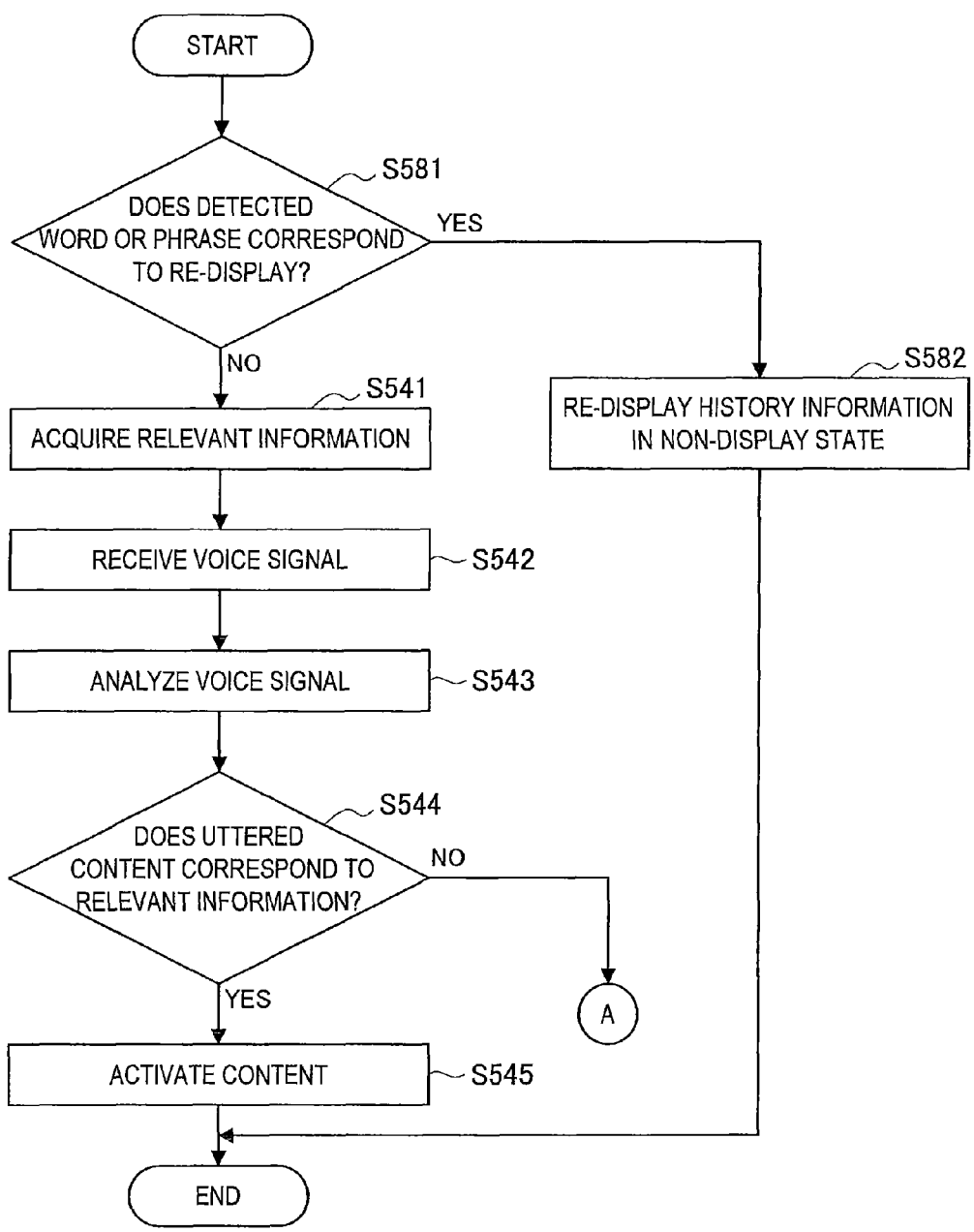
FIG. 45 is a flowchart illustrating exemplary processing of the information processing apparatus according to the sixth example of the third embodiment based on a certain word or phrase.

Next, the operation of the information processing apparatus 10 according to the sixth example of the present embodiment will be described with reference to FIG. 45. FIG. 45 is a flowchart illustrating exemplary processing (that is, the process of step S540 in FIGS. 36 and 40) of the information processing apparatus 10 according to the sixth example of the present embodiment based on a certain word or phrase. The following description will proceed focusing on processing based on a certain word or phrase different from those of the second and third examples, and a detailed description of the remaining operation will be omitted.

(Step S581)

The utterance content analyzing unit 532 determines whether or not the acquired voice information is identical to a certain keyword based on the voice signal collected by the sound collecting device 110. When the acquired voice information is identical to a certain keyword, the utterance content analyzing unit 532 notifies the analysis result acquiring unit 522 of the determination result, and outputs information representing processing corresponding to the keyword to the analysis result acquiring unit 522. For example, when the acquired voice information is identical to the keyword "List," the utterance content analyzing unit 532 outputs information representing processing related to "re-display of history information caused not to be displayed" to the analysis result acquiring unit 522. Further, when the acquired voice information is identical to the keyword "Actions" as in the example described above in the second example (see FIG. 35), an operation may be performed so that the information representing processing related to "generation and display of relevant information" is output to the analysis result acquiring unit 522.

(Step S582)

When the acquired voice information is identical to a keyword corresponding to "re-display of history information caused not to be displayed" (YES in step S581), the display control section 521 receives the information representing processing related to "re-display of history information caused not to be displayed" from the utterance content analyzing unit 532 through the analysis result acquiring unit 522. Upon receiving this instruction, the display control section 521 re-displays the history information v521 caused not to be displayed based on the notified information.

(Step S581)

Further, when the acquired voice information is identical to another keyword different from the keyword corresponding to "re-display of history information caused not to be displayed" (NO in step S581), the display control section 521 receives information representing processing corresponding to the keyword. In this case, similarly, the display control section 521 may perform an operation of performing corresponding processing based on the notified information.

As a concrete example, FIG. 45 illustrates an example in which the acquired voice information is identical to the keyword ("Actions") corresponding to "generation and display of relevant information." In this case, the display control section 521 preferably performs processing related to "generation and display of relevant information" described in steps S541 to S545 based on the information representing processing corresponding to "generation and display of relevant information" which is notified of by the utterance content analyzing unit 532 through the analysis result acquiring unit 522. The process of steps S541 to S545 is the same as in the second example (see FIG. 37), and thus a detailed description thereof will be omitted.

As described above, the information processing apparatus 10 according to the sixth example of the present embodiment displays history information caused not to be displayed to be accessible again when a certain operation performed by the user 1 is detected. Through this configuration, even when some history information is caused not to be displayed with the addition of new history information, the user 1 can cause history information caused not to be displayed to be re-displayed and access the displayed history information.

3-10. Seventh Example of Third Embodiment

Figure 46:
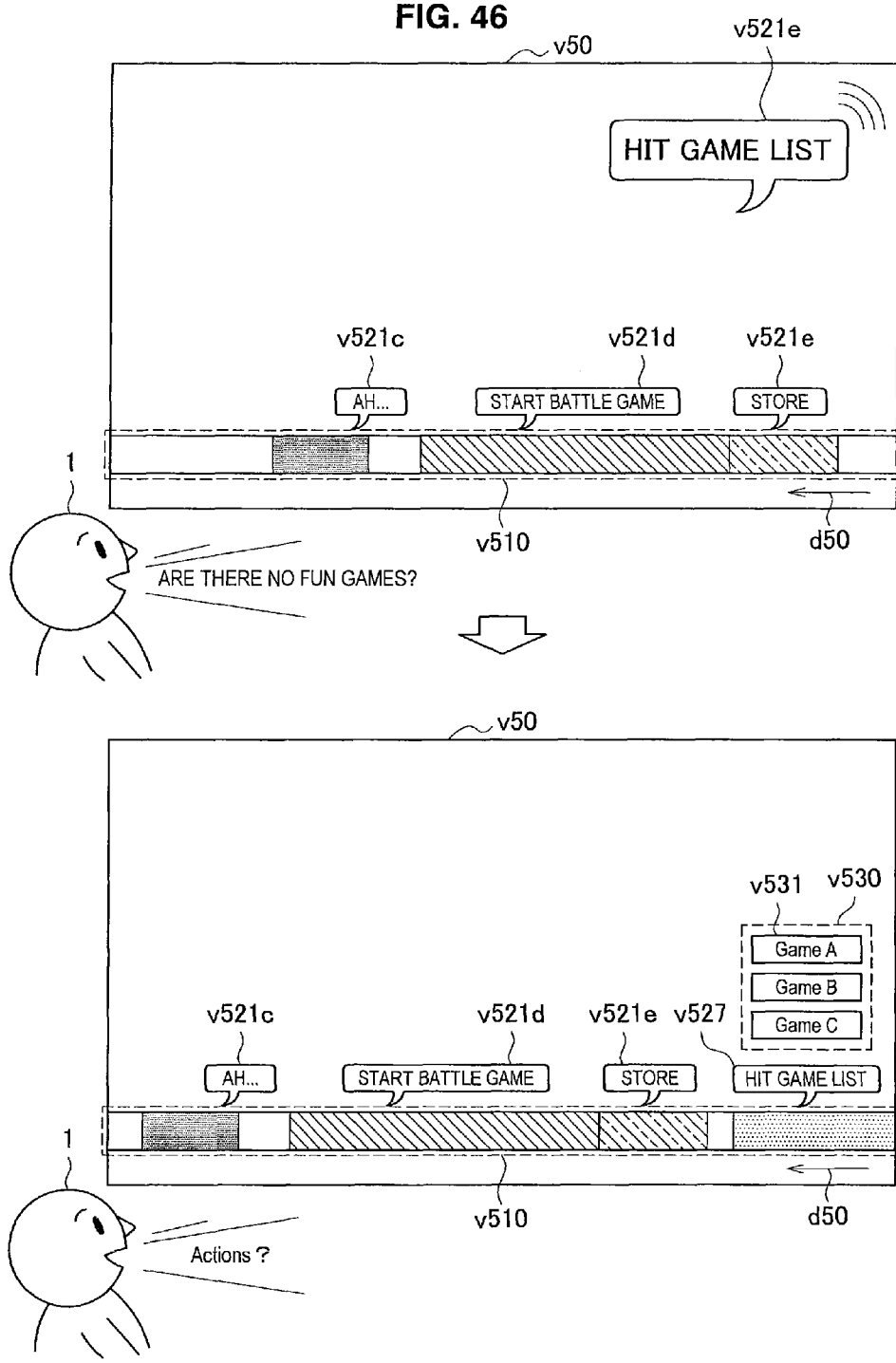
FIG. 46 is a diagram illustrating an exemplary display according to the seventh example of the third embodiment.

A concrete example of the information processing apparatus 10 according to a seventh example of the third embodiment will be described. In the information processing apparatus 10 according to the seventh example of the present embodiment, for example, when voice information indicating an inquiry "Are there no fun games?" is acquired, the display control section 521 presents a response to the inquiry as history information or relevant information. Specifically, when the voice information indicating the inquiry is acquired, the display control section 521 specifies processing (for example, processing of "presenting popular games in the store") to be executed in response to the inquiry, and presents the result of the specified processing through history information. An example of the information processing apparatus 10 according to the seventh example of the present embodiment will be described below with reference to FIG. 46. FIG. 46 is a diagram illustrating an exemplary display according to the seventh example of the present embodiment.

FIG. 46 illustrates a state in which the user 1 utters content indicating the inquiry "Are there no fun games?" and then utters the keyword "Actions" for displaying relevant information.

As illustrated in FIG. 46, when the user 1 utters content indicating the inquiry "Are there no fun games?" the display control section 521a displays history information v527 in which a phrase "HIT GAME LIST" indicating a response to the inquiry is present.

When the user 1 utters the keyword "Actions" in the state in which the history information v527 is displayed, the display control section 521 searches for popular games in the store, and displays corresponding content v531 as the relevant information v530.

A concrete operation of the information processing apparatus 10 according to the seventh example of the present embodiment will be described below based on the example illustrated in FIG. 46.

A voice signal uttered by the user 1 is collected by the sound collecting device 110 and acquired by the signal acquiring unit 510. The voice information acquiring unit 531 of the analyzing unit 530 performs the voice recognition process on the voice signal acquired by the signal acquiring unit 510, and generates voice information. The voice information acquiring unit 531 outputs the generated voice information to the utterance content analyzing unit 532. The process described so far is the same as in each of the above embodiments.

The utterance content analyzing unit 532 analyzes the voice information acquired from the voice information acquiring unit 531 using the natural language processing such as the morphological analysis or the syntax analysis, and determines whether or not the voice information is voice information indicating an inquiry.

Further, the utterance content analyzing unit 532 associates voice information indicating a predetermined (assumed) inquiry, a word or phrase indicating a response to the inquiry, and information representing processing corresponding to the response as a list.

When the voice information is recognized as the voice information indicating the inquiry, the utterance content analyzing unit 532 compares the voice information with the list, and specifies voice information indicating a response associated with the voice information indicating the inquiry and processing corresponding to the response. Then, the utterance content analyzing unit 532 stores the acquired voice information and a word or phrase indicating the specified response in the history storage unit 550 as history in association with each other.

Further, the utterance content analyzing unit 532 notifies the display control section 521 of information representing the specified processing through the analysis result acquiring unit 522. For example, when the voice information indicating the inquiry is "Are there no fun games?" the utterance content analyzing unit 532 notifies the display control section 521 of information representing processing of "presenting popular games in the store." At this time, in order to distinguish from the case in which the voice information is identical to a certain keyword, the utterance content analyzing unit 532 may notify the display control section 521 of the fact that information to be notified of is processing corresponding to the response to the voice information indicating the inquiry together. The following will proceed under the assumption that the voice information indicating the inquiry is to indicate "Are there no fun games?" and the utterance content analyzing unit 532 notifies the display control section 521 of information representing processing of "presenting popular games in the store."

Further, the signal acquiring unit 510 notifies the display control section 521 of that the voice signal has been detected. Upon receiving the notification representing that the voice signal has been detected from the signal acquiring unit 510, the display control section 521 acquires the history stored in the history storage unit 550 through the history information acquiring unit 524. The display control section 521 generates the history information v521 corresponding to the acquired history.

At this time, when the acquired history corresponds to voice information indicating an inquiry, there are cases in which a word or phrase indicating a response is associated with the acquired history. In this case, the display control section 521 may present the word or phrase indicating the response associated with the corresponding history through the generated history information v521. For example, in the example illustrated in FIG. 46, the word or phrase indicating the response "HIT GAME LIST" is associated with the history of the voice information "Are there no fun games?" In this case, the display control section 521 generates the history information v527 in which the word or phrase indicating the response "HIT GAME LIST" is presented through the history information v521.

Further, the display control section 521 receives information representing processing "presenting popular games in the store" from the utterance content analyzing unit 532 as the analysis result of the voice information "Are there no fun games?" The display control section 521 associates the information representing processing of "presenting popular games in the store" acquired from the utterance content analyzing unit 532 with the generated history information v527. The display control section 521 causes the history information v527 associated with the information acquired from the utterance content analyzing unit 532 to be displayed on the voice bar v510 of the screen v50.

Next, an operation when the user 1 utters the keyword "Actions" in the state in which the history information v527 is displayed will be described. When the user 1 utters the keyword "Actions," the information representing processing related to "generation and display of relevant information" is output from the utterance content analyzing unit 532 to the display control section 521 as illustrated in the above embodiments.

The display control section 521 causes the content information acquiring unit 523 to acquire relevant information associated with the history information v521 according to the information representing processing related to "generation and display of relevant information" which is acquired from the utterance content analyzing unit 532. Further, when information representing certain processing (for example, processing of "presenting popular games in the store") is associated as in the history information v527, the display control section 521 causes the content information acquiring unit 523 to acquire relevant information corresponding to the corresponding processing. For example, in case of processing of "presenting popular games in the store," the display control section 521 causes the content information acquiring unit 523 to generate a search formula used to search for "popular games in the store" and acquire corresponding content.

The content information acquiring unit 523 outputs the search formula generated based on an instruction of the display control section 521 to the content specifying unit 561. The content specifying unit 561 extracts information of content satisfying the search formula acquired from the content information acquiring unit 523 from the content DB 560. Through this operation, information of content corresponding to "popular games in the store" is extracted.

The content specifying unit 561 outputs a list of content extracted from the content DB 560 to the content information acquiring unit 523. The content information acquiring unit 523 outputs a list of content acquired for the history from the content specifying unit 561 to the display control section 521 for the corresponding history. As a result, the display control section 521 acquires a list of content corresponding to popular games in the store from the content information acquiring unit 523 as information corresponding to the history information v527 represented as "HIT GAME LIST."

The display control section 521 causes the content list acquired for the history to be displayed as the relevant information v530 in association with the history information v527 corresponding to the history. For example, in the example illustrated in FIG. 46, the display control section 521 causes the acquired list of the content v531 corresponding to "popular games in the store" to be displayed as the relevant information v530 in association with the history information v527.

Further, voice information corresponding to an inquiry is not limited to the above example. For example, in case of an inquiry "Can you play some pleasant music?" the utterance content analyzing unit 532, the display control section 521, the content information acquiring unit 523, and the content specifying unit 561 are preferably operated to extract content associated with music of a specific genre (for example, jazz).

Further, it is possible to respond to an inquiry associated with a use history of the user 1 such as "Where did we stop the game yesterday?" In this case, an operation is preferably performed to extract information of corresponding content based on the use history of the content stored in the content DB 560 and the history of the voice information stored in the history storage unit 550.

Further, corresponding content may actually be operated, and then a result thereof may be output. As a concrete example, an inquiry "How is the weather today?" may be associated with processing of executing content searching for the weather and acquiring a result thereof, and in this case, it is possible to present the user with the weather search result.

As described above, in the information processing apparatus 10 according to the seventh example of the present embodiment, the display control section 521 represents the response to the inquiry as the history information or the relevant information when the voice information indicating the inquiry such as "Are there no fun games?" is acquired. Through this operation, it is unnecessary for the user 1 to utter processing in view of command content in order to execute desired processing and thus can more intuitively perform an operation.

3-11. Eighth Example of Third Embodiment 3-11-1. Outline of Eighth Example

Figure 47:
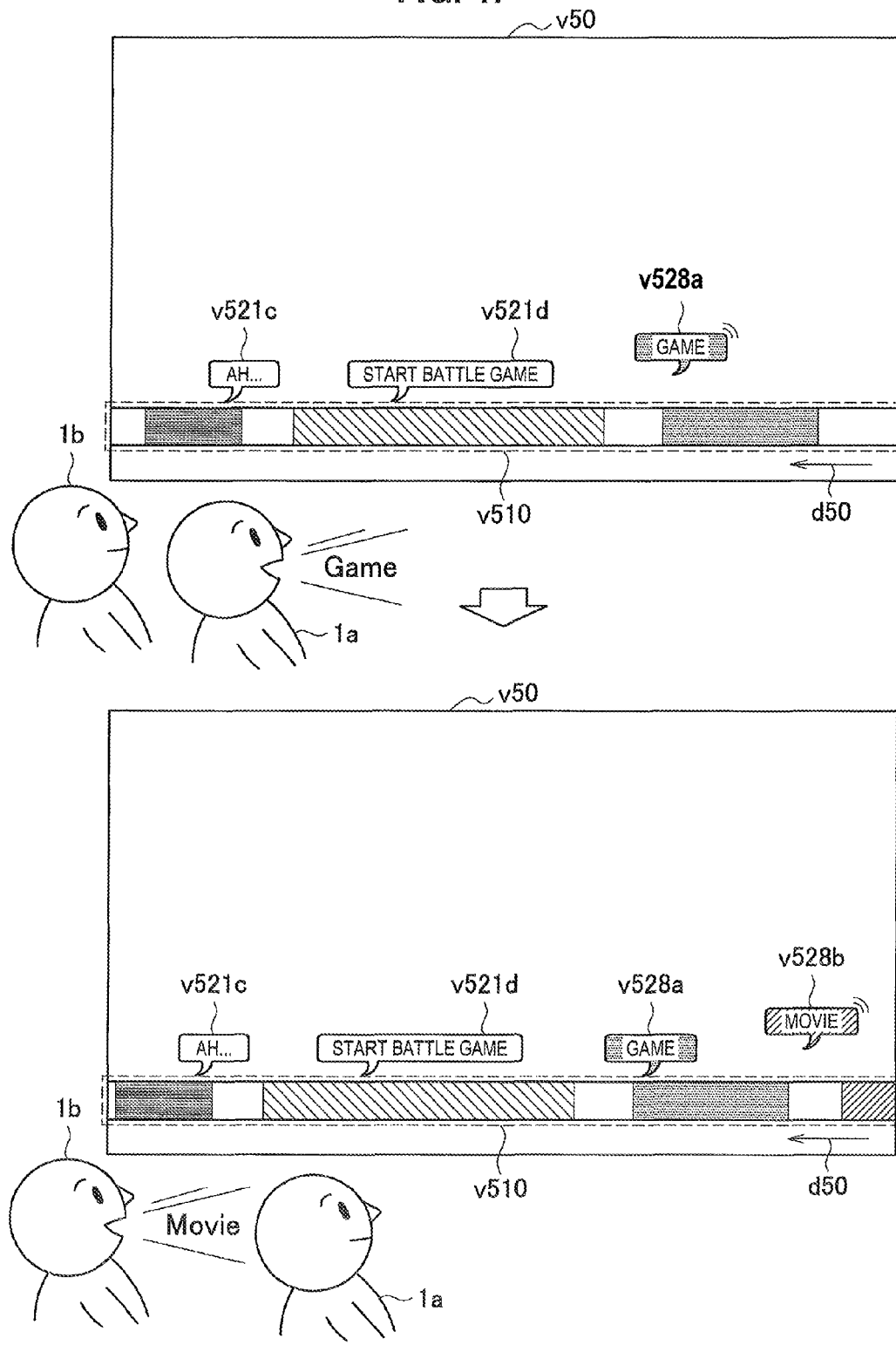
FIG. 47 is a diagram illustrating an exemplary display according to the eighth example of the third embodiment.

A concrete example of the information processing apparatus 10 according to an eighth example of the third embodiment will be described. In the information processing apparatus 10 according to the eighth example of the present embodiment, a plurality of different users input a voice through different sound collecting devices 110, and the display control section 521 causes a history of voice information to be identifiably displayed as history information based on utterances of each user. An example of the information processing apparatus 10 according to the eighth example of the present embodiment will be described below with reference to FIG. 47. FIG. 47 is a diagram illustrating an exemplary display according to the eighth example of the present embodiment.

FIG. 47 illustrates an example in which users 1a and 1b input a voice with respect to the screen v50 in which the voice bar v510 and the history information v521 are displayed through the different sound collecting devices 110. Specifically, FIG. 47 illustrates an example in which the user 1a first inputs a voice, and then the user 1b inputs a voice. Further, in FIG. 47, history information v528a represents history information based on an utterance of the user 1a, and history information v528b represents history information based on an utterance of the user 1b.

In the following description, the sound collecting device 110 operated by the user 1a is referred to as a "sound collecting device 110a," and the sound collecting device 110 operated by the user 1b is referred to as a "sound collecting device 110b." Further, when it is unnecessary to particularly distinguish the sound collecting devices 110*a* and 110*b* from each other, they are referred to simply as a "sound collecting device 110."

When the user 1*a* inputs a voice to the sound collecting device 110*a*, a voice signal collected by the sound collecting device 110*a* is converted into voice information through the analyzing unit 530 and then stored in the history storage unit 550 as history. Then, the display control section 521 reads the history, and causes the read history to be displayed on the voice bar v510 displayed on the screen v50 as the history information v528*a*.

Then, when the user 1*b* inputs a voice to the sound collecting device 110*b*, a voice signal collected by the sound collecting device 110*b* is converted into voice information through the analyzing unit 530 and then stored in the history storage unit 550 as history. Then, the display control section 521 reads the history, and causes the read history to be displayed on the voice bar v510 displayed on the screen v50 as the history information v528*b*. At this time, the history corresponding to the history information v528*b* is newer than the history corresponding to the history information v528*a*. Thus, the display control section 521 causes history information v538*b* to be displayed at a side (the right side in the example of FIG. 47) that is new in time series based on the history information v528*a*.

Further, the display control section 521 may change the display forms of the history information v528*a* and v528*b* so that the history information v528*a* and v528*b* is discernibly displayed, for example, in different colors.

Further, the display control section 521 may generate the voice bar v510 for each user and cause the generated voice bar v510 of each user to be displayed on the screen v50. When the voice bar v510 is generated for each user, the display control section 521 causes history information v528 based on utterances of each user to be displayed on the voice bar v510 corresponding to the user who has spoken. As the voice bar v510 is generated and displayed for each user, it is possible to identify the history information v528 based on utterances of each user. Further, when the voice bar v510 is generated for a plurality of users, the display control section 521 may cause some of all the generated voice bars v510 to be displayed on the screen v50. As a concrete example, the display control section 521 may cause the voice bar v510 corresponding to the user who has most recently spoken to be displayed on the screen v50.

In the above example, the information processing apparatus 10 recognizes the user who has uttered the acquired voice signal based on the sound collecting device 110 of the input source, but the present disclosure is not limited to this method as long as it is possible to specify the user who has uttered the voice signal. For example, the information processing apparatus 10 may receive a predetermined operation specifying the user before each user speaks and specify the user who has uttered the voice signal input after the operation is made. Concrete examples of the operation specifying the user include a touch input, a voice input, a gesture input, and facial recognition. Further, each user may be allocated the operating unit 120, and the user who has spoken may be specified based on the operating unit 120 from which an operation is received. Through this configuration, for example, even when the sound collecting devices 110 are not installed according to the number of users, the information processing apparatus 10 can identify each user and acquire the voice signal.

3-11-2. Operation of Eighth Example

Next, an exemplary concrete operation of the information processing apparatus 10 according to the eighth example of the present embodiment will be described in connection with an example in which the history information v528*a* and v528*b* is displayed to be discernible.

When the user 1*a* inputs a voice to the sound collecting device 110*a*, a voice signal collected by the sound collecting device 110*a* is output to the signal acquiring unit 510. The signal acquiring unit 510 outputs the acquired voice signal to the analyzing unit 530. At this time, the signal acquiring unit 510 notifies the analyzing unit 530 of identification information for identifying the sound collecting device 110*a* serving as a voice signal acquisition source together. The voice information acquiring unit 531 of the analyzing unit 530 performs the voice recognition process on the voice signal acquired from the signal acquiring unit 510, generates voice information, and outputs the generated voice information to the utterance content analyzing unit 532.

The utterance content analyzing unit 532 determines whether or not the acquired voice information is identical to a certain keyword (for example, the keyword corresponding to "generation and display of relevant information" or "re-display of history information caused not to be displayed"). The following description will proceed under the assumption that the acquired voice information is not identical to the certain keyword and displayed as history information.

The utterance content analyzing unit 532 causes the acquired voice information to be stored in the history storage unit 550 as history. At this time, the utterance content analyzing unit 532 causes the acquired history of the voice information to be stored in association with the attribute information (here, the identification information representing the sound collecting device 110*a*) representing that it is based on an utterance of the user 1*a*.

Further, the signal acquiring unit 510 notifies the display control section 521 of that the voice signal from the sound collecting device 110*a* has been detected. Upon receiving the notification representing that the voice signal from the sound collecting device 110*a* has been detected from the signal acquiring unit 510, the display control section 521 acquires the history stored in the history storage unit 550 through the history information acquiring unit 524. Through this operation, the display control section 521 is caused to acquire the history based on an utterance of the user 1*a*.

The display control section 521 generates the history information v528*a* corresponding to the acquired history based on an utterance of the user 1*a*, and associates the generated the history information v528*a* with the acquired history.

Further, the display control section 521 specifies the user whose utterance is the basis of the acquired history based on the attribute information associated with the history. In this case, the display control section 521 specifies the user 1*a* as the user whose utterance is the basis of the acquired history.

The display control section 521 causes the generated history information v528*a* to be displayed on the voice bar v510 displayed on the screen v50 in the display form corresponding to the specified user 1*a*. In the example illustrated in FIG. 47, the display control section 521 causes the history information v528*a* to be displayed in the color corresponding to the user 1*a*. Further, data used to determine the user whose history information is displayed and the display form in which the history information is displayed may be generated in advance and stored in a storage region readable by the display control section 521.

When the user 1*b* inputs a voice to the sound collecting device 110*b*, a voice signal collected by the sound collecting device 110*b* is output to the signal acquiring unit 510. The signal acquiring unit 510 outputs the acquired voice signal to the analyzing unit 530. At this time, the signal acquiring unit 510 notifies the analyzing unit 530 of identification information for identifying the sound collecting device 110*b* serving as a voice signal acquisition source together. The voice information acquiring unit 531 of the analyzing unit 530 performs the voice recognition process on the voice signal acquired from the signal acquiring unit 510, generates voice information, and outputs the generated voice information to the utterance content analyzing unit 532.

The utterance content analyzing unit 532 determines whether or not the acquired voice information is identical to a certain keyword. The following description will proceed under the assumption that the acquired voice information is not identical to the certain keyword and displayed as history information.

The utterance content analyzing unit 532 causes the acquired voice information to be stored in the history storage unit 550 as history. At this time, the utterance content analyzing unit 532 causes the acquired history of the voice information to be stored in association with the attribute information (here, the identification information representing the sound collecting device 110*b*) representing that it is based on an utterance of the user 1*b*.

Further, the signal acquiring unit 510 notifies the display control section 521 of that the voice signal from the sound collecting device 110*b* has been detected. Upon receiving the notification representing that the voice signal from the sound collecting device 110*a* has been detected from the signal acquiring unit 510, the display control section 521 acquires the history stored in the history storage unit 550 through the history information acquiring unit 524. Through this operation, the display control section 521 is caused to acquire the history based on an utterance of the user 1*b*.

The display control section 521 generates the history information v528*b* corresponding to the acquired history based on an utterance of the user 1*b*, and associates the generated the history information v528*b* with the acquired history.

Further, the display control section 521 specifies the user whose utterance is the basis of the acquired history based on the attribute information associated with the history. In this case, the display control section 521 specifies the user 1*b* as the user whose utterance is the basis of the acquired history.

The display control section 521 causes the generated history information v528*a* to be displayed on the voice bar v510 displayed on the screen v50 in the display form corresponding to the specified user 1*b*. In the example illustrated in FIG. 47, the display control section 521 causes the history information v528*b* to be displayed in the color corresponding to the user 1*b* (the color different from the case of the user 1*a*). At this time, the display control section 521 causes the history information v538*b* to be displayed at a side (the right side in the example of FIG. 47) that is new in time series based on the history information v528*a*.

As described above, the information processing apparatus 10 according to the eighth example of the present embodiment displays the voice signals input from the plurality of users (for example, the users 1*a* and 1*b*) through the different sound collecting devices 110. Through this configuration, one user can access a history based on an utterance of another user and execute corresponding content.

The above-described configuration may be applied to an environment available for a plurality of users such as a social network or groupware. Thus, for example, each user using the environment can refer to and access history information based on an utterance of certain or relevant information associated with the history information.

3-12. Conclusion of Third Embodiment

The configuration and the concrete examples of the information processing apparatus 10 according to the third embodiment have been described above. As described above, the information processing apparatus 10 according to the third embodiment provides an information processing apparatus capable of accumulating a recognition result of accumulated voice signals as a history and causing the accumulated history to be displayed on a screen to be accessible. Through this configuration, even when a noise is erroneously recognized, it is possible to prevent a situation in which processing corresponding to the noise is erroneously performed.

Further, the operations of the above described respective components may be implemented by a program causing a CPU of the information processing apparatus 10 to function. The program may be configured to be executed through an operating system (OS) installed in the apparatus. Further, the position in which the program is stored is not limited as long as the program is readable by the apparatus including the above described respective components. For example, the program may be stored in a recording medium connected from the outside of the apparatus. In this case, as the recording medium storing the program is connected to the apparatus, the CPU of the apparatus may execute the program.

4. Exemplary Hardware Configuration

Figure 48:
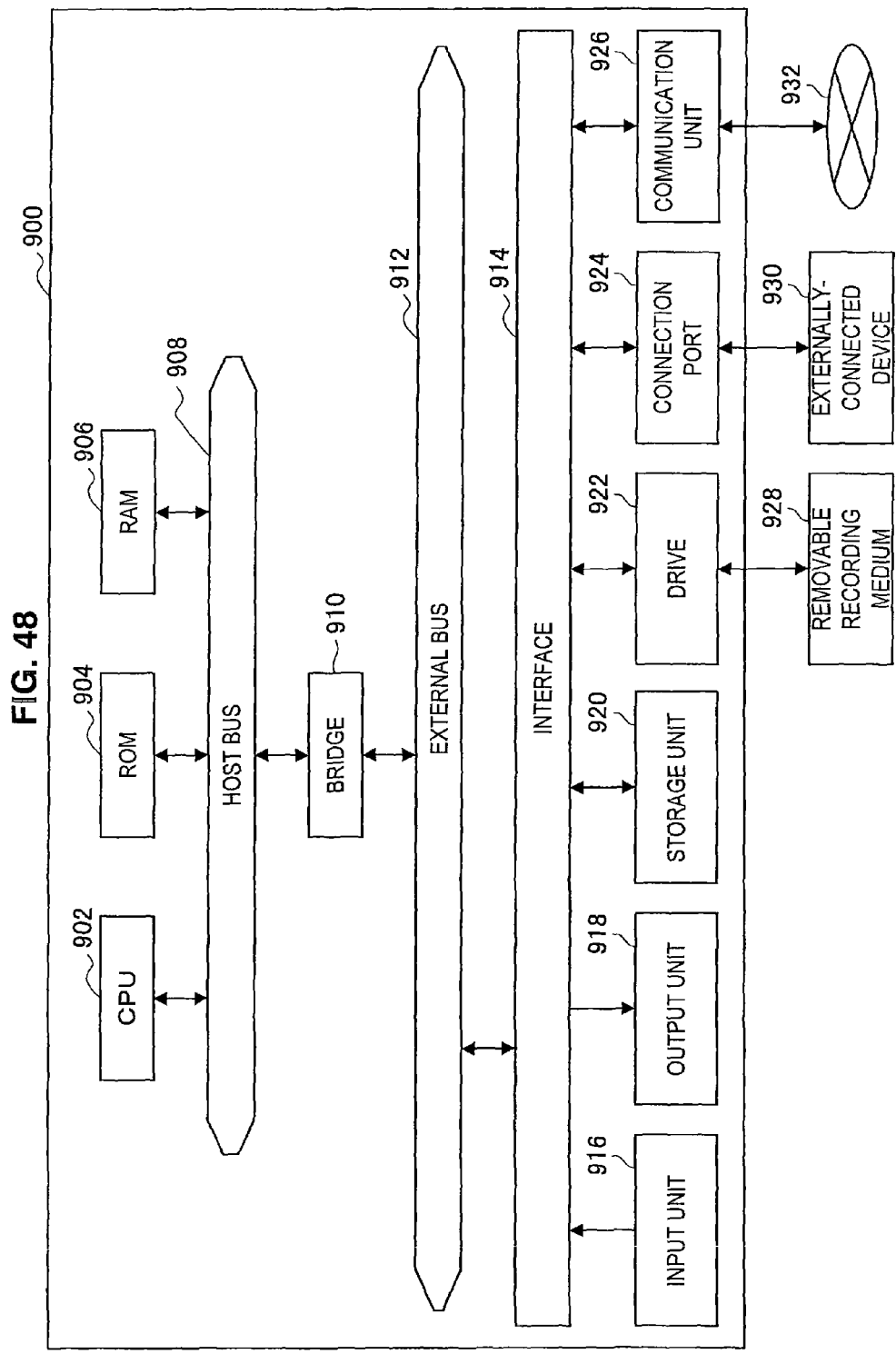
FIG. 48 is an explanatory diagram illustrating an exemplary hardware configuration.

The operation of the information processing apparatus 10 described above may be executed, for example, by using the hardware configuration of an information processing apparatus 900 illustrated in FIG. 48. In other words, the operation of the information processing apparatus 10 may be realized by using a computer program to control the hardware 900 illustrated in FIG. 48. Note that the format of this hardware 900 is arbitrary, and encompasses personal computers, mobile phones, portable information terminals such as PHS devices and PDAs, game consoles, contact or contactless IC chips, contact or contactless IC cards, and various information appliances, for example. Note that PHS above is an abbreviation of Personal Handy-phone System, while PDA above is an abbreviation of personal digital assistant.

As illustrated in FIG. 48, the hardware 900 primarily includes a CPU 902, ROM 904, RAM 906, a host bus 908, and a bridge 910. The hardware 900 additionally includes an external bus 912, an interface 914, an input unit 916, an output unit 918, a storage unit 920, a drive 922, a connection port 924, and a communication unit 926. Note that CPU above is an abbreviation of central processing unit, while ROM above is an abbreviation of read-only memory, and RAM above is an abbreviation of random access memory.

The CPU 902 functions as a computational processing device or control device, for example, and controls all or part of the operation of each structural element on the basis of various programs recorded in the ROM 904, the RAM 906, the storage unit 920, or a removable recording medium 928. The ROM 904 is a way of storing information such as programs loaded by the CPU 902 and data used in computations. The RAM 906 transiently or persistently stores information such as programs loaded by the CPU 902, and various parameters that change as appropriate when executing such programs, for example.

These structural elements are interconnected via a host bus 908 capable of high-speed data transmission, for example. Meanwhile, the host bus 908 is connected via the bridge 910 to an external bus 912 having comparatively low-speed data transmission, for example. Devices such as a mouse, keyboard, touch panel, buttons, switches, and levers may be used as the input unit 916, for example. Additionally, a remote control (hereinafter, remote) capable of using infrared or other electromagnetic waves to transmit control signals may be used as the input unit 916 in some cases.

The output unit 918 includes a device capable of visually or aurally reporting acquired information to a user, and may be a display device such as a CRT, LCD, PDP, or ELD, an audio output device such as one or more speakers or headphones, a printer, a mobile phone, or a fax machine, for example. Note that CRT above is an abbreviation of cathode ray tube, while LCD above is an abbreviation of liquid crystal display, PDP above is an abbreviation of plasma display panel, and ELD above is an abbreviation of electroluminescent display.

The storage unit 920 is a device that stores various data. Devices such as a hard disk drive or other magnetic storage device, a semiconductor storage device, an optical storage device, or a magneto-optical storage device may be used as the storage unit 920, for example. Note that HDD above is an abbreviation of hard disk drive.

The drive 922 is a device that reads out information recorded onto a removable recording medium 928 such as a magnetic disk, an optical disc, a magneto-optical disc, or semiconductor memory, for example, and may also write information to the removable recording medium 928. The removable recording medium 928 is an instance of DVD media, Blu-ray (registered trademark) media, HD DVD media, or various semiconductor storage media, for example. Obviously, the removable recording medium 928 may also be an IC card mounted with a contactless IC chip, or other electronic device, for example. Note that IC above is an abbreviation of integrated circuit.

The connection port 924 is a port that connects to an externally-connected device 930, such as a USB port, an IEEE 1394 port, a SCSI port, an RS-232C port, or an optical audio terminal, for example. The externally-connected device 930 may be a printer, a portable music player, a digital camera, a digital video camera, or an IC recorder, for example. Note that USB above is an abbreviation of Universal Serial Bus, while SCSI above is an abbreviation of Small Computer System Interface.

The communication unit 926 is a communication device that connects to a network 932, and may be a communication card for wired or wireless LAN, Bluetooth (registered trademark), or WUSB, an optical communication router, an ADSL router, or a device for contact or contactless communication, for example. Also, the network 932 connected to the communication unit 926 is a network connected in a wired or wireless manner, and may be the Internet, a home LAN, infrared communication, visible light communication, broadcasting, or satellite communication, for example. Note that LAN above is an abbreviation of local area network, while WUSB above is an abbreviation of Wireless USB, and ADSL above is an abbreviation of asymmetric digital subscriber line.

It may not be necessary to chronologically execute respective steps in the processing, which is executed by each apparatus of this specification, in the order described in the sequence diagrams or the flow charts. For example, the respective steps in the processing which is executed by each apparatus may be processed in the order different from the order described in the flow charts, and may also be processed in parallel.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A system comprising: circuitry configured to acquire captured voice data corresponding to a spoken command; sequentially analyze the captured voice data; cause a display to display a visual indication corresponding to the sequentially analyzed captured voice data; and perform a predetermined operation corresponding to the spoken command when it is determined that the sequential analysis of the captured voice data is complete.

(2) The system of (1), wherein the circuitry is configured to cause the display to display the visual indication corresponding to the sequentially analyzed captured voice data before the spoken command is completed.

(3) The system of any of (1) to (2), wherein the circuitry is configured to cause the display to display an interface including a plurality of operation targets.

(4) The system of (3), wherein the circuitry is configured to cause the display to apply a predetermined effect to at least one of the plurality of operation targets that is capable of being controlled by the spoken command.

(5) The system of any of (3) to (4), wherein the circuitry is configured to cause the display to apply a predetermined effect to at least one of the plurality of operation targets that is capable of being controlled by the spoken command upon acquiring the captured voice data corresponding to the spoken command.

(6) The system of any of (3) to (5), wherein the circuitry is configured to: determine that the spoken command corresponds to the at least one of the plurality of operation targets; perform, as the predetermined operation, an operation corresponding to the at least one of the plurality of targets when the sequential analysis of the captured voice data is complete; and cause the display to stop applying the predetermined effect to the at least one of the plurality of the operation targets when the sequential analysis of the captured voice data is complete.

(7) The system of any of (3) to (6), wherein the circuitry is configured to cause the display to display text corresponding a command applicable to at least one of the plurality of operation targets.

(8) The system of (7), wherein the circuitry is configured to cause the display to display the text corresponding the command applicable to the at least one of the plurality of operation targets at a position corresponding to a display position of the at least one of the plurality of operation targets.

(9) The system of any of (3) to (8), wherein the circuitry is configured to: detect that voice data is captured; and cause the display to display text corresponding to a command applicable to at least one of the plurality of operation targets upon detecting that the voice data is captured.

(10) The system of any of (1) to (9), wherein the circuitry is configured to cause the display to display text corresponding a command applicable to an item displayed on the display at a position corresponding to a display position of the item displayed on the display.

(11) The system of any of (1) to (10), wherein the circuitry is configured to cause the display to display a visual indication corresponding a level of the captured voice data.

(12) The system of (11), wherein the circuitry is configured to: cause the display to apply a first predetermined effect to a displayed image when the level of the captured voice data is within a predetermined range; cause the display to display a second predetermined effect to the displayed image when the level of the captured voice data is lower than the predetermined range; and cause the display to display a third predetermined effect to the displayed image when the level of the captured voice data is higher than the predetermined range.

(13). The system of any of (1) to (12), wherein the circuitry is configured to cause the display to display, as the visual indication, a graphic corresponding to an amount of the sequentially analyzed captured voice data.

(14) The system of (13), wherein the graphic is at least one of a sequence of symbols, an abstract graphic, or an indicator having a size corresponding to the amount of sequentially analyzed captured voice data.

(15) The system of any of (13) to (14), wherein the circuitry is configured to cause the display to replace the graphic with information corresponding to the spoken command when it is determined that the sequential analysis of the captured voice data is complete.

(16) The system of any of (1) to (15), wherein the spoken command includes a plurality of words, and the circuitry is configured to cause the display to display, as the visual indication, each of the plurality of words sequentially based on the sequential analysis of the captured voice data.

(17) The system of any of (1) to (16), further comprising: a microphone configured to capture the voice data corresponding to the spoken command.

(18) The system of any of (1) to (17), further comprising: the display configured to display the visual indication.

(19) A method comprising: acquiring captured voice data corresponding to a spoken command; sequentially analyzing the captured voice data; causing a display to display a visual indication corresponding to the sequentially analyzed captured voice data; and performing a predetermined operation corresponding to the spoken command when it is determined that the sequential analysis of the captured voice data is complete.

(20) A non-transitory computer-readable medium including instructions, which, when executed by a system, cause the system to: acquire captured voice data corresponding to a spoken command; sequentially analyze the captured voice data; cause a display to display a visual indication corresponding to the sequentially analyzed captured voice data; and perform a predetermined operation corresponding to the spoken command when it is determined that the sequential analysis of the captured voice data is complete.

(21) An information processing apparatus including:
an utterance content acquiring unit configured to sequentially acquire information obtained by analysis of voice information including utterance content by a speaker, before the utterance content is decided; and
an analysis result presenting unit configured to sequentially generate and present information obtained by visualizing the utterance content by the speaker using the information sequentially acquired by the utterance content acquiring unit.

(22) The information processing apparatus according to (21),
wherein the analysis result presenting unit sequentially generates information obtained by visualizing the utterance content by the speaker using the information sequentially acquired before the utterance content acquiring unit decides the utterance content, before the utterance content acquiring unit acquires the decided utterance content of the speaker.

(23) The information processing apparatus according to (22),
wherein the analysis result presenting unit generates the information obtained by visualizing the utterance content by the speaker using a length of content that is uttered by the speaker and acquired by the utterance content acquiring unit.

(24) The information processing apparatus according to (22) or (23),
wherein the information obtained by visualizing the utterance content by the speaker is information irrelevant to the utterance content, the information obtained by visualizing the utterance content being generated by the analysis result presenting unit.

(25) The information processing apparatus according to (24),
wherein the analysis result presenting unit generates a word based on a length of a voice that is uttered by the speaker and acquired by the utterance content acquiring unit, as information irrelevant to the utterance content.

(26) The information processing apparatus according to any one of (22) to (25),
wherein, when the utterance content acquiring unit acquires the decided utterance content of the speaker, the analysis result presenting unit changes the presented visualized information to the decided utterance content of the speaker.

(27) The information processing apparatus according to (22),
wherein the information obtained by visualizing the utterance content by the speaker is information relevant to the utterance content, the information obtained by visualizing the utterance content being generated by the analysis result presenting unit.

(28) The information processing apparatus according to (27),
wherein the information relevant to the utterance content by the speaker is phoneme information that is obtained from utterance of the speaker and acquired by the utterance content acquiring unit.

(29) The information processing apparatus according to any one of (21) to (28), further including:
a cancellation receiving unit configured to receive cancellation of sequential generation of information by the analysis result presenting unit.

(30) The information processing apparatus according to (29),
wherein the analysis result presenting unit erases information presented by the analysis result presenting unit when the cancellation receiving unit receives cancellation.

(31) A voice processing apparatus including:
a voice information acquiring unit configured to sequentially acquire voice information; and
an utterance content analyzing unit configured to analyze utterance content by a speaker using the voice information sequentially acquired by the voice information acquiring unit and output an analysis result,
wherein the utterance content analyzing unit sequentially outputs the analysis result even before the utterance content by the speaker is decided.

(32) An information processing method including:
sequentially acquiring information obtained by analysis of voice information including utterance content by a speaker, before the utterance content is decided; and
sequentially generating and presenting information obtained by visualizing the utterance content by the speaker using the information sequentially acquired in the utterance content acquiring step.
(33) A voice processing method including:
sequentially acquiring voice information; and
analyzing utterance content by a speaker using the voice information sequentially acquired in the voice information acquiring step and outputting an analysis result, wherein, in the utterance content analyzing step, the analysis result is sequentially output even before the utterance content by the speaker is decided.
(34) A computer program causing a computer to execute:
sequentially acquiring information obtained by analysis of voice information including utterance content by a speaker, before the utterance content is decided; and
sequentially generating and presenting information obtained by visualizing the utterance content by the speaker using the information sequentially acquired in the utterance content acquiring step.
(35) A computer program causing a computer to execute:
sequentially acquiring voice information; and
analyzing utterance content by a speaker using the voice information sequentially acquired in the voice information acquiring step and outputting an analysis result, wherein, in the utterance content analyzing step, the analysis result is sequentially output even before the utterance content by the speaker is decided.

What is claimed is:

1. A system comprising:
a display device; and
at least one processor configured to
    acquire captured voice data corresponding to a spoken command via a sound collecting device in communication with the at least one processor,
    analyze the captured voice data and determine phoneme information of the captured voice data, wherein the captured voice data and the phoneme information is compared to at least one of an acoustic model, a language model, and dictionary data,
    cause the display device to display a phoneme string in real time in a first language that corresponds to analysis results of the sequentially analyzed captured voice data and the determined phoneme information;
    compare the displayed phoneme string corresponding to analysis results of the sequentially analyzed captured voice data with phoneme information of a word stored in the at least one of the acoustic model, the language model, and the dictionary data,
    convert an erroneously displayed portion of the phoneme string into a correct phoneme string, and display the corrected phoneme string in a second language, and
    perform a predetermined operation of the correct phoneme string corresponding to the spoken command based on the analysis of all portions of the captured voice data being complete.

2. The system of claim 1, wherein the at least one processor is configured to cause the display device to display a visual indication corresponding to a plurality of analyzed portions of the captured voice data before the spoken command is completed.

3. The system of claim 1, wherein the at least one processor is configured to cause the display device to display an interface including a plurality of operation targets.

4. The system of claim 3, wherein the at least one processor is configured to cause the display device to apply a predetermined effect to at least one of the plurality of operation targets that is capable of being controlled by the spoken command.

5. The system of claim 3, wherein the at least one processor is configured to cause the display device to apply a predetermined effect to at least one of the plurality of operation targets that is capable of being controlled by the spoken command upon acquiring the captured voice data corresponding to the spoken command.

6. The system of claim 3, wherein the at least one processor is configured to:
    determine that the spoken command corresponds to the at least one of the plurality of operation targets;
    perform, as the predetermined operation, an operation corresponding to the at least one of the plurality of targets when the analysis of the captured voice data is complete; and
    cause the display device to stop applying the predetermined effect to the at least one of the plurality of the operation targets when the analysis of the captured voice data is complete.

7. The system of claim 3, wherein the at least one processor is configured to cause the display device to display text corresponding to a command applicable to at least one of the plurality of operation targets.

8. The system of claim 7, wherein the at least one processor is configured to cause the display device to display the text corresponding to the command applicable to the at least one of the plurality of operation targets at a position corresponding to a display portion of the at least one of the plurality of operation targets.

9. The system of claim 3, wherein the at least one processor is configured to change a size of an operation target of the plurality of operation targets based on the voice data analysis being complete.

10. The system of claim 1, wherein
the at least one processor is configured to cause the display device to display text corresponding to a command applicable to an item displayed on the display at a position corresponding to a display position of the item displayed on the display.

11. The system of claim 1, wherein
the at least one processor is configured to cause the display device to display a visual indication corresponding to a level of the captured voice data.

12. The system of claim 1, wherein the at least one processor is configured to:
    cause the display device to apply a first predetermined effect to a displayed image when the level of the captured voice data is within a predetermined range;
    cause the display device to apply a second predetermined effect to the displayed image when the level of the captured voice data is lower than the predetermined range; and
    cause the display device to apply a third predetermined effect to the displayed image when the level of the captured voice data is higher than the predetermined range.

13. The system of claim 1, wherein the at least one processor is configured to cause the display device to display, as a visual indication, an amount of graphic corresponding to the portion of analyzed captured voice data.

14. The system of claim 13, wherein the graphic includes at least one of a sequence of symbols, an abstract graphic, and an animated indicator.

15. The system of claim 13, wherein the at least one processor is configured to cause the display device to update the graphic with information corresponding to the spoken command based on the analysis of all portions of the captured voice data being complete.

16. The system of claim 1, wherein
the spoken command includes a plurality of words, and
the at least one processor is configured to cause the display device to display, as the visual indication, each of the plurality of words based on the analysis of the captured voice data.

17. The system of claim 1, wherein the displaying of the phoneme string includes include a flow from a start of the analysis of the captured voice data to an end of the analysis of the captured voice data.

18. A method comprising:
acquiring captured voice data corresponding to a spoken command via a sound collecting device in communication with a processor;
analyzing the captured voice data and determine phoneme information of the captured voice data, wherein the captured voice data and the phoneme information is compared to at least one of an acoustic model, a language model, and dictionary data;
causing a display device to display a phoneme string in real time in a first language that corresponds to analysis results of the sequentially analyzed captured voice data and the determined phoneme information;
comparing the displayed phoneme string corresponding to analysis results of the sequentially analyzed captured voice data with phoneme information of a word stored in the at least one of the acoustic model, the language model, and the dictionary data;
converting an erroneously displayed portion of the phoneme string into a correct phoneme string, and display the corrected phoneme string in a second language; and
performing a predetermined operation of the correct phoneme string corresponding to the spoken command based on the analysis of all portions of the captured voice data being complete.

19. A non-transitory computer-readable medium including instruction, which, when executed by a system, cause the system to execute a method, the method comprising:
acquiring captured voice data corresponding to a spoken command via a sound collecting device;
analyzing the captured voice data and determine phoneme information of the captured voice data, wherein the captured voice data and the phoneme information is compared to at least one of an acoustic model, a language model, and dictionary data;
causing a display device to display a phoneme string in real time in a first language that corresponds to analysis results of the sequentially analyzed captured voice data and the determined phoneme information;
comparing the displayed phoneme string corresponding to analysis results of the sequentially analyzed captured voice data with phoneme information of a word stored in the at least one of the acoustic model, the language model, and the dictionary data;
converting an erroneously displayed portion of the phoneme string into a correct phoneme string, and display the corrected phoneme string in a second language; and
performing a predetermined operation of the correct phoneme string corresponding to the spoken command based on the analysis of all portions of the captured voice data being complete.

* * * * *